US009545168B2

(12) United States Patent
Gabara

(10) Patent No.: US 9,545,168 B2
(45) Date of Patent: Jan. 17, 2017

(54) METHOD AND APPARATUS FOR QUICKLY COOKING COMESTIBLES

(71) Applicant: TrackThings LLC, Murray Hill, NJ (US)

(72) Inventor: Thaddeus John Gabara, Murray hill, NJ (US)

(73) Assignee: TrackThings LLC, Murray Hill, NJ (US)

( * ) Notice: Subject to any disclaimer, the term of this patent is extended or adjusted under 35 U.S.C. 154(b) by 302 days.

(21) Appl. No.: 14/208,527

(22) Filed: Mar. 13, 2014

(65) Prior Publication Data

US 2015/0257573 A1    Sep. 17, 2015

(51) Int. Cl.
| A47J 27/00 | (2006.01) |
| A47J 27/10 | (2006.01) |
| A47J 27/62 | (2006.01) |
| A47J 27/21 | (2006.01) |
| A47J 27/16 | (2006.01) |
| A47J 27/04 | (2006.01) |

(52) U.S. Cl.
CPC ............. *A47J 27/10* (2013.01); *A47J 27/04* (2013.01); *A47J 27/16* (2013.01); *A47J 27/21016* (2013.01); *A47J 27/62* (2013.01); *A47J 2027/043* (2013.01)

(58) Field of Classification Search
CPC ............ A47J 27/04; A47J 27/14; A47J 27/16; A47J 27/21016; A47J 2027/043
USPC .................................................. 99/330, 348
See application file for complete search history.

(56) References Cited

U.S. PATENT DOCUMENTS

| 4,803,920 A | * | 2/1989 | Kowalics | ............... A47J 27/14 366/101 |
| 5,193,441 A | * | 3/1993 | Hayashi | ............... A47J 36/165 99/348 |
| 5,215,000 A | * | 6/1993 | Desage | ..................... F22B 1/30 126/20 |

(Continued)

OTHER PUBLICATIONS

High Temperature SOI CMOS Electronics Development The Deep Trek Project, Edgar R. Mallison MBA. PE. /Author Honeywell: Defense and Space Electronics Systems Plymouth, Minnesota USA, http://www51.honeywell.com/aero/common/documents/myaerospacecatalog-documents/Missiles-Munitions/High_Temperature_SOI_CMOS_Electronics_Development_Deep_Trek_HITEM_2005.pdf.

(Continued)

*Primary Examiner* — Reginald L Alexander
(74) *Attorney, Agent, or Firm* — Thaddeus Gabara

(57) ABSTRACT

Steam heating used with conventional heating techniques achieves a rapid boiling point. An intelligent electronic control system which uses sensors placed at various points in the system to monitor and/or control cooking, interacts with the Internet to determine cooking steps, powers embedded electronics in vessels by RF energy, and adjusts the heating temperatures of the contents of the vessel as a function of time. A stove will provide configurable tubes with a coupling unit at their end to attach various steam wands easily moved into position that provide this steam to vessels placed on a grill. Delicate cooking of comestibles can be achieved by maintaining a controlled temperature or cycling the temperature to maximize cooking without losing significant nutrients of the comestibles. Small coupling holes introduce steam at the bottom surface of a vessel to efficiently cook comestibles. The coupling holes have a radius which stratifies the Young-Laplace equation.

15 Claims, 42 Drawing Sheets

(56) References Cited

U.S. PATENT DOCUMENTS

| | | | | |
|---|---|---|---|---|
| 6,582,743 | B2* | 6/2003 | Cai | A47J 27/04 |
| | | | | 426/510 |
| 8,826,805 | B2* | 9/2014 | Leung | 126/369 |
| 2011/0256287 | A1* | 10/2011 | Sus | A23L 1/0121 |
| | | | | 426/510 |
| 2012/0073450 | A1* | 3/2012 | Constans | A47J 43/0716 |
| | | | | 99/339 |
| 2012/0315363 | A1* | 12/2012 | Suarez_Mason | A47J 27/04 |
| | | | | 426/510 |

OTHER PUBLICATIONS

High Temperature CMOS Reliability and Drift, Shane Rose, Quartzdyne Inc., 4334 W. Links Drive, Salt Lake City, Utah 84120, http://www.quartzdyne.com/pdfs/HighTempCMOSDrift2010.pdf.

Steam Jet Condensation in a Pool: From Fundamental Understanding to Engineering Scale Analysis, Chul-Hwa Song, Seok Cho, Hyung-Seok Kang, Korea Atomic Energy Research Institute (KAERI),, Daedeok-daero 989-111,, Yuseong-gu, Daejeon 305-353, Republic of Korea, Journal of Heat Transfer Copyright, March 2012, vol. 134 / 031004-1.

High efficiency gas/liquid contacting, Mott corporation, 84 Spring Lane, Farmington, CT 06032-3159http://www.mottcorp.com/resource/pdf/sparging.pdf.

AP-42 Food—Vegetable Fruit, & Potato Processing, Prosonix, Milwaukee, WI, http://www.pro-sonix.com/files/pdf/food/SteamInjectionHeating-FoodBlanchingEquipment-VegetableProcessing-AP-42-20100922.pdf.

* cited by examiner

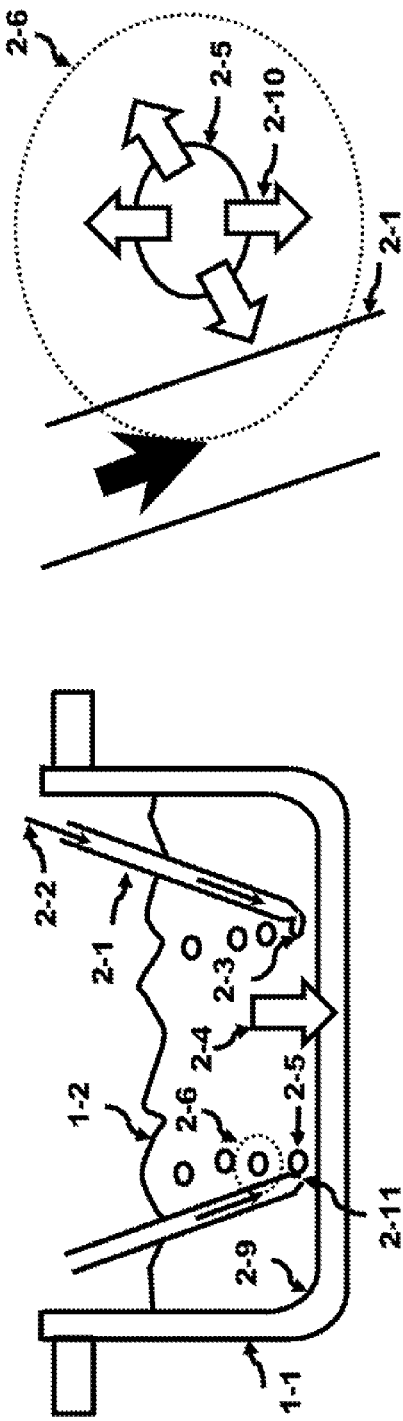
FIG. 2A
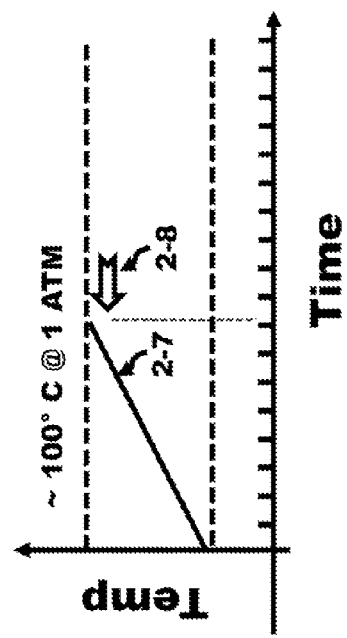
FIG. 2B
FIG. 2C

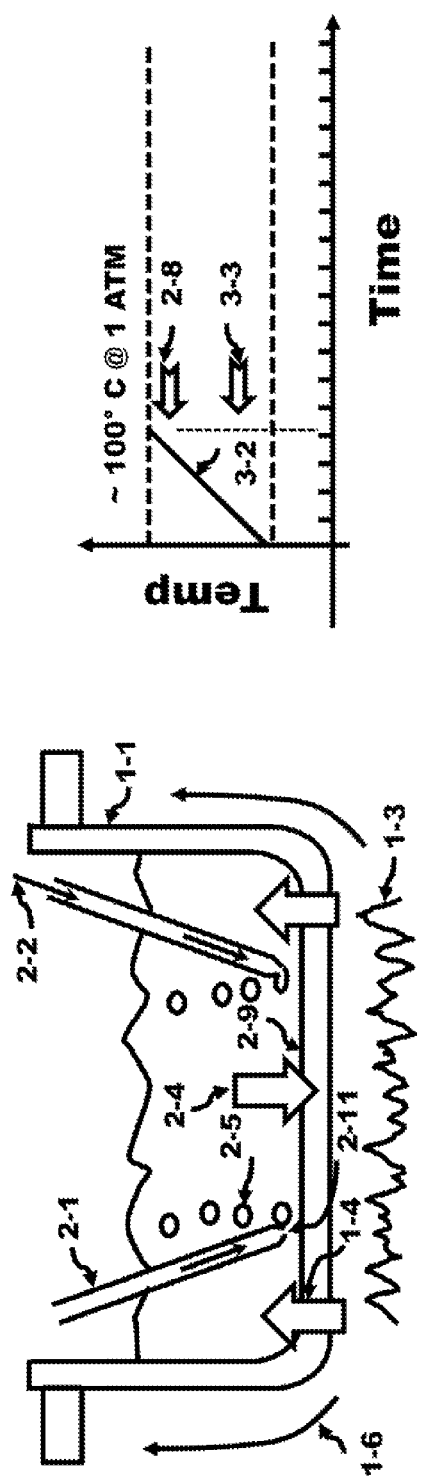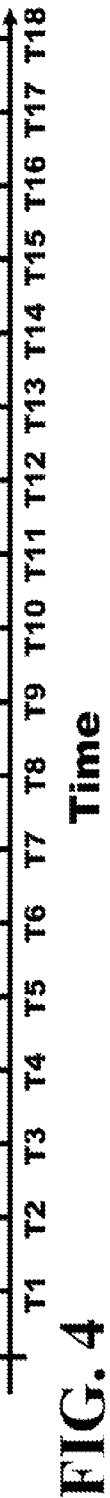

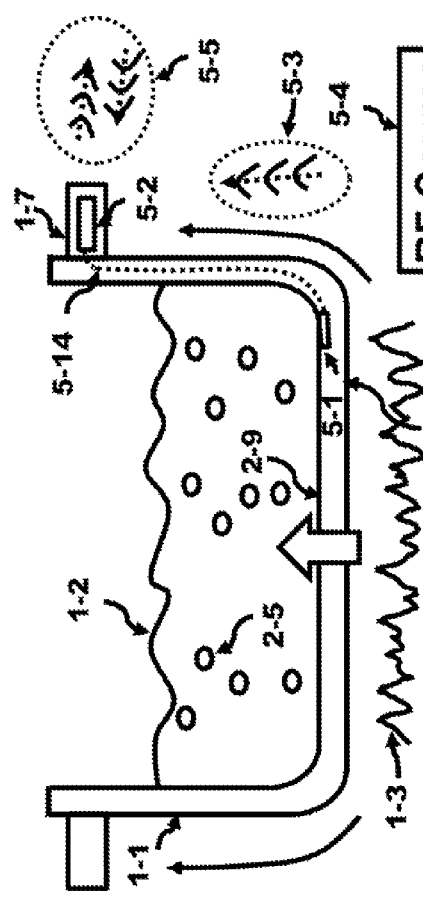
FIG. 5A
FIG. 5B
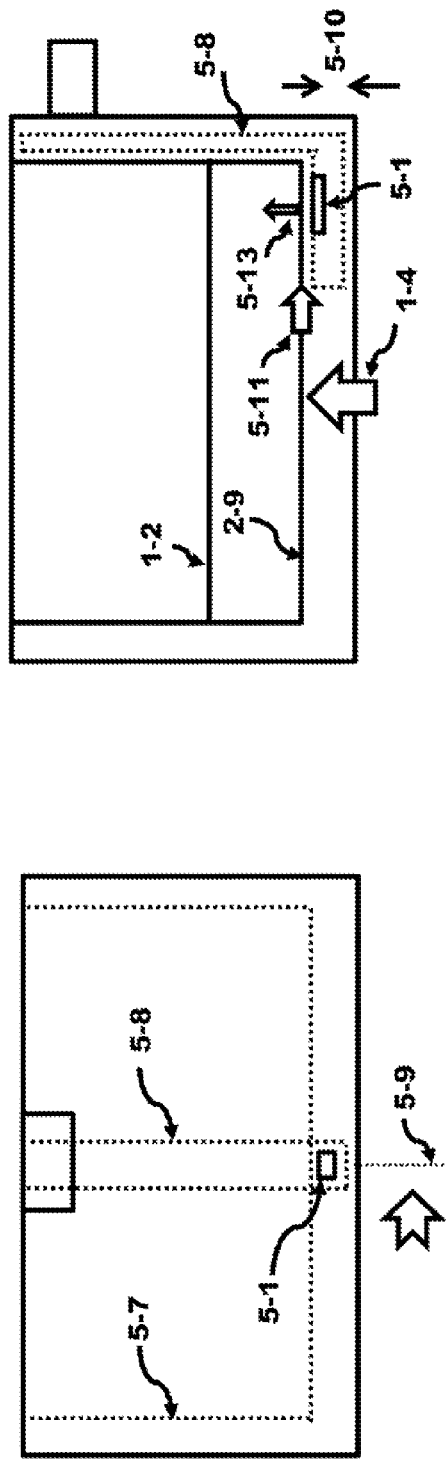
FIG. 5C
FIG. 5D

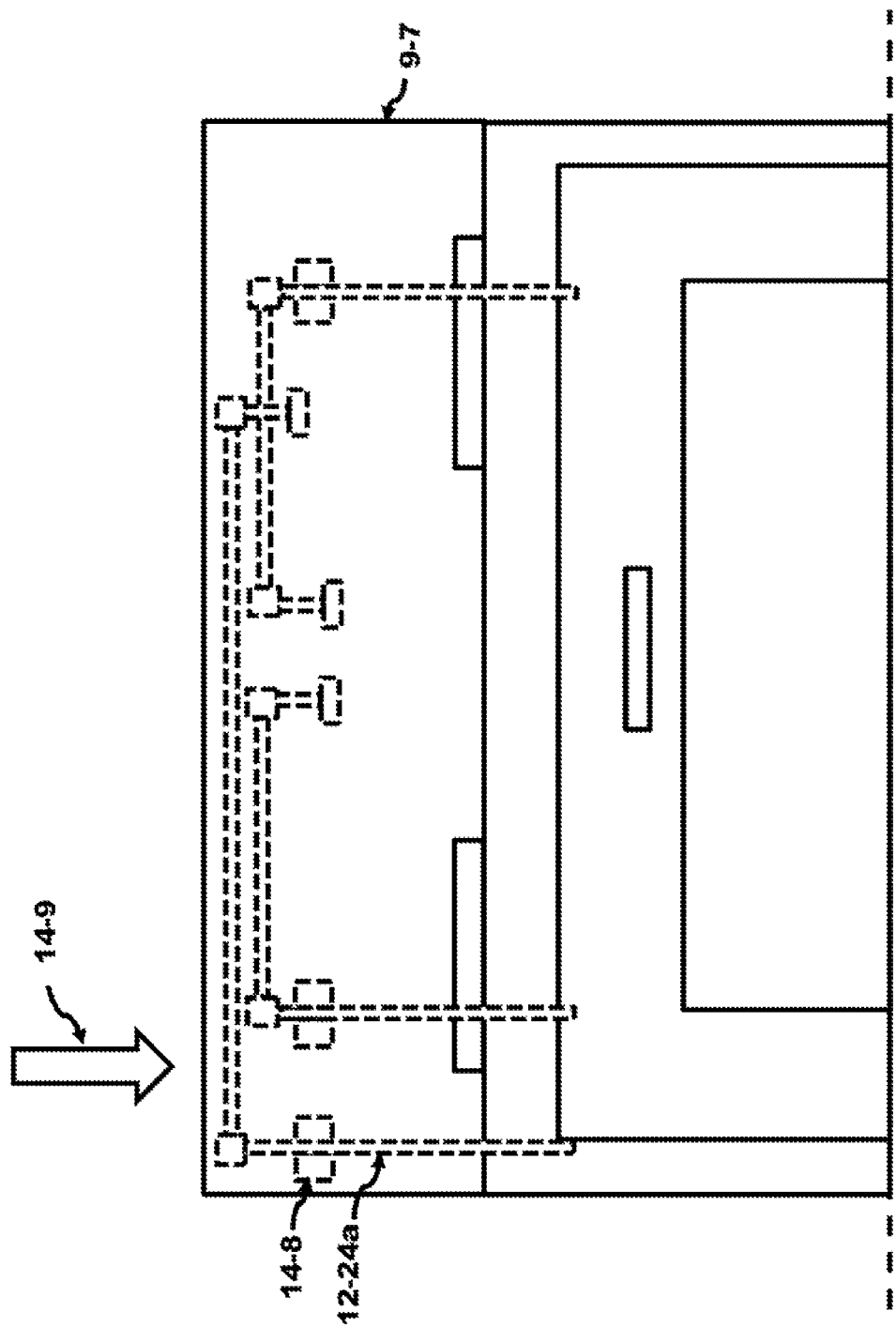

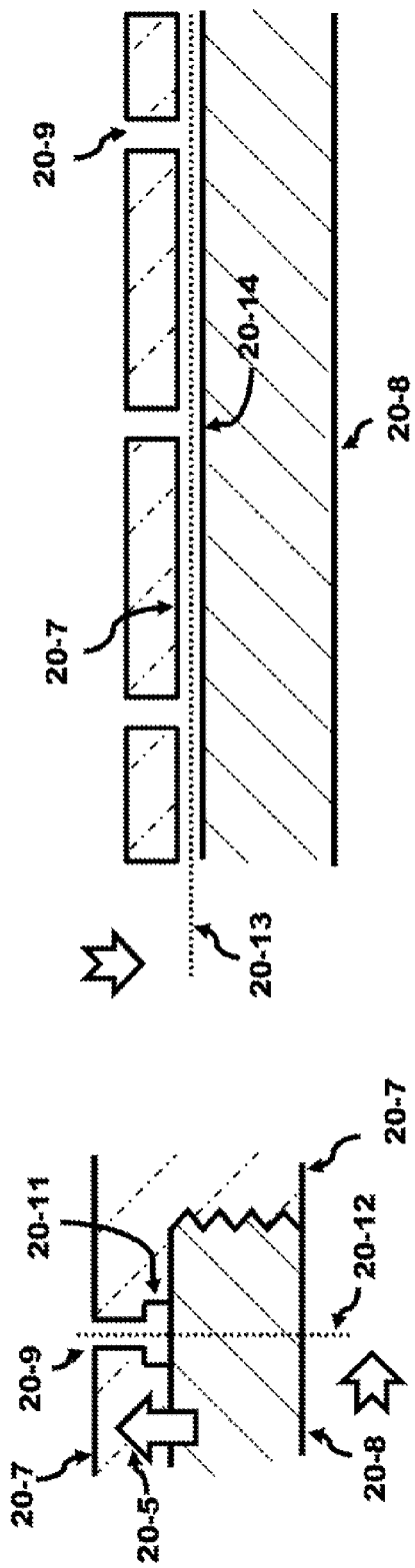
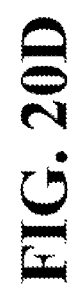
FIG. 20C
FIG. 20D
FIG. 20E

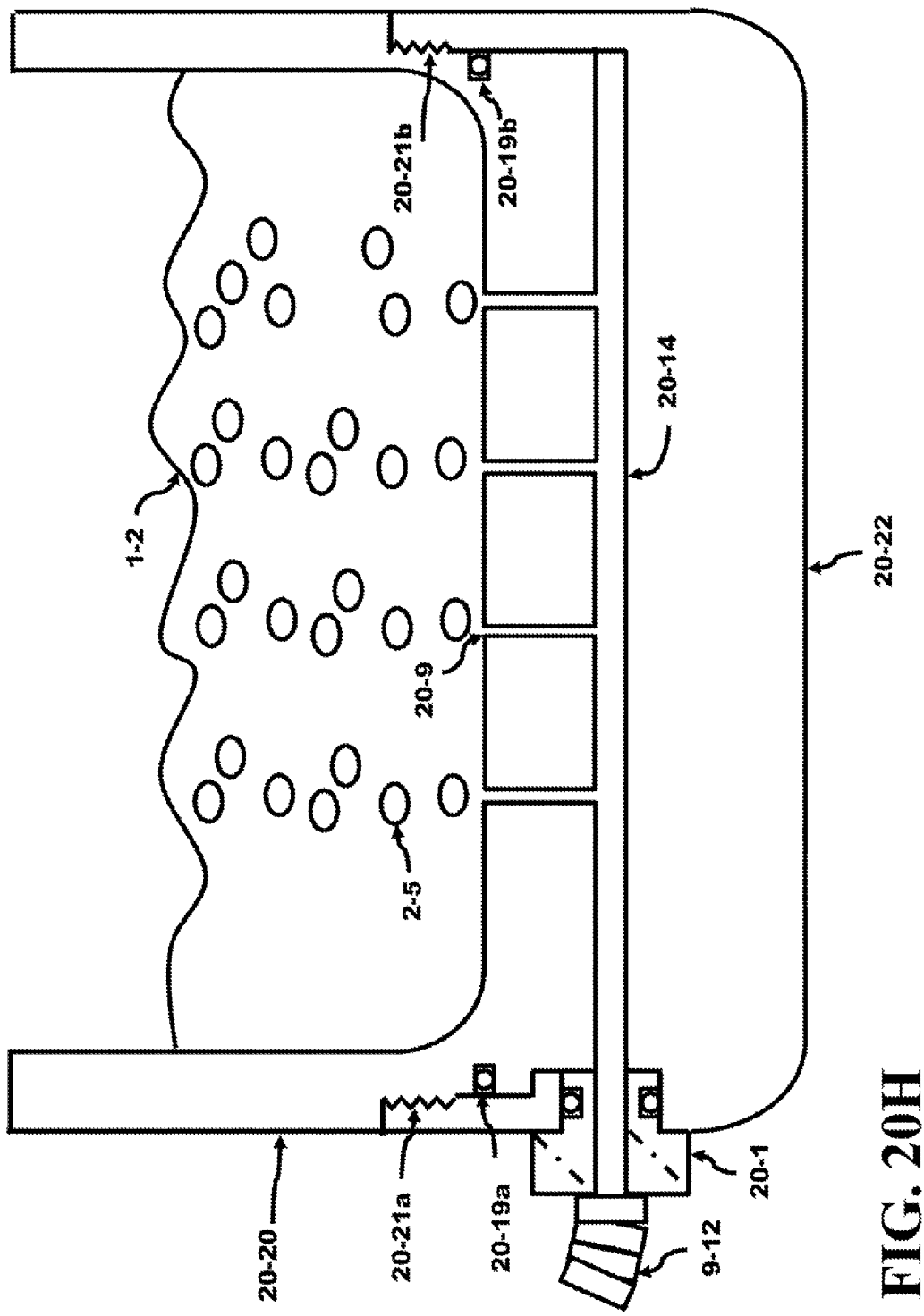

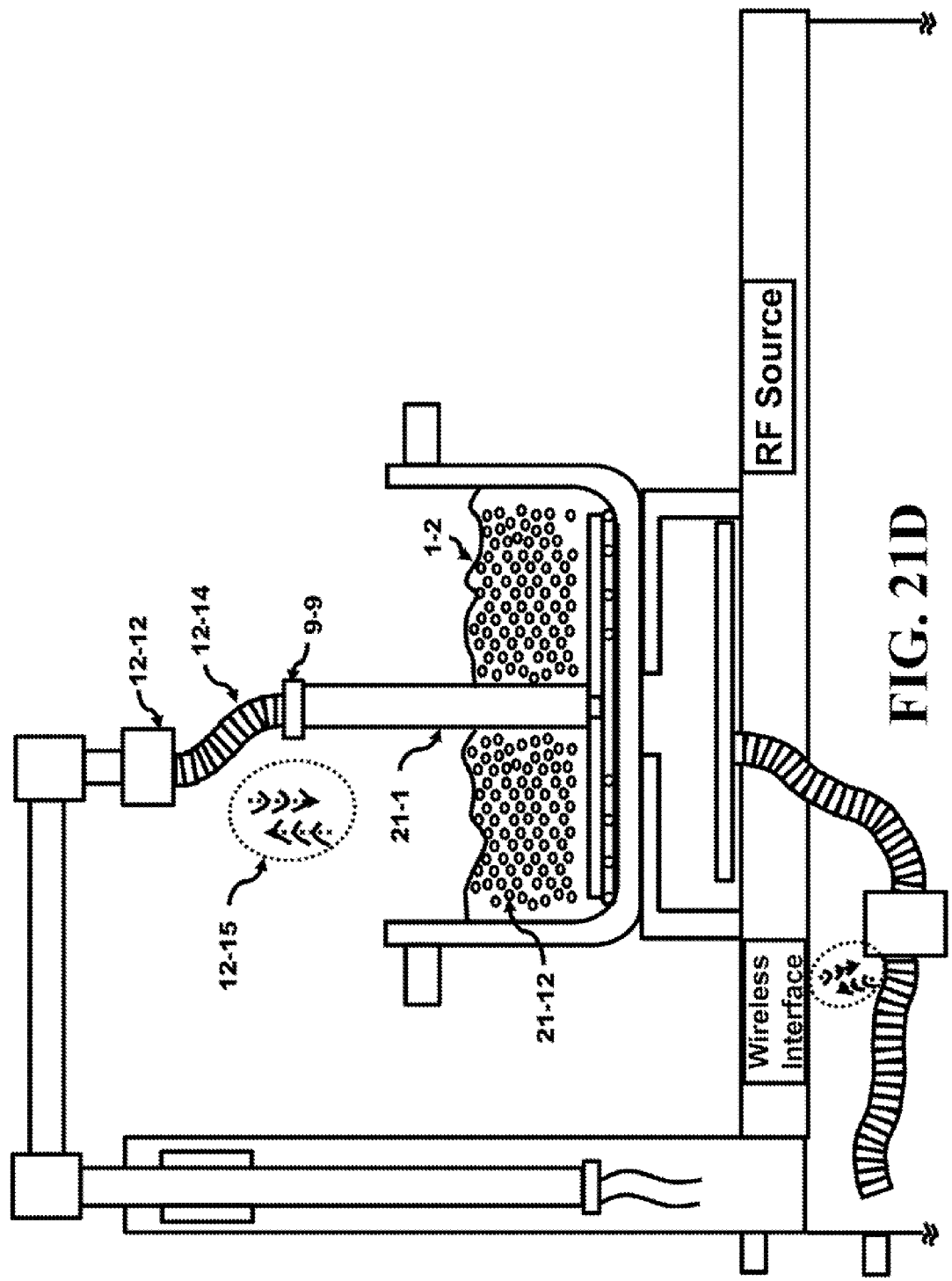

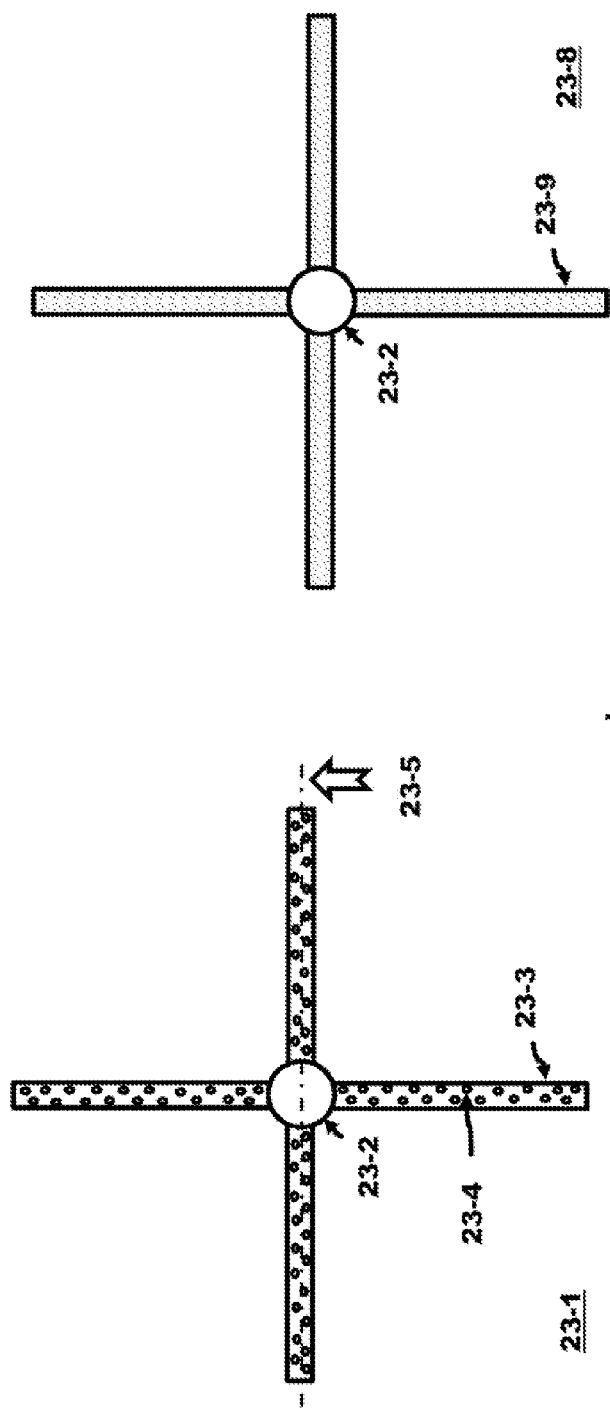
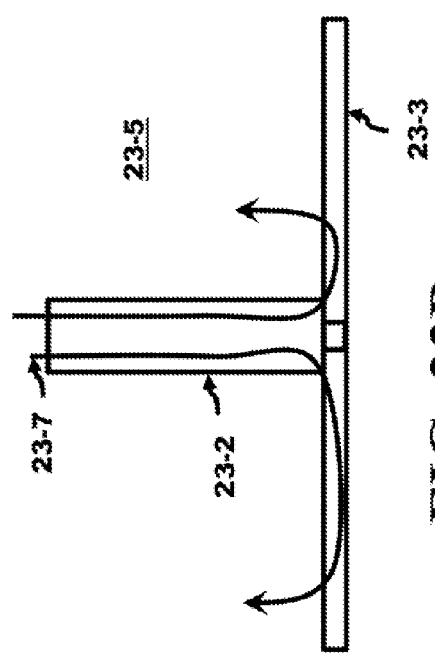
FIG. 23A
FIG. 23B
FIG. 23C

METHOD AND APPARATUS FOR QUICKLY COOKING COMESTIBLES

CROSS REFERENCE TO RELATED APPLICATIONS

Not applicable.

BACKGROUND OF THE INVENTION

Mankind has been cooking and preparing meals for thousands of years, each culture increasing the method and techniques of preparing meals. Cultures from all over the world provide a rich background of the various ways of preparing meals, many cooked in vessels to hold the comestibles in a secure place over a fire or an equivalent heat source. Various vessels with a variety of possibilities have been developed, such as a: pot, pan, wok, karihi, kettle, saucepan, cooking pot, coffee maker, cup, etc. The composition of these vessels has varied from metal, glass, Pyrex, ceramic, plastics, etc., where the typical user can be an adult, a child, a student, a cook, a chef, a fast food preparer, etc. Various heat sources have been developed including flames formed from natural gas, electrical conductive heating as by a coil, RF microwave, or their equivalent. Many of the comestibles held in a vessel are comprised of water, milk, fluid, wine, stock, beer, soup, stew, sauce, vegetables, fruits, meats, wheat, rice, or liquid extracts of a solid comestible being cooked. The end resulting products of using these inventive techniques presented herein can be served as meals, snacks, prepared foods, drinks, etc., for breakfast, lunch, dinner and in-between nourishment for home, restaurants, and cafeterias, etc. The method of cooking can include: boiling, simmering, stewing, steeping, infusion, steaming, smothering, poaching, or coddling.

Many of these cooking techniques require water being brought to a hot temperature so the meals can be prepared. Some quick meals are in fact not so quick. For instance, boiling eggs or preparing noodles or spaghetti requires the water in the vessel holding these comestibles to approach or reach the boiling point. Once the water is at this temperature, the cooking time starts and the meal can be prepared quickly from this time point. However, 3 or 4 minutes are typically spent waiting at the stove for the water to reach this particular time point. In many cases, this consume wastes as much as 50% of the total time spent preparing the fast meal from the very start to the very end.

In other meal preparations, the comestibles become scorched to the interior surfaces of the cooking vessel: bringing milk to the proper temperature for hot chocolate often causes scorching at least at the milk-air-surface interface alongside the vertical walls of the vessel. In some cases, the entire common surface interface between the milk and surface of the vessel becomes scorched. Considerable effort and time can be spent to remove the remnants of the scorching from the vessel.

A desirable feature of the innovative techniques helps to eliminate this concern. Microwaves ovens have helped to significantly reduce the time to prepare a meal. Microwaves heat comestibles from the inside out. Although the techniques presented in this specification are applicable to be used alongside with microwaves, these techniques also reduce the time to prepare meals in many conventional cooking technologies other than microwaves. These methods and techniques are herein presented.

BRIEF SUMMARY OF THE INVENTION

This invention helps to overcome this shortcoming in current systems for cooking comestibles and offer several other advantages as well. Various embodiments and aspects of the inventions will be described with reference to details discussed below, and the accompanying drawings will illustrate the various embodiments. Some diagrams are not drawn to scale. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of the embodiments of the present inventions.

One of the embodiments of this disclosure presents a technique of steam heating liquids to approach the boiling point rapidly. The steam heating occurs by inserting one or more steam wands into the liquid of the vessel. These steam wands inject steam into the liquid rapidly increasing the temperature of the liquid. Once the desired temperature has been achieved, the injected steam can be used to continue cooking the liquid. The entire sequence can be programmed via an intelligent electronic control system using instructions provided by the user, the Internet, or both. The system can be monitored by the user, the Internet, or both. The Internet can send the user details of the monitoring via a smartphone or any other wearable electronics.

One of the embodiments of this disclosure presents a steam generation unit that can heat water to high temperatures. The unit comprises pressure controllers, monitored pressure and temperature sensors, at least one pump and at least one heating element. The heating element can be an electrical resistive loss element, a nozzle fueled by a fuel (natural gas or a petroleum-derivative) to generate a flame, or a microwave RF unit. The pressure and temperature sensors within a heating cavity can be used to determine the phase of the water within the heating cavity. The phase (liquid or gas) of the water can be controlled to provide either hot water or steam at a controlled flow rate flowing from the heating cavity after being provided energy by the heating element. For example, the generated steam can be applied to liquid held within a vessel or to a pocket cavity within a steam wand. The rate of energy (power) applied to a heating element inside the heating cavity can be controlled by an adjusting a current using an electrical control circuit or controlling the flow of gas to create an adjustable flame.

Another of the embodiments of this disclosure introduces a technique of combining conventional heating techniques alongside the innovative steam heating techniques. By applying both gas and steam heating to a vessel, the water contained within the vessel approaches the elevated temperatures even quicker than using steam alone. The steam heating occurs by inserting one or more steam wands into the liquid of the vessel. These steam wands inject steam into the liquid directly heating the liquid while the gas flame heats the vessel which then transfers the heat by conduction to the liquid. Once the desired temperature has been achieved, either the gas flame or the injected steam can be used to continue cooking the liquid. The entire sequence of using the flame heat, the steam heat, or both can be programmed via an intelligent electronic control system using instructions provided by the user, the Internet, or their combination. The system can be monitored by the user, the Internet, or both. The Internet can send the user details of the progress of the cooking or any difficulties that may have arisen (water evaporated, food burning, etc.) via a smartphone or any other wearable electronics.

Another of the embodiments of this disclosure introduces a technique of combining conventional heating techniques alongside the innovative steam heating techniques and applying gas heating and steam heating in particular time increments. This is useful for delicate cooking where certain heating temperatures of the liquid may be held at a constant temperature below the boiling point, adjusted in temperature to different values, and cycling the temperature range to maximize cooking without losing significant nutrients of the comestibles. In other words, enable and disable the steam heating a first patterned time period. This can then be AND'ed (assuming a logical AND operations) with a second patterned enable and disable time period providing a wide range of possible pulsed steam heating possibilities. Similarly, the flame heating can be controlled in a similar way. Enable and disable the flame heating every third patterned time period. This can then be AND'ed with a fourth patterned enable and disable time period providing a wide range of possible pulsed steam heating possibilities. The enabling and disabling of the gas heating can also be OR'ed or EX-OR'ed (assuming a logical OR or exclusive OR operation) with the enabling and disabling of the steam heating to provide a wide range of possible pulsed heating combinations. The application and control of the time cycled heating sequence can be programmed via an intelligent electronic control system using instructions provided by the user, the Internet, or both. The system can be monitored by the user, the Internet, or both. The Internet can send the user details of the monitoring via a smartphone or any other wearable electronics.

Another of the embodiments of this disclosure presents an intelligent electronic control system which uses sensors placed at various points in the system to monitor and/or control cooking, determines unsafe conditions and alerts the user, interacts with the Internet to determine cooking steps, powers embedded electronics in vessels by RF energy, communicates with vessels using Bluetooth, Wi-Fi, WiGig, or any wireless communication standard, and adjusts the heating temperatures of the contents of the vessel as a function of time whether a heat source like a flame, steam, or both are applied. Induction heating generated by inductive coil heating may also be used.

Another of the embodiments of this disclosure presents an intelligent electronic control system which uses sensors placed at various points in the system to monitor and/or control the temperature of the vessels that are applied by heat sources to avoid destruction of the electronics and sensors or the vessel that contains these components. The maximum temperature working range of semiconductors is between 250-300° C. and the intelligent electronic control system can be used to maintain the temperature of certain internal portions of the vessel (in between the flame and the liquid held by the vessel, for example) below this upper range. For example, a first sensor indicates that there is a safe amount of liquid in the vessel. A second sensor indicates that the a portion of a vessel being heated on a grill with a gas flame is approaching a temperature of 200° C., which is a safe temperature difference from the maximum operating temperature of the semiconductor. The second sensor would then indicate that the gas flame should be disabled. A message can be sent to the owner via email, text, or phone that the system needs a certain part to be either repaired or a maintenance condition is required.

Another of the embodiments of this disclosure presents an intelligent electronic control system which uses sensors placed at various points in the system to monitor and/or control the heat sources applied to the vessel in order to control the cooking temperature to a particular temperature. For example, a first sensor indicates that there is a safe amount of liquid in the vessel. A second sensor indicates that the comestible within the vessel being heated with a heat source and is approaching a temperature of 80° C., which is a maximum temperature for this particular comestible where the taste could be destroyed if the temperature exceeded this maximum temperature. The second sensor would then indicate that the gas flame should be reduced in intensity or disabled for a time period. As the temperature decreases, the gas flame, the steam source, or both can be enabled to continue cooking and maintaining the comestible at this desired temperature.

Another of the embodiments of this disclosure incorporating the steam heating assembly with the associated one or more tubes, which are flexible for connecting either the generated steam or hot water to a vessel. These tubes are easily moved into position. The flexible tube assemblies can be molded into position since they are composed of coupled stacked cylindrical rings which hold their shape due to the friction between each adjacent pair of cylindrical rings. A tube formed from a spiral strip coupled by friction could also be used. This vessel may be resting on a grill of the stove, on a surface of the stove, or on a counter adjacent to the stove. The flexible tubes have a coupling unit at their end to attach various steam wands that are easily detachable from the flexible tubes for easy cleaning, if required. One or more of these steam wands can be inserted into the vessel holding comestibles which apply steam or, in some cases, hot water to the liquid to prepare a meal.

Another of the embodiments of this disclosure incorporating the steam heating assembly with the associated one or more tubes, which are rigid for connecting either the generated steam or hot water to a vessel. These rigid tubes are easily moved into position. The rigid tubes can be moved and rotated into position since they are composed of rotational units that connect two rigid tubes together. The rotational unit allows two degrees of freedom of motion of rotation along the each tube's center axis. A second rotational unit connects a third rigid tube this assembly provides another degree of motion of rotation allowing the assembly to be moved into position. This vessel may be resting on a grill of the stove or on a counter adjacent to the stove. The rigid tubes have a coupling unit at their end to attach various steam wands that are easily detachable from the flexible tubes for easy cleaning, if required. One or more of these steam wands can be inserted into the vessel holding comestibles which apply steam or hot water to the liquid to prepare a meal.

Another of the embodiments of this disclosure allows the connecting tubes which can be formed from combining various combinations of a flexible tube and a rigid tube together. The connecting tubes, if desired can be concealed and hidden from view, when they are not being used in the backstop of the stove or within the hood positioned over the stove. The flexible tube can be formed into various contours or shapes to position the steam wand at one end of the flexible tube at various locations. The flexible tube can be formed into a shape and moved out of the working space. The rigid tubes have rotational units coupling a first tube to a second tube. These rotational units allow each coupled tube to rotate along the tube's axis or rotate the rotational units along the unit's axis of allowable movement. Both of these two types of tubes can be easily adjusted and placed within a vessel or out of the working space.

Another of the embodiments of this disclosure describes a vessel with a pocket cavity below the planar inside bottom surface of the vessel. Coupling holes in the bottom surface couple the space within the pocket cavity to the space inside the vessel. These coupling holes are sized such that the liquid held by the vessel will not leak into the pocket cavity if several variables conform to the Young-Laplace equation concerning the meniscus formed between the liquid-air interfaces at the coupling holes. The coupling holes have a diameter (the diameter is twice the radius) which satisfies a condition of the Young-Laplace equation. Since there are several variables, temperature, characteristics of the liquid and material of the vessel, temperature, level of the liquid in the vessel, etc. the diameter of the coupling holes will be dependent on these variables. One range of the diameter of the coupling holes for a particular set of variables is expected to be 100 μm to 260 μm. Although, modifying the variables will correspondingly change this particular given range. This modified vessel can be used to cook comestibles using steam heating. Steam is applied to the pocket cavity and due to the increased pressure within the heating cavity, the steam is forced through the coupling holes into the liquid at the inside bottom surface of the vessel. These steam bubbles rise through the liquid and transfer their heat to the liquid cooking the comestible which is a very efficient way of cooking the comestibles. The vessel can be insulated to further improve the efficiency of this heating technique.

In another embodiment, the bottom surface of the vessel above the pocket cavity can be formed from sintered porous metal. This metal is permeable allowing the steam from the pocket cavity to enter the liquid. Contamination of the pocket cavity, as well as the sintered porous metal, can be prevented by either maintaining a greater pressure in the pocket cavity to prevent leakage of liquid due to the gravitation of the earth, or the porous metal can be manufactured to control the size of the pores within the sintered porous metal satisfying the Young-Laplace condition. The sintered porous metal and corresponding pocket cavity can also be formed in the vertical walls of the vessel. Furthermore, the entire vessel can be manufactured using the sintered porous metal where conventional heat sources can be applied to the formed vessel. In other vessels, a pocket cavity can be formed near the bottom of the vessel that has been manufactured entirely from the sintered porous metal and used for steam cooking. The pocket cavity can be formed in a vessel with the sintered porous metal plate soldered to the bottom portion of the vessel coupling the newly formed pocket cavity to the content space within the vessel. This modified vessel can be used to cook comestibles using only steam heating. Steam is applied to the pocket cavity and due to the increased pressure within the heating cavity, the steam is forced through the sintered porous metal into the liquid at the inside bottom surface of the vessel. The sintered porous metal forms smaller steam bubbles which rise slower within the liquid. This advantageously allows more time for the steam bubble to transfer its heat to the liquid before the bubble reaches the surface of the liquid. The vessel can also be insulated to further improve the efficiency of this heating technique Another of the embodiments of this disclosure offers a further improvement to the efficiency in the heating comestibles. The pocket cavity vessel with the coupling holes in the bottom surface couple the space within the pocket cavity to the space inside the vessel. This modified vessel can be used to cook comestibles using only steam heating. Steam is applied to the pocket cavity and due to the increased pressure within the heating cavity, the steam is forced through the coupling holes into the liquid at the inside bottom surface of the vessel. These steam bubbles rise through the liquid and transfer their heat to the liquid cooking the comestible. The diameter of these bubbles can be controlled by adjusting the pressure of the steam by controlling the steam generating unit. The pressure can be controlled to generate smaller steam bubbles within the liquid. These smaller steam bubbles rise slower within the liquid. This advantageously allows more time for the steam bubble to transfer its heat to the liquid before the bubble reaches the surface of the liquid. The vessel can also be insulated to further improve the efficiency of this heating technique.

Another of the embodiments of this disclosure describes using a combination pocket cavity vessel with steam heating in conjunction with flame heating. The vessel which is using the combination of steam and flame heating vessel will potentially change the above constraints of Young-Laplace equation, particularly the temperature due to the flame heating, and cause the diameter of the coupling holes in this vessel to potentially require smaller coupling holes. Particularly if the vessel will be used in a time cycled heating where the steam is enabled and disabled for a preparation of a particular comestible. A positive pressure within the pocket cavity can be maintained when the steam is disabled to reduce the chance of contamination of the pocket cavity Another of the embodiments of this disclosure describes using a submergible pocket cavity device which can be used to apply steam heating to a liquid. The submergible device has coupling holes that satisfy the constraints of Young-Laplace equation. These coupling holes can be located on any surface of the device and due to the Young-Laplace constraint will not leak the liquid into the pocket cavity. The steam source couples a water source to the pocket cavity of the steam wand, whether the water in either a liquid or gaseous form. The steam generated by a steam source is coupled to the pocket cavity by hollow tubing combined together to form an interconnecting structure that can couple the water source to the pocket cavity. Coupling holes from the pocket cavity to the liquid transfers steam to the liquid to heat the liquid quickly. The coupling holes of the pocket cavity device are distributed in the structure to match the area of the bottom surface of the vessel. This distribution allows the steam bubbles emanating from the coupling holes to evenly heat the liquid as the steam bubble rise. The device can be used in a time cycled heating where the steam is enabled and disabled for a preparation of a particular comestible.

Another of the embodiments of this disclosure describes using a submergible pocket cavity device which can be used to apply steam heating to a liquid. The submergible device has coupling holes on the lowest extremity of the device. The steam generated by a steam source is coupled to the pocket cavity by hollow tubes and an interconnecting structure that can be coupled to a rigid tube structure by a coupling unit. These coupling holes being on the lower surface prevent the liquid from seeping into the pocket cavity by controlling the applied pressure of the steam at the steam source. This pressure is used to maintain the liquid from leaking into the pocket cavity. Coupling holes from the pocket cavity to the liquid conducts steam to the liquid and heats the liquid quickly. The coupling holes of the pocket cavity device are distributed on the lower surface of the structure which extends over a portion of the area of the bottom surface of the vessel. This distribution allows the steam bubbles emanating from the coupling holes to evenly heat the liquid as the steam bubble rise. The device can be used in a time cycled heating where the steam is enabled and disabled for a preparation of a particular comestible.

Another of the embodiments of this disclosure describes using a submergible pocket cavity device which can be used to apply steam heating to a liquid and uses electrical circuits (sensors, System on a Chip (SOC), etc.) to sense the pressure (in the cavity and outside the cavity), the temperature (of the steam and the liquid), and other conditions which is used to control cooking and to prevent liquid seepage into the pocket cavity. The submergible device has coupling holes on the lowest extremity of the device. The steam source couples a water source to the pocket cavity of the steam wand, whether the water source is in either a liquid or gaseous form. These coupling holes being on the lower surface prevent the liquid from seeping into the pocket cavity by controlling the applied pressure of the steam at the steam source. This reduces the chance that the liquid will not leak the liquid into the pocket cavity. Coupling holes from the pocket cavity to the liquid conducts steam to the liquid and heats the liquid quickly. The coupling holes of the pocket cavity device are distributed on the lower surface of the structure which matches the area of the bottom surface of the vessel. This distribution allows the steam bubbles emanating from the coupling holes to evenly heat the liquid as the steam bubble rise. The device can be used in a time cycled heating where the steam is enabled and disabled for a preparation of a particular comestible. The electronics can also be inserted within pocket cavities that satisfy the Young-Laplace condition whereby the concern for seepage is reduced.

BRIEF DESCRIPTION OF THE DRAWINGS

Please note that the drawings shown in this specification may not necessarily be drawn to scale and the relative dimensions of various elements in the diagrams are depicted schematically. The inventions presented here may be embodied in many different forms and should not be construed as limited to the embodiments set forth herein. Rather, these embodiments are provided so that this disclosure will be through and complete, and will fully convey the scope of the invention to those skilled in the art. In other instances, well-known structures and functions have not been shown or described in detail to avoid unnecessarily obscuring the description of the embodiment of the invention. Cross-sectional views may be illustrated where both solid and dotted lines in conjunction with the written text convey the concept allowing the diagrams to be easily viewed and understood.

FIG. 2A illustrates a rapid way of heating the liquid in the vessel of one embodiment in accordance with the present invention.

FIG. 2B presents the heat exchange over the interface between steam and liquid of one embodiment in accordance with the present invention.

FIG. 2C depicts the graph of the rise in temperature of the liquid over time of one embodiment in accordance with the present invention.

FIG. 3A shows a quicker way of heating the liquid in the vessel of one embodiment in accordance with the present invention.

FIG. 3B illustrates the graph of the rise in temperature of the liquid over time of one embodiment in accordance with the present invention.

FIG. 4 depicts several different heating applications of a gas source and steam source of one embodiment in accordance with the present invention.

FIG. 5A illustrates a vessel with electronic sensing system of one embodiment in accordance with the present invention.

FIG. 5B depicts potential semiconductor technologies that are applicable for high temperature environments of one embodiment in accordance with the present invention.

FIG. 5C depicts a side cross-sectional view of the vessel with details of the groove and sensor in FIG. 5A of one embodiment in accordance with the present invention.

FIG. 5D shows a front cross-sectional view of the vessel with details of the groove and sensor in FIG. 5A of one embodiment in accordance with the present invention.

FIG. 14C illustrates a partial cross-sectional front view of a stove with several rigid tube assemblies stored in a concealed position within a backstop of the stove of one embodiment in accordance with the present invention.

FIG. 20C shows the cross-sectional view along the pocket cavity as indicated in FIG. 20A of one embodiment in accordance with the present invention.

FIG. 20D presents a side cross-sectional view perpendicular to the pocket cavity as indicated in FIG. 20C of one embodiment in accordance with the present invention.

FIG. 20E depicts a top cross-sectional view perpendicular presenting several parallel pocket cavities as indicated in FIG. 20D of one embodiment in accordance with the present invention.

FIG. 20H depicts a side cross-sectional view of a vessel using an embedded steam heating technique which introduces steam into the liquid within the vessel by using a pocket cavity disassembled by unthreading and detaching the lower plate of one embodiment in accordance with the present invention.

FIG. 21D illustrates a cross-sectional view of a vessel using a steam wand of one embodiment in accordance with the present invention.

FIG. 23A illustrates the top view of another steam wand in one embodiment in accordance with the present invention.

FIG. 23B depicts a side cross-sectional view of a steam wand indicating steam flow of one embodiment in accordance with the present invention.

FIG. 23C presents the top view of another steam wand using sintered porous metal tubes of one embodiment in accordance with the present invention.

DETAILED DESCRIPTION OF THE INVENTION

Figure 1A:
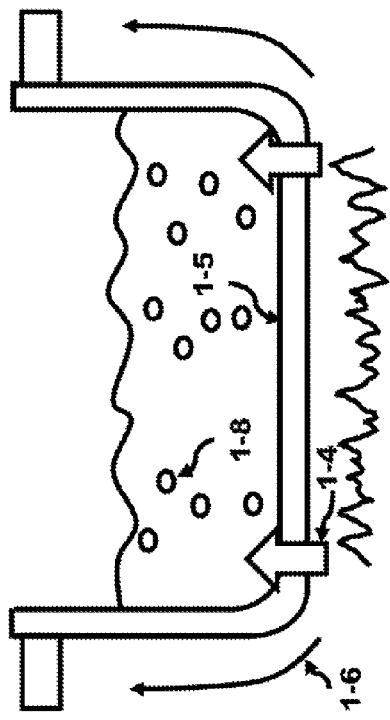
FIG. 1A depicts a vessel (i.e., pot) over a heat source (i.e., flame).

FIG. 1A illustrates a cross-sectional side view of a vessel 1-1 over a flame 1-3. The vessel 1-1 has a handle 1-7 and contains a liquid 1-2 that has a given level. The size of the vessel is usually specified by the outer diameter of the vessel. The thickness of the vessel walls subtracts a small amount from the outer diameter to provide the inner diameter of the vessel. Typically, values of the outer diameter range from approximately 10 cm to 20 cm or more, usually sized to fit the grill of a stove. The wall thickness is about 1 mm. The vessel has an inner volume related to the inner diameter and the height of the inner wall of the vessel. The values of the height of the inner wall range from approximately 3 cm to 20 cm or more. The inner volume determines the maximum liquid holding capacity of the vessel.

The grill is a structure that positions a vessel adjacent to a heating element that may be generating a heat source. The grill is in placed in physical contact with the vessel when the vessel is positioned on the grill and the grill loses physical contact with the vessel when the vessel is removed from the grill by a user. The grill allows users to exchange the vessel with a different vessel easily without modifying the grill (not illustrated in FIG. 1A). The heat 1-4 enters the liquid from the flame 1-3 via thermal conduction in the material composition of the vessel. The vessel 1-1 can be made of any heat resistant, relatively good thermal conductivity material. For example, metals like stainless steel, aluminum, copper, and other metals that can be formed into clad metal layers or combined and embedded with ceramics. The efficiency of the heat from the flame 1-3 to the vessel 1-1 is reduced due to convection by the heat loss 1-6 flowing around the vessel. However, the heat transfers 1-4 through the material interchanges to the liquid at the junction of the inside surface 1-5 between the liquid and the vessel. This exchange process slowly heats up the liquid in the vessel.

Figure 1B:
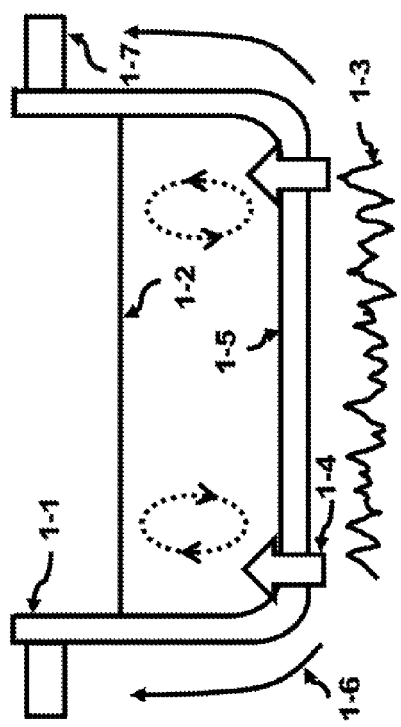
FIG. 1B shows a vessel over a heat source where the water shows signs of boiling.

After a relatively long duration, the water slowly starts to boil as illustrated in FIG. 1B. The heat transfer 1-4 through the inside surface 1-5 causes the water at the interface to transfer from liquid to gas and become steam bubbles 1-8. Typically, for a vessel filled with a liter of a liquid, for example, water would take several minutes to reach the boiling point of approximately 100° C. A typical natural gas flame burner on a stove is rated at about 20,000 BTU. The energy efficiency of energy transfer to the vessel is approximately 40% so as much as 12,000 BTU can be wasted to heat loss 1-6 for this vessel. FIG. 1C illustrates a view of the top of the vessel 1-1. The inner dashed circle 1-9 and the outer dashed circle 1-10 correspondence approximately to the location of the flame beneath the vessels for a natural gas source. In addition, although not illustrated, the heating source could be an electric spiral coil heating the vessel. Since the vessel is usually manufactured with good thermal conductivity, the heat from the flame is quickly diffused via conduction.

Figure 1D:
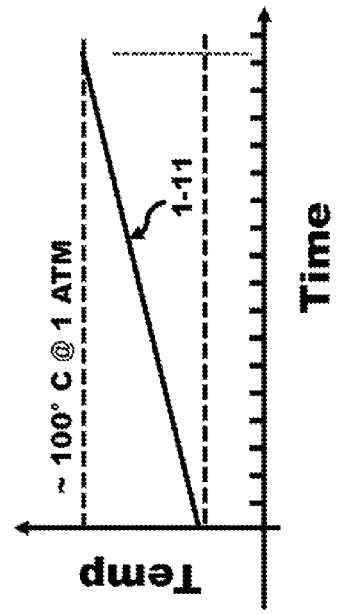
FIG. 1D presents the rise in temperature of the liquid as a function of time.
Figure 1C:
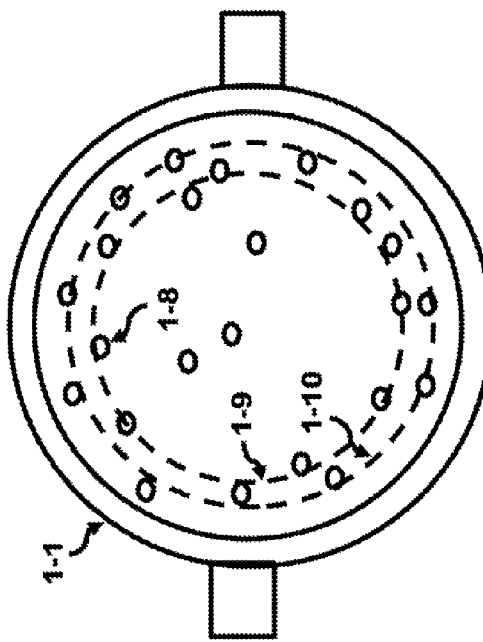
FIG. 1C illustrates a top view of the vessel in FIG. 1B.

FIG. 1D illustrates an approximate linear rise in the temperature 1-11 over time until the water reaches 100° C. at 1 atmospheric pressure. Typically, if a user waits at the stove, this duration of time seems endless until the liquid boils. It follows the old adage "a watched pot never boils."

A significant amount of time is expended by the user who is waiting for liquids to reach the boiling point preparing comestibles. This situation occurs to many users of the stove when they are preparing comestibles such as noodles, soft or hard boiled eggs, pasta (ravioli, spaghetti, etc.), hot chocolate, tea, or just waiting for water to boil before adding a specified comestible. The wait, at times, can be excruciating, causing the cook to leave and do another chore, and forgetting about the initial project of heating the water whereby the vessel loses all the water by evaporation and potentially damages the vessel or worst causes a fire to start.

The inventor preformed an experiment and realized that the steam can be used to heat a given volume of liquid in a shorter time period than if the same volume of liquid was heated over a flame. The time reduction was significant. Instead of waiting 5 minutes for the vessel to boil the liquid when using a flame, the wait is less than a minute. And as more steam sources were applied to and distributed within the liquid, the wait period was further reduced. This is the golden fleece that all stove aficionados have been waiting for, reducing those long excruciating periods of time at the stove—a way to quickly achieve water to boil in order to prepare a fast meal.

Coffee makers have been heating milk by steam to make lane and using the same heater to make cappuccinos for at least 50 years. Latte and cappuccino machines offer a steam nozzle to heat up milk to add to the brewed coffee. However, no one has applied this principle of heating to the stovetop to decrease the wasted time typically spend to wait for water to boil. By allowing more entry points from the steam generator to the water allows the heat up time to decrease further. In addition, the vessel on the stove top can be simultaneously heated by the heat source (e.g., flame) provided in conventional stoves. This new invention adds a new feature to the conventional stove by providing a steam source and an adjustable assembly to channel the steam to a vessel on the stovetop.

FIG. 2A further illustrates this method of heating a vessel 1-1 containing liquid 1-2. In this case, two steam wands 2-1 are inserted into the liquid. These steam wands are hollow allowing steam to flow 2-2 through the internal channel of the steam wands. The steam emanates from the orifice 2-11 at the end of the steam wand 2-1 and creates a newly formed steam bubble 2-3 which eventually detaches from the orifice to form a steam bubble 2-5 which rise to the surface of the liquid. These steam bubbles heat up the liquid and cause heat flow 2-4 from the liquid to move across the common interface 2-9 between the liquid and the vessel 1-1. The circular dotted region 2-6 is expanded in FIG. 2B. A heat transfer 2-10 between steam within the bubble and the liquid 1-2 surrounding it occurs across the interface of the surface of the sphere of the steam bubble 2-5. The steam wand 2-1 presenting steam flow is illustrated nearby. As more steam wands are added, the time to heat the liquid decreases.

FIG. 2C illustrates the linear rise of temperature 2-7 as a function of time within the vessel. The liquid heats up faster for a given amount of energy when compared to the conventional heating curve illustrated in FIG. 1D. Arrow 2-8 illustrates this decrease in time from the previous time of conventional heating.

FIG. 3A illustrates the combination of the heating technique depicted in FIG. 1A combined with the heating technique shown in FIG. 2A. The heat 1-4 enters the liquid from the flame 1-3 through the conductivity of the material forming the vessel. The efficiency of the heat flow 1-4 from the flame 1-3 to the vessel 1-1 is reduced by the heat loss 1-6 flowing around the vessel due to convection. The heat transfer 1-4 through the material interchanges to the liquid at the inside surface 2-9 between the liquid and the surface of the vessel. Furthermore, the two steam wands 2-1 that are inserted into the liquid channel steam to flow 2-2 through the internal region of the steam wands. The steam emanates from the orifice 2-11 of the steam wand 2-1 and creates a newly formed steam bubble which eventually detaches from the steam wand to form a steam bubble 2-5 which rise to the surface of the liquid. These steam bubbles heat up the liquid and cause heat flow 2-4 to move across the common interface 2-9 between the liquid 1-2 and the vessel 1-1. The liquid is being heated by two different heat flows; the first is from the heat flow 1-4 due to the flame 1-3 and a second is from the heat flow 2-10 of the steam bubbles transferring their heat to the liquid.

FIG. 3B presents the linear rise of temperature 3-2 as a function of time within the vessel. The liquid heats up faster since both the conventional heating and steam heating are applied to the liquid. The final curve is illustrated in FIG. 3B. The arrow 2-8 illustrates this decrease in time due to the steam heating while the arrow 3-3 illustrates this decrease in time due to the flame heating. Overall, the wait time period has been reduced significantly.

The application of the steam heat transfer and conduction heat transfer to the liquid can be adjusted to achieve certain cooking characteristics and prevent undesired conditions which occur in conventional cooking. For example, when milk is heated in a conventional vessel quite often the vessel becomes scorched causing the quality of the heated mail to decrease while the cleanup time to remove the scorching from the vessel increases. Steam heating can be used to overcome these inconveniences. Furthermore, steam heating can be combined with the natural gas heating (electric coil heating can also be supplemented in place of gas heating) to perform various cooking characteristics that would be difficult to achieve purely by flame heating.

In situation where the liquid 1-2 is water and the intent to reach boiling temperature quickly, the use of the steam from the steam wands significantly reduces the wait time for the water to boil, as when the user is waiting at the stove to prepare the meal. This is useful since the wait time is significantly reduced. Particularly, when certain comestibles require the water to first reach the boiling point before comestibles are added to the water in order to prepare the meals quickly, for example, pasta, RAMEN® noodles, ravioli, eggs, or similar comestibles. This heating procedure is also useful when attempting to prepare drinks: tea, hot cocoa, etc. quickly.

The steam heating method can be also more efficient by decreasing the diameter of the steam bubble which reduces the velocity of the bubble moving to the surface and allows for greater heat transfer to the liquid.

FIG. 4 illustrates four different heating combination possibilities. Although only four are illustrated, many different combinations can be contemplated by pulsing the flame heating in conjunction with pulsing of the steam heating to prepare comestibles. For example, in 4-12 the steam heating 4-7 is applied until time T10 to heat the liquid, for example, milk to a desired temperature. The milk would not be scorched and would make excellent hot chocolate. To cut the wait, 4-13 illustrates using natural gas heating 4-6 for a short period of time T-3 simultaneously with the steam heating 4-5 and letting the steam heating continue to heat until the time point T5 where the liquid reaches the desired temperature. In the case of 4-14, the natural gas heating 4-4 is shut off at time T5 while steam heating 4-3 is maintained for the desired duration to maintain the liquid at the desired temperature as additional comestibles are added to the liquid. A fourth example 4-15 illustrates the natural gas heating 4-2 and steam heating 4-1 to both heat up the liquid until time T5 then as the temperature of the liquid drops less than the desired temperature 4-8, the steam is pulsed until time T7 where the liquid again reaches the desired temperature, then the steam heating is stopped. As the temperature drops below the desired temperature 4-9, the steam is again pulsed until time T10 and stopped. This pulsing process occurs at 4-10 and 4-11. The pulsing of the steam and even the natural gas will be further described shortly.

FIG. 5A illustrates a vessel 1-1 over a flame heating up a liquid 1-2. The heat causes steam bubbles 2-5 that have formed at the common interface 2-9 between the vessel and the liquid. The vessel is prepared and manufactured with an internal channel between the interior and exterior walls of the vessel, as will be described shortly. For example, a machining bit can be used to drill out a channel from the top of the vessel to the near bottom of the vessel. A semiconductor heat sensor can be inserted into this channel and attached to the surface of the channel closest to the common interface 2-9 between the vessel and the liquid. The sensor can be coupled via a connection 5-14 to an electronic control system 5-2 embedded in the handle 1-7 of the vessel 1-1. The electronic control system can be fabricated from a semiconductor process and can be implemented by a system on a chip SOC semiconductor. A coil can be embedded in the handle 1-7 or in the electronic control system 5-2. This coil can be used to extract energy from an RF source 5-4 via the electromagnetic field transmission 5-3. The electromagnetic field generated by the RF source 5-4 is collected by the coil that is associated with the electronic control system 5-2. The coil (not illustrated) can be a loop of wire or can consist of many loops. The coil can also be integrated onto the chip, fabricated onto a separate substrate or printed onto the handle. The coil would be coupled to the energy extracting block formed on the semiconductor chip. The extracted energy from the transmission would be used to power the circuits implemented on the SOC. The received energy that the coil extracts is converted into a DC power and applied to the remaining electronic control system 5-2. An antenna (not illustrated) can also be integrated onto the chip, fabricated onto a separate substrate or printed onto the handle. A wireless interface 5-5 can be established by the use of the antenna to allow communications between the transceiver of the electronic control system and an external transceiver embedded elsewhere, for example, in the stove, in another vessel, or to both items. The wireless interface can interact with an APP on the user's smart phone.

Communication between vessels and the vessels to the stove via the wireless interface 5-5 is another embodiment of the invention. This communication can be used to control the cooking within each vessel such that the cooking is completed at the same time. An intelligent electronic control system (to be described shortly) can be the interface to monitor the temperature with the sensors (to be described shortly) placed within the vessels. The intelligent electronic control system has access to an internal and external memory (server) to search the local memory or search the web via an Internet connection to discover the recipes to cook the comestibles within each vessel. Intelligent decisions can be made by the system to adjust the heating cycles being applied to each vessel such that the cooking is completed at the same time.

A sensor 5-1 and the electronic control system 5-2 can be used to prevent hazardous conditions from occurring within the kitchen, restaurant, etc. As long as liquid 1-2 remains within the vessel, the temperature at the common interface 2-9 remains close to 100° C. The liquid in the vessel being in contact with the surface of the vessel extracts the energy from the vessel at the common interface 2-9. This energy transfer causes the liquid to reach its boiling point and encourage the process of evaporation. The level of the liquid decreases as the liquid evaporates. The outer interface 5-12 of the vessel would be in contact with the heat source. A flame source can be in the range of 1000° C. The vessel typically holds a liquid, majority of which is essentially water. Water remains water until the temperature reaches 100° C., then the water becomes steam. So as long as there is liquid in the vessel, the temperature of the liquid is 100° C. or less. Secondly, the vessel has great thermal conductivity which is a two sided sword. The heat from the outside easily enters into the liquid, but at the same time the liquid being 100° C. or less is in physical contact with the inner surface of the vessel. So, assuming the vessel has been on the flame for a sufficiently long time, the common interface 2-9 of the vessel is at 100° C. The temperature of the outer surface of the vessel has been reported to be measured between 180 to 230° C. when the vessel contains liquid. If all of the liquid evaporates from the vessel, the temperature at the common interface 2-9 will start to increase dramatically. The electronic control system 5-2 senses the rise in temperature and transmits via the wireless link 5-5 a command to the system to disable the flame 1-3 or heat source. This prevents a potential fire from occurring and also prevents a smoke-out occurring within the premises which would otherwise cause the smoke detectors to go off.

FIG. 5B illustrates a table 5-6 presenting the upper working range of high temperature electronics. A chip fabricated in complementary metal oxide semiconductor (CMOS) can be used up to 250° C. while a chip fabricated in silicon carbon (SiC) can be used up to 300° C. The temperature of the vessel 1-1 is dependent on numerous conditions: the location of the interface 5-12 in relationship to the flame 1-3 or heat source, the location of the sensor within the vessel since a location next to the common interface 2-9 would be closer to 100 C, the thermal conductivity of the material used to construct the vessel, the thickness of wall of the vessel, etc.

FIG. 5C illustrates a side view of the vessel illustrated in FIG. 5A. The interior surface 5-7 of the vessel is illustrated. A groove 5-8 is formed within the wall of the vessel. This groove can be formed as mentioned earlier by a machining process or can be manufactured simultaneously with the vessel. One example, of just such a formation is to have the vessel manufactured from fitting two concentric vessels together, much like the snug fit between two adjacent layers of onion. The sensor 5-1 is attached to the surface closest to the common interface 2-9. A side view 5-9 as illustrated by the arrow is presented in FIG. 5D.

This figure illustrates a side view of the groove 5-8 and the location of the sensor 5-1. The vessel contains a liquid 1-2 while a heat source 1-4 is applied to the bottom of the vessel. The sensor is located on the surface of the groove 5-8 closest to the common interface 2-9 to provide an insulating distance 5-10 from the exterior wall of the vessel so that the sensor is displaced from the direct effects of the heat source 1-4. However, the heat source 1-4 causes a heat flow 5-11 through the thin wall of the vessel towards the sensor 5-1. Simultaneously, heat flow 5-13 is flowing into the liquid 1-2. Thus, the temperature of the sensor does not necessarily feel the direct effects of the heat flow 1-4 which could potentially damage the sensor.

Figure 5E:
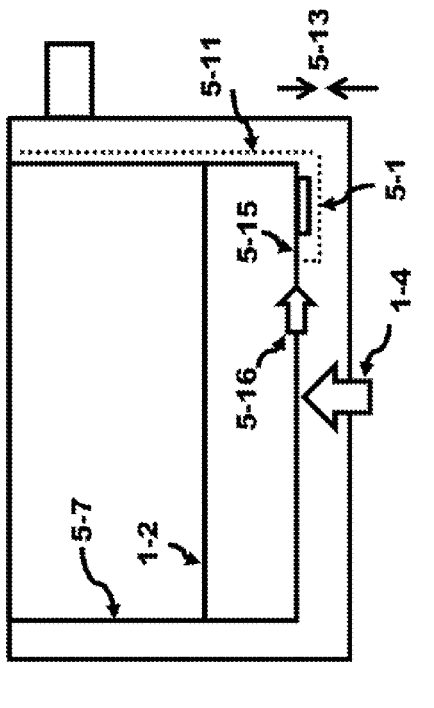
FIG. 5E illustrates a side cross-sectional view of the vessel with details of the channel and sensor of one embodiment in accordance with the present invention.
Figure 5F:
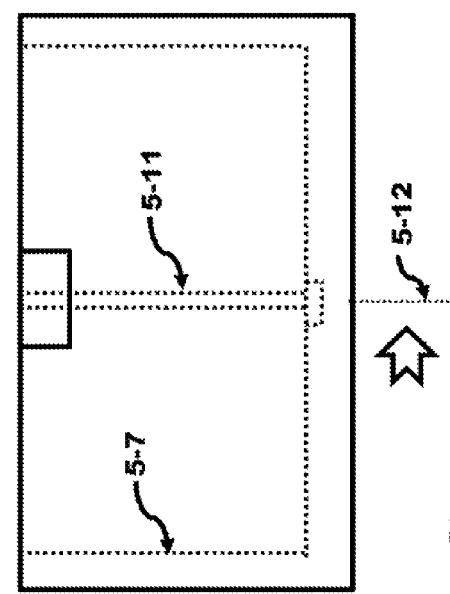
FIG. 5F shows a front cross-sectional view of the vessel with details of the channel and sensor of one embodiment in accordance with the present invention.

Another way of incorporating the sensor into the vessel is illustrated in FIG. 5E. Once the vessel is fabricated, a machine hones directly into this interior surface 5-7 of the vessel a channel, 5-11. The channel is then filled with an epoxy such that the sensor 5-1 and connection 5-14 are embedded within the epoxy. The surface of the epoxy is polished maintaining a surface that is contiguous with the original interior surface 5-7. Preferably the epoxy has a lower thermal conduct conductivity than that of the original vessel and/or the sensor is positioned closer to the interior surface. A side view along the dotted line 5-12 is illustrated by the arrow and provided in FIG. 5F.

The honed groove 5-11 is shown in relationship to the interior surface 5-7. Once the epoxy 5-15 is placed into the groove along with the sensor 5-1 and any interconnects (not illustrated), the sensor is placed as close as possible to the internal cavity of the vessel. This allows a gap 5-13 between the sensor and the original vessel and thereby minimizes the influence of the direct heat flow 1-4 from the heat source. The epoxy will still carry a portion of the original heat flow 5-16. Once the liquid 1-2 in the vessel evaporates, the temperature will increase and sensor 5-1 will send the information to the electronic control system in the handle (not illustrated) and disable the heat source. Sensors can also be placed in the groove along the side of the vessel.

Figure 6:
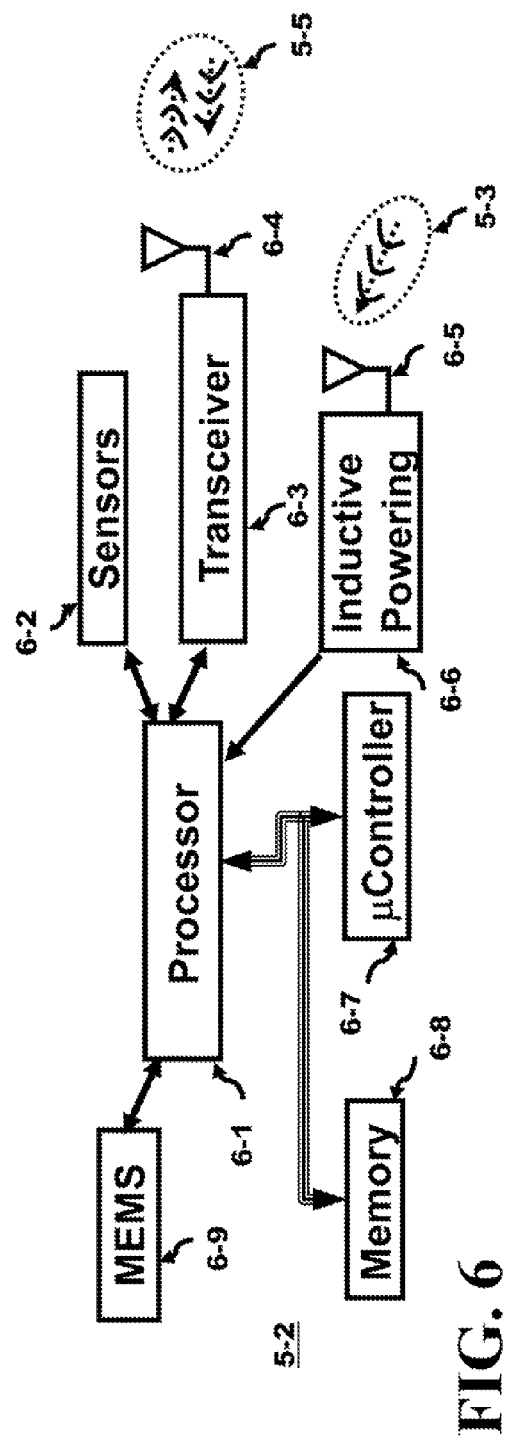
FIG. 6 depicts a block diagram representation of one version of an electrical system of one embodiment in accordance with the present invention.

A block diagram of one embodiment of the electronic control system 5-2 is illustrated in FIG. 6. A processor 6-1 is coupled to several blocks and allows communication and control between these blocks. The integrated circuit can have a microcontroller 6-7 which interfaces the processor 6-1 to the RF and wireless link. A local memory 6-8 and an external memory on a server (not shown) can be used by the processor 6-1. A micro electro mechanical system (MEMS) 6-9 and additional sensors 6-2 can be coupled to the processor 6-1. The transceiver 6-3 coupled to an antenna 6-4 interfaces with an external transceiver via the electromagnetic signal 5-S. Several transceivers can share this link by using various communication protocol techniques: time division multiplexing, frequency division multiplexing, CDMA, etc. The protocol of the signal carried within the electromagnetic signal 5-5 can be Wi-Fi, Bluetooth, WiGig, or any other standard IEEE type wireless interface. The system also contains inductive powering circuit 6-6 that receives the energy 5-3 via a coil 6-5 and prepares the energy into a DC format for delivery to the remaining components of the electronic control system.

Figure 7A:
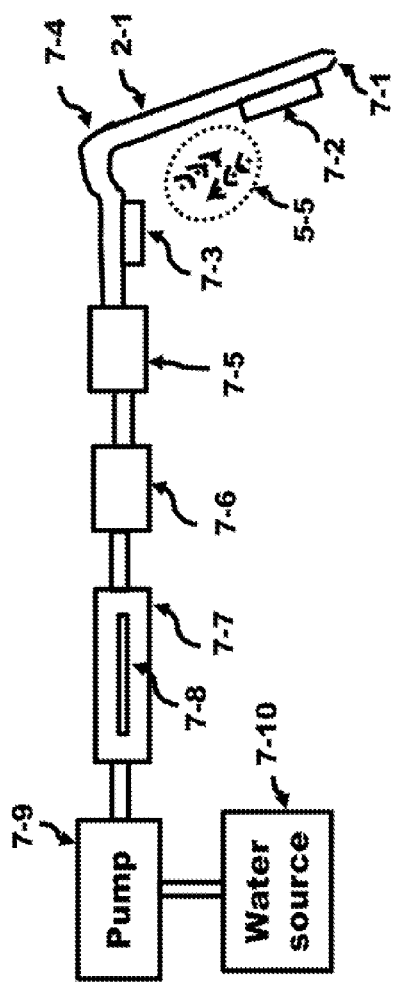
FIG. 7A illustrates a block diagram of one version of a steam/hot water generator system of one embodiment in accordance with the present invention.

FIG. 7A illustrates a system that generates steam which can emanate from the orifice 7-1 of the steam wand 2-1. The steam source couples a water source to the orifice of the steam wand. This system can be a part of the structure of a stove or can be a unit independent of the stove. A water source 7-10 which can be a local container of gravity fed water, a city water supply or ground water pumped from a well is coupled to a pump 7-9 via a tube. Another tube couples the pump to a heating cavity 7-7 containing a heating element 7-8. Various energy sources (electricity, gas, solar, oil, etc.) can be used to heat the heating element. The heating element transfers its energy to the water contained within the heating cavity. The water can then be either be transformed into hot water (liquid phase) or steam (gaseous phase). The pressure control unit 7-6 regulates the (steam or water) flow to the steam wand 2-1. A one-way valve 7-5 may be inserted into this path to prevent comestibles entering the steam wand 2-1 at the orifice 7-1 and contaminating the pressure control 7-6 and heating cavity 7-7. A tube assembly 7-4 is coupled between the heating cavity 7-7 and the steam wand 2-1. The tube assembly can be constructed from a flexible tube assembly, a rigid tube assembly, or a combination of the two. Any remaining tubes within the system can also be constructed from a flexible tube assembly, a rigid tube assembly, or a combination of the two. The rigid tube assembly is comprised of rigid tubes coupled together by rotational units. An integrated circuit 7-3 can be located near the steam wand 2-1 that may be battery powered. This integrated circuit 7-3 can communicate via the wireless interface signal 5-5 to a second integrated circuit 7-2 located on the steam wand 2-1. The integrated circuit 7-3 would not be immersed into the liquid and may have physical wires coupled to the circuit to provide power to the chip. An inductive coil associated with the integrated circuit 7-3 can be used to power the integrated circuit 7-2. Eliminating physical wires, allows the steam wand 2-1 to be easily removed from the tube assembly 7-4 for cleaning.

However, the RF source and integrated circuit 7-3 can be eliminated by insuring a physical interconnect can be made to the integrated chip 7-2 for power transfer and signal transfer capability. The interconnect can be embedded within body of the steam wand 2-1 or printed on the interior/exterior surface. A coupling unit (not shown) can be used to couple the steam wand 2-1 to the tube assembly 7-4. The interconnect can be completed once the coupling unit is connected together completing the circuit. This way the interconnect would not be exposed to the environment and the steam wand 2-1 can be removed for easy cleaning.

The integrated circuit 7-2 located near the orifice 7-1 can sense the temperature, for example, of the liquid in the vessel once the steam wand is inserted into the liquid and relay this temperature and other potential conditions measured in the liquid depending on the type of sensors incorporated into the integrated circuit 7-2. This information can be relayed to the system either over the interconnect or via a wireless transfer to integrated circuit 7-3 which is not inserted to the liquid but within RF contact.

One embodiment is if the liquid drops below a certain level, this information can be transferred back to the system to disabled the heat source, whether the heat source is steam or flame. This is a protection scheme that prevents the vessel from being damaged and keeping house fires at a minimum. A message can be sent to the user via email, text, or phone to let user know the status of any dangerous conditions.

Another embodiment is to monitor the temperature of the liquid in the vessel and maintain the liquid at some given constant temperature below 100° C. or at 100° C. The steam wand 2-1 can be used to sense the temperature of the liquid and convey this information back to the system which then communicates with the heating systems to control the various heat sources being applied to the liquid such that the temperature of the liquid is maintained at a near constant level. Short cooking times help preserve essential amino acids in a number of comestibles. This has features in several aspects, for example, milk would no longer be scorched to the pan instead the system automatically controls and monitors the temperature of milk in the vessel being heated and maintains it at the particular temperature that the user prefers. This way hot cocoa can be generated at exactly the temperature that the user desires. Certain fruit may need to be coddled at a constant temperature to lock in the goodness, firmness, and nutrition of the fruit using this technique. An intelligent electronic control system can be used to automatically control when the heat sources apply heat to the vessel to control the temperature of the liquid.

Another embodiment is to monitor the height of the liquid in the vessel by the sensors in several integrated circuits 7-2 distributed along the steam wand 2-1. These measurements can be used to maintain the liquid at some given constant height independent of temperature. The steam wand 2-1 or a similar component (an example with be illustrated later) can be modified to introduce water into the vessel as the liquid is being cooked. The water can be temperature adjusted to the current temperature of the liquid or to any temperature desired before being added to the liquid in the vessel.

The heat sources applied to the vessel would be a combination of the heat conduction that is applied to the exterior of the vessel transferring at the interface 2-9 and the heat transfer occurring in the fluid via the steam emanating from the orifice 7-1. Both of these heat sources can be controlled by the system to cook or heat a particular comestible that the individual desires. Furthermore, an intelligent electronic control system can interface to the Internet and access particular cooking directions for various comestibles. The Internet relays those cooking directions to the intelligent electronic control system of the unit and issues cooking instructions. This has several advantages in that the user does not have to program the timing of how to cook the a particular comestible, instead the user selects from a variety of cooking instructions from either the Internet or local memory based on the contents within his vessel. Thus, once the user fills his vessel with liquid and comestibles, the menu database from the Internet is accessed which will provide the cooking instructions and the Internet would send the cooking directions to be downloaded to the intelligent electronic control system. Simultaneously, the Internet can send the user a wireless text or a message over the phone. In addition, with the safe guards of protecting and the liquid has evaporated, the system will automatically shut down and also send a message to the user that they will not be eating today.

Figure 7B:
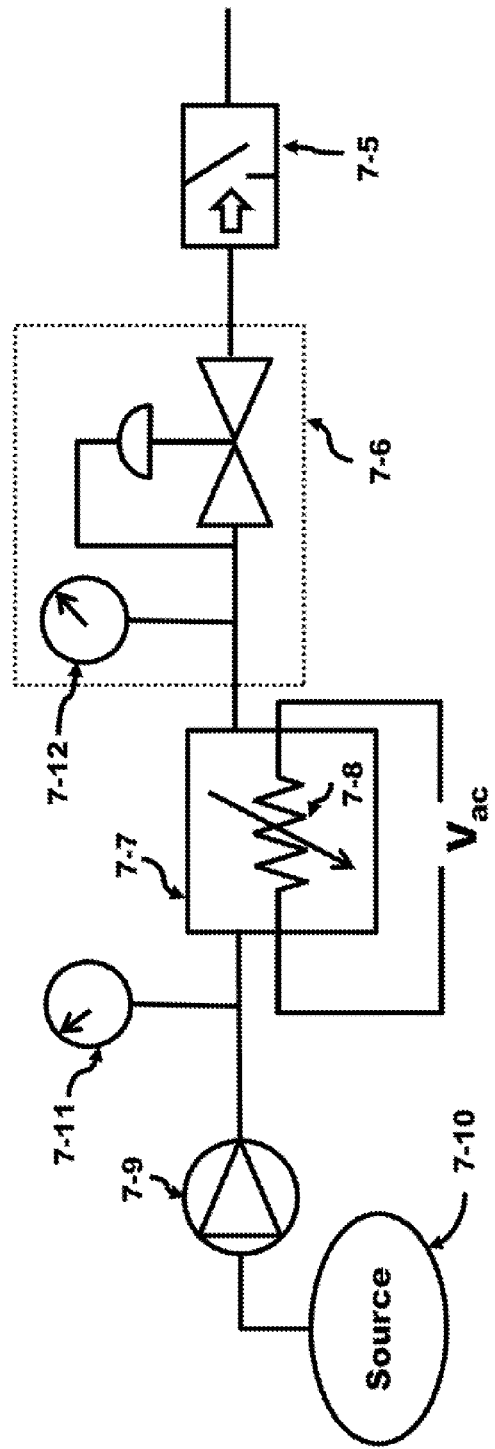
FIG. 7B illustrates a symbolic diagram of one version of a steam/hot water generator system of one embodiment in accordance with the present invention.

FIG. 7B illustrates the symbolic representation of the block diagram provided in FIG. 7A. A source 7-10 of water is coupled to a pump 7-9. The pump 7-9 maintains a pressure in the chamber 7-7. A pressure control 7-6 is illustrated at the output of the chamber 7-7. Different configurations are also possible, for example, a second pressure control can be placed in series between the pump 7-9 and the chamber 7-7 to refine the pressure control within the system. A temperature sensor 7-11 and a pressure sensor 7-12 measure the parameters within the chamber 7-7. The chamber 7-7 in turn heats the water and/or steam by a heating element 7-8 which is heated by applying an electrical voltage to the leads of the heating element. Gas or any source of heating can be used as well. A one-way valve 7-5 can be placed in the path between the pressure control and the vessel to prevent any comestibles from entering the chamber 7-7. The chamber 7-7 has a known volume, and the temperature and pressure can be monitored by the sensors 7-11 and 7-12, respectively. This provides enough data to determine how to heat the water from the source into either hot water or steam. This information can be applied to the intelligent electronic control system described next to obtain automatic control of the system.

Figure 8:
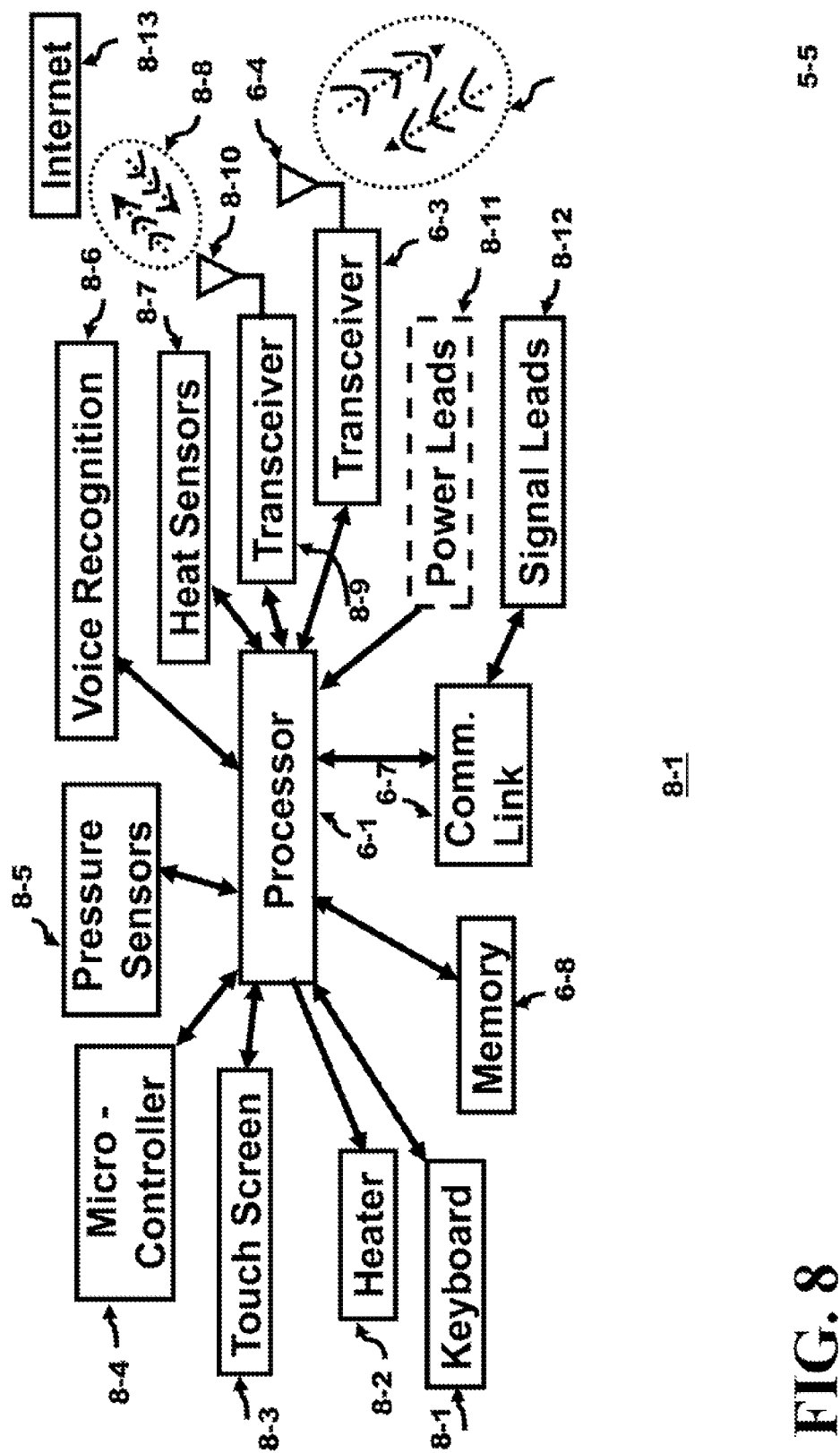
FIG. 8 depicts an intelligent electronic controls system block of one embodiment in accordance with the present invention.

The intelligent electronic control system 8-1 is illustrated in FIG. 8. Inside this block are various components as the illustrated in FIG. 8. A microprocessor 6-1 which itself may consist of a multiprocessor, DSP, and the microcontroller interfaces to various other components. The unit will have this intelligent electronic control system 8-1 and provide locations for touchscreen 8-3, a keyboard 8-1 which may be implemented on the touchscreen or a separate keyboard. A voice recognition unit 8-6 able to receive instructions from the user. An audio interface to communicate with the user. Various pressure controllers and sensors 8-5 and 8-7 can be placed within the water lines and within the gas lines. The electrical heat sources 8-2 provide heat to the vessels. Microcontrollers 8-4 can be used to control any physical systems that may be incorporated into the unit, such as, opening the oven door, controlling the flow of gas to a flame, adjusting the electronic heating, or adjusting the steam rate within each of the steam wands, etc. A local memory 6-8 that stores the operation system (OS) of the unit and data useful for cooking: menus, cooking styles, suggestions for meals, past meals, etc. A communication link 6-7 which can be used to interface to the Internet 8-13 via the transceiver 8-9 and antenna 8-10 by communicating wirelessly over the channel 8-8. The electronic control system can transfer information to the Internet and receive information from the Internet. The communication link can also be hard wired directly to signal leads 8-12 and make physical contact with an exterior network that can then couple to the Internet 8-13. Power leads 8-11 are available to provide power to the unit. These leads can be connected to a wall outlet or a portable power source such as a generator or battery. Transceivers 6-3 would be provided at various locations within the unit coupled to antennas 6-4 so that local wireless signals 5-5 can communicate with the various vessels that may be on or in the vicinity of the unit. The intelligent electronic control system 8-1 of the unit controls and monitors the operation of the unit and can communicate with either the Internet or the user via a wireless link to the vessels.

Figure 9:
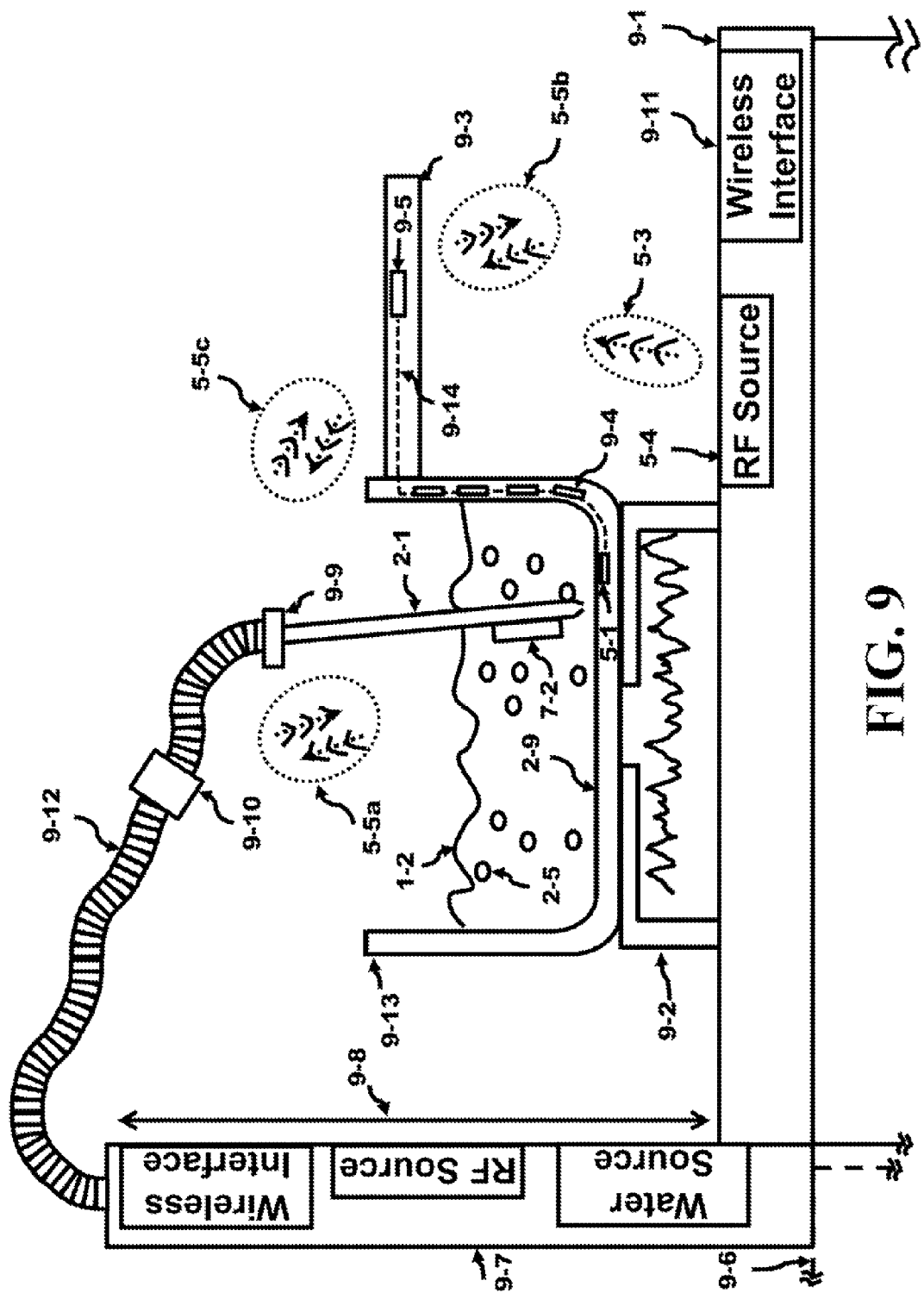
FIG. 9 presents a side cross-sectional view of a stove heating a liquid in a vessel using the application of gas (flame) and steam heating where the steam is applied using a flexible tube assembly of one embodiment in accordance with the present invention.

A cross sectional view of one of the units, in this case on a stove 9-1 is illustrated in FIG. 9. This stove can contain a grill 9-2 to hold various types of vessels over a heat source. A flame 1-3 is applied to the vessel 9-13 with a handle 9-3 which contains comestibles and has a liquid level of 1-2. The common interface 2-9 of the vessel transfers the heat from the heat source into the liquid via conduction generating steam at the interface 2-9 creating steam bubbles 2-5. Simultaneously, the steam wand 2-1 is providing another heating source of its own through the generation of steam bubbles 2-5 from the steam wand 2-1. The steam wand contains the previously mentioned integrated circuit 7-2 measuring the characteristics of the liquid and communicates that information via the wireless interface 5-5*a* to a transceiver located within a collar 9-10 placed on the flexible tube assembly 9-12. Then, the collar 9-10 communicates with the system via a physical wire interface embedded within the flexible tube assembly 9-12 or through a different wireless interface (not illustrated). The vessel 9-13 can contain sensor 5-1 and additional sensors 9-4 in the interior of the vessel. The sensors can communicate over an electrical bus 9-14 with the integrated circuit 9-5 located in the handle 9-3 of the vessel. The integrated circuit 9-5 communicates via the wireless channel 5-5*b* using the wireless interface 9-11 in the stove 9-1. Simultaneously, the integrated circuit 9-5 receives power or energy from an RF source 5-4 via the wireless transmission 5-3. The integrated circuit 9-5 can also communicate with the system via 9-10 by the wireless interface connection 5-5*c*. The steam wand 2-1 provides steam to the liquid 1-2 and is coupled to a flexible tube assembly 9-12 via a detachable coupling unit 9-9. The detachable coupling unit allows the steam wand to be easily detached from the tube assembly. The flexible tube assembly 9-12 is flexible but holds itself into the position formed by the user.

The source of the steam can be within the backstop unit 9-7, the backstop unit 9-7 can be an integral part of the stove 9-1. The height 9-8 of the backstop unit 9-7 provides a backstop surface for the stove and the surface offers a potential location for the placement of a display screen coupled to the electronics system. Another possibility is for the backstop unit 9-7 to be independent of stove 9-1 where the backstop unit 9-7 can be located on some surface 9-6 closely coupled to the stove 9-1. This combination of co-locating these two units together allows a stove already in the home to take full advantage of the innovative steam concept without the need for the user to purchase a completely new stove that combines these two features. The steam backstop unit 9-7 can contain a water source and the ability to steam heat the water using a system as indicated in FIG. 7. The backstop unit 9-7 also contains a wireless interface to communicate with all of the local components in the vicinity of the unit and the Internet as well.

Figure 10A:
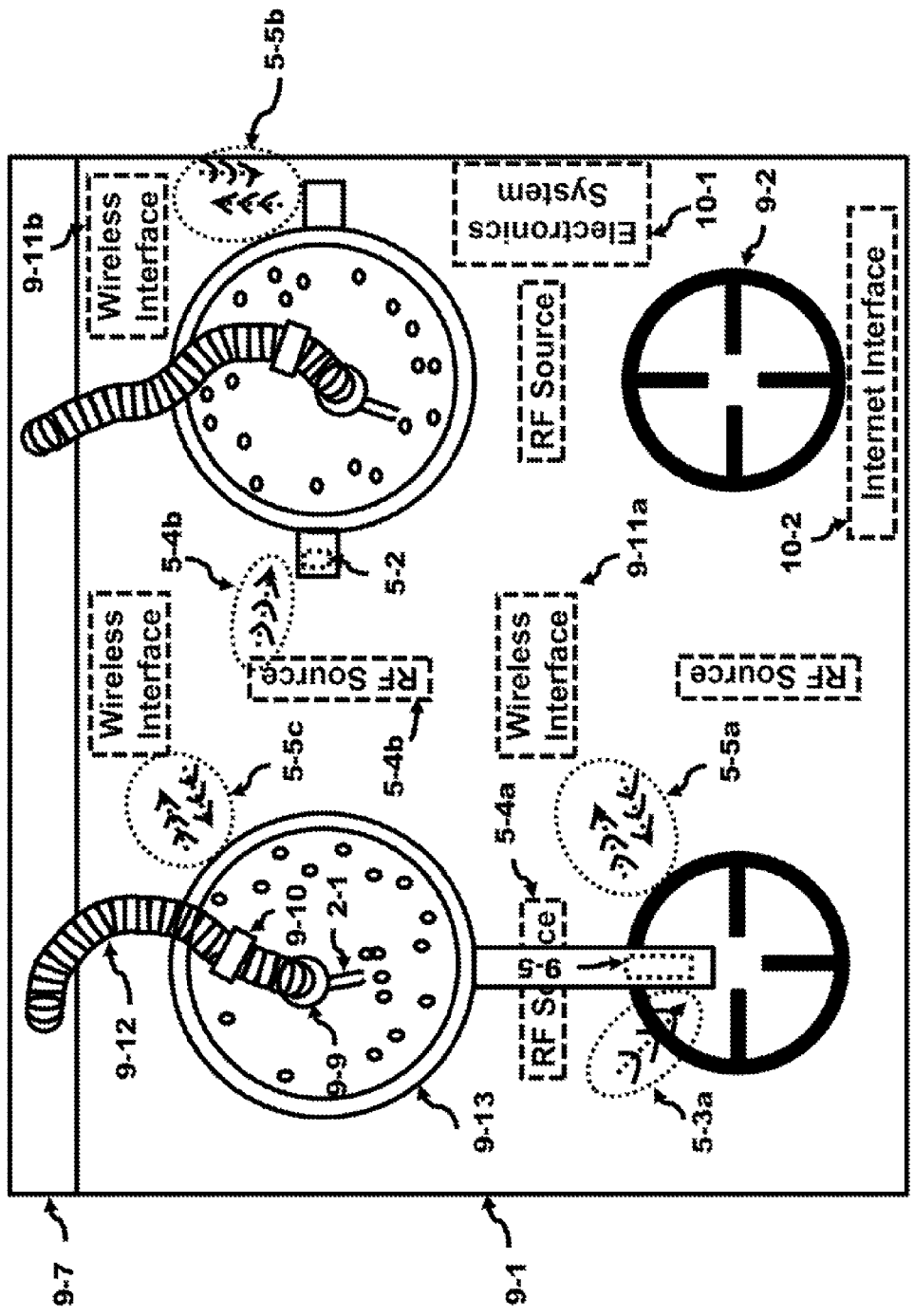
FIG. 10A depicts a top view of a stove heating a liquid in a vessel using the application of gas (flame) and steam heating where the steam is applied using flexible tube assemblies of one embodiment in accordance with the present invention.

A top view of this stove in FIG. 9 is presented in FIG. 10A. The stove has the grills 9-2 and a typical appearance of a stove with several exceptions, one being the flexible tube assemblies 9-12, which couple steam into the vessels placed on the grills. The steam source in the backstop unit 9-7 for this illustration can be an integral part of the stove. The flexible tube assembly has a wireless collar 9-10 and a detachable coupling unit 9-9 so that the steam wand 2-1 can be removed and cleaned. The stove has a new appearance from that of the conventional stove in that the flexible tube assembly can be manipulated by the user and placed into the various vessels, some of which some can be on the grill. Other vessels can be placed to the side of the stove and heated if desired. These flexible tube assemblies can be removed from the vessel and formed into stable shapes placed out of the way from the users and the vessels.

These stable shapes can be held in place by the construction of the flexible tube assemblies 9-12 where frictional forces between the elements of the tube hold the tube in a given form. These flexible tube assemblies 9-12 can be formed from concentric metallic cylinders that are friction coupled together allowing the user to form various shapes of the tubes such that the shapes are held in position by the friction between the cylindrical components. The flexible tube assembly can carry the steam to the steam wand 2-1 or a secondary tube can be placed within the flexible tube assembly to carry the steam to the orifice at the steam wand 2-1.

This stove provides the user a new feature which previous users of the stove have not experienced. First, the aesthetic look of the stove with the tubes is an enticing new appearance. These tubes provide steam that can be used to heat liquids much quicker. Now, the user of the stove does not have to wait for liquids to heat up in the conventional sense any longer. The liquids heat significantly faster when steam is applied to the liquid and if the user desires to stand by and wait till the boiling point is achieved, the user will spend much less time waiting for a liter or two of liquid to reach a given temperature. In addition, the ability to connect to the Internet that can provide cooking instructions directly to the stove, allows the user to program his meal and walk away. The food will be cooked exactly as desired and automatically based on the temperature monitoring of the steam wand and/or of the vessel itself and compare those temperatures and times to a given recipe that has been extracted from a local library stored within the unit or obtained from the Internet.

The Internet can even suggest meals or become more particular and suggest meals based on the contents of the comestibles in the home. The Internet can monitor the refrigerator, pantry, and other storage locations where comestibles are stored. Based on the contents that the user has stored in the home, in the cafeteria, etc. the Internet will suggest menus to the user. The Internet will provide a vast surplus of menus and directions of cooking that can be downloaded to program the stove. Then, the user can peruse the menus and select the cooking of those menus desired by of the user.

The surface of the stove will contain various wireless interfaces and RF source interfaces to provide communications to the vessels and to provide power to the vessels, respectively. The RF source 5-4*a* and 5-4*b* along with the others that not labeled can be used to power the electronics embedded within the vessels. A particular RF source can be disabled if a vessel is not place in the vicinity of the RF source to save power if a wireless handshake between the vessel and the RF source is not established. For example, RF source 5-4*a* powers electronics 9-5 in the handle of vessel 9-13 while a second RF source 5-4*b* powers the electronics 5-2 in the handle of the other vessel. The remaining RF sources can be disabled, if desired, to save power dissipation. A wireless interfaces 9-11*a* and 9-11*b* can communicate to the electronics in the handles and via the wireless paths 5-5*a* and 5-5*b*, respectively.

The electronics system 10-1 responds or issues commands with all of the wireless interfaces using the corresponding wireless link. The RF sources and wireless interfaces can be embedded within the stove as long as the antennas are not blocked by a shield. The shield can be a barrier typically having low electrical resistivity, and is typically metallic in nature. An electromagnetic transparent material, for example, plastic, glass, Pyrex, wood, etc., can be integrated with the surface of the stove such that antenna is placed on or embedded within the electromagnetic transparent material. The surface of the electromagnetic transparent material can match the surface level of the remaining portion of the stove and these electromagnetic transparent material components can add an aesthetic value to the look of the stove.

The electronic control system can be contained within the stove and a display interface to the electronic control system may be located on any surface of the stove. Some possible locations would include the top surface of the stove as indicated by the electronic control system 10-1, where a keyboard/display unit would be visible. Another location would be on the side surface of 9-7 which can present a keyboard/display unit. Another feature of the stove is that an APP can be used to program the stove using a smart phone. In this case, the user would prepare their meal in the morning and transfer the instructions to the stove, and the program can be enabled while the user is at work. The user can also instruct the stove wirelessly using the smart phone. This way, the comestibles will be properly cooked and ready when the individual arrives home.

Figure 10B:
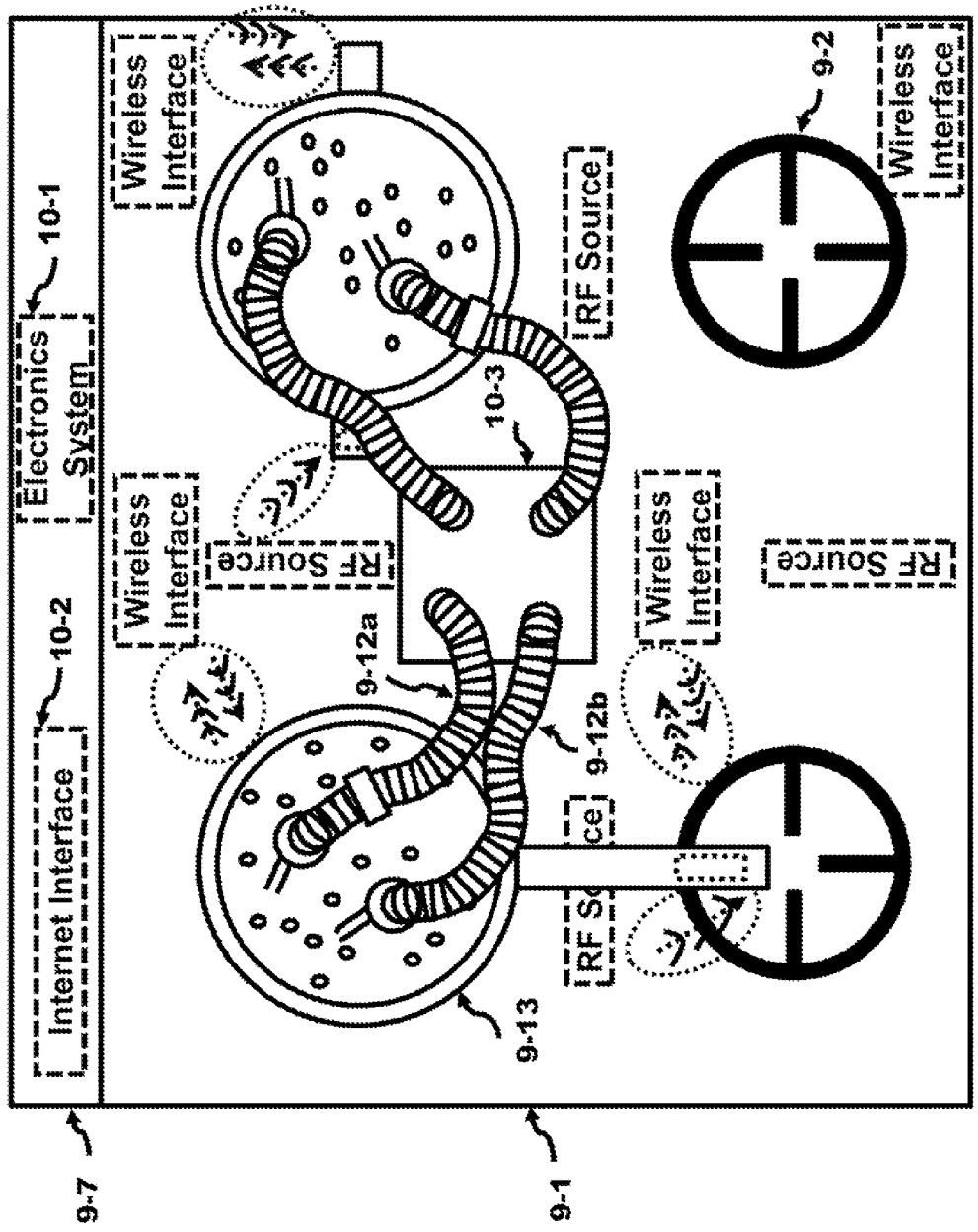
FIG. 10B shows a top view of a stove heating a liquid in a vessel using the application of gas (flame) and steam heating where the steam is applied using two or more flexible tube assemblies in a single vessel of one embodiment in accordance with the present invention.

The layout of the stove presented in FIG. 10A is one of many possible layout schemes. Another is illustrated in FIG. 10B. The flexible tube assemblies 9-12*a* and 9-12*b*, instead of emanating from the backstop unit 9-7, emanate from the center of the stove 9-1 on the platform 10-3 between the four grills 9-2 as depicted in FIG. 10B. The tubes are easily accessible to any vessel placed any of the grills. This conveniently allows coordinating several flexible tube assemblies to be associated with one vessel thereby placing their steam wands into the liquid of a single vessel. For example, the steam wands at the end of flexible tube assemblies' 9-12*a* and 9-12*b* are placed inside the liquid of vessel 9-13. With more steam wands placed into the liquid, the liquid can be heated quicker than when just using a single steam wand. In addition, the placement of the RF sources and wireless interfaces illustrates one of many possibilities. The internet interface 10-2 and intelligent electronic control system 10-1 are now located in the backstop unit 9-7.

Figure 11A:
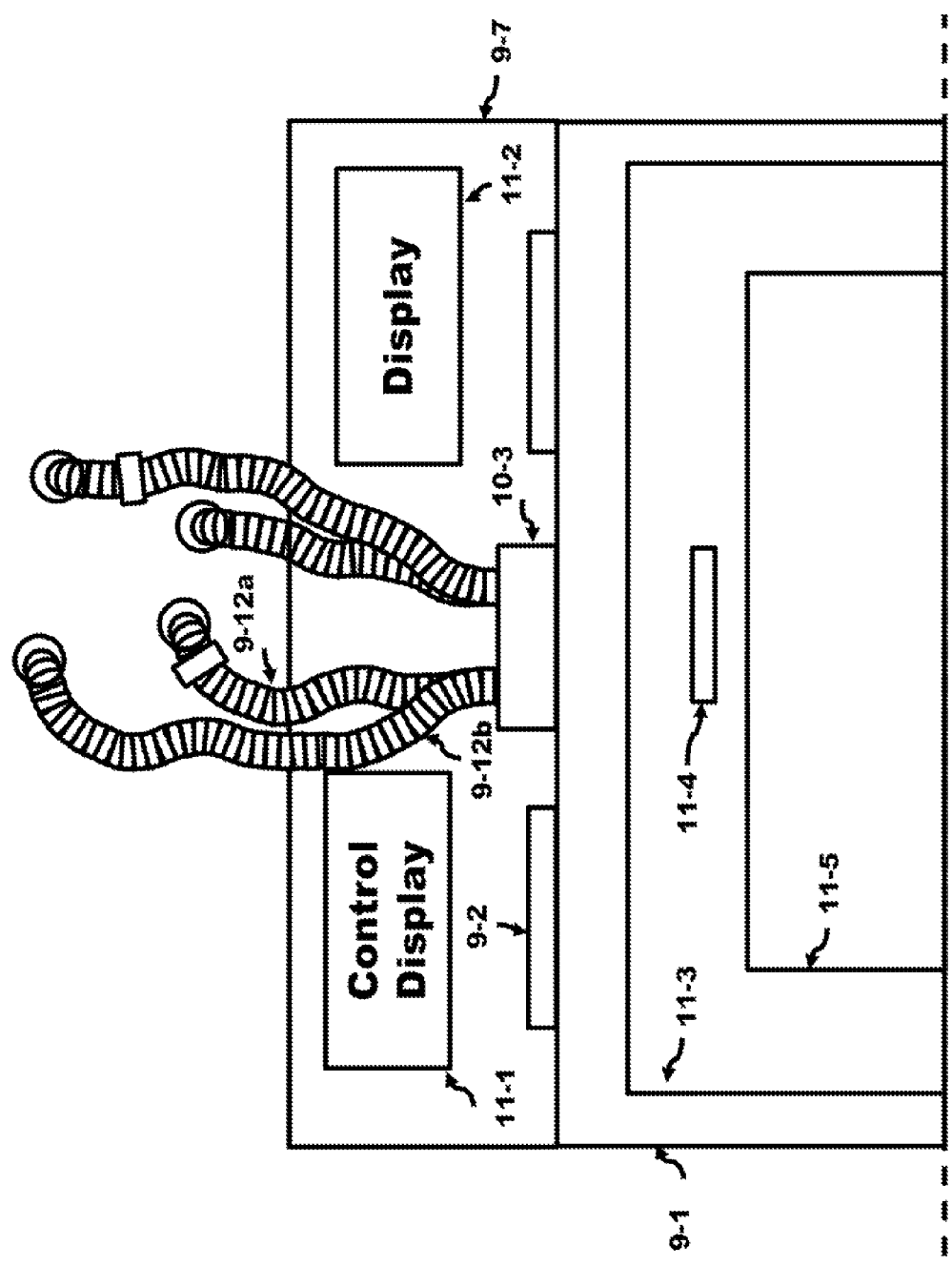
FIG. 11A presents a front view of a stove where two or more un-used flexible tube assemblies can be positioned of one embodiment in accordance with the present invention.

FIG. 11A illustrates a front view of the stove. The system consists of the stove 9-1 and the backstop unit 9-7. The stove has a handle 11-4 connected to the door 11-3 which contains a transparent window 11-5 to view the contents of the oven. A side view of the grill 9-2 and a platform 10-3 are located on the surface of stove. The platform is located in the center of the stove and is shown as being raised slightly from the surface of stove. Emanating from the platform are four flexible tube assemblies; for example, 9-12*a* and 9-12*b*. All four tubes are currently not being used and are shaped to be out of the way of the vicinity of the grills. The backstop presents a control display 11-1 and a display screen 11-2 displaying a webpage that may contain recipes.

Figure 11B:
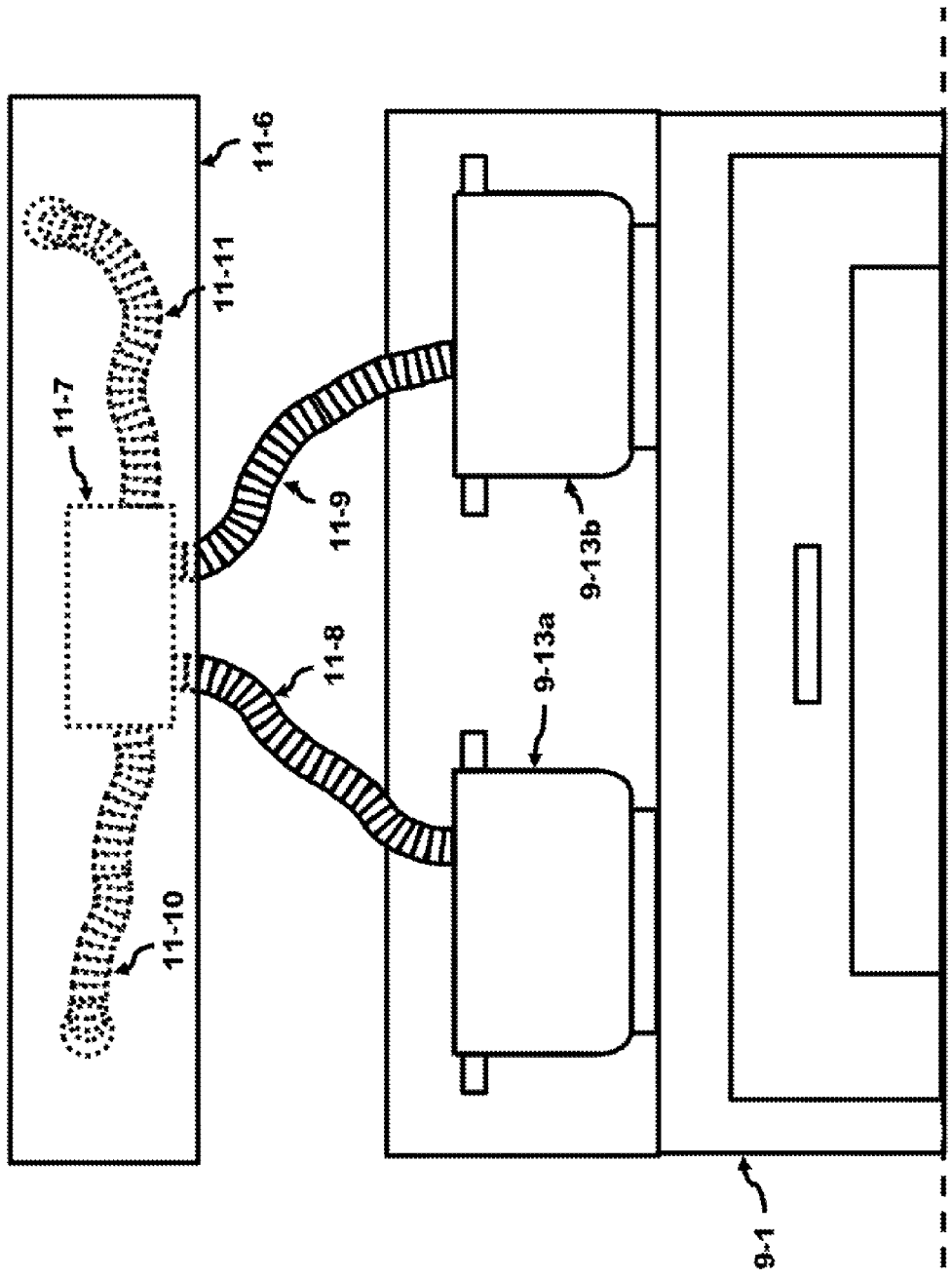
FIG. 11B depicts a front view of a stove with a hood that sources two or more un-used flexible tube assemblies can be positioned out of view when not used of one embodiment in accordance with the present invention.

FIG. 11B illustrates a hood 11-6 positioned over the stove 9-1 with a distribution unit 11-7 coupled to four flexible tube assemblies 11-8 through 11-11. The tubes 11-8 and 11-9 are providing a steam stream to vessels 9-13*a* and 9-13*b*, respectively. These vessels are located on the grills of the stove 9-1. The hood offers the ability to place the tubes out of sight, if desired.

Figure 12A:
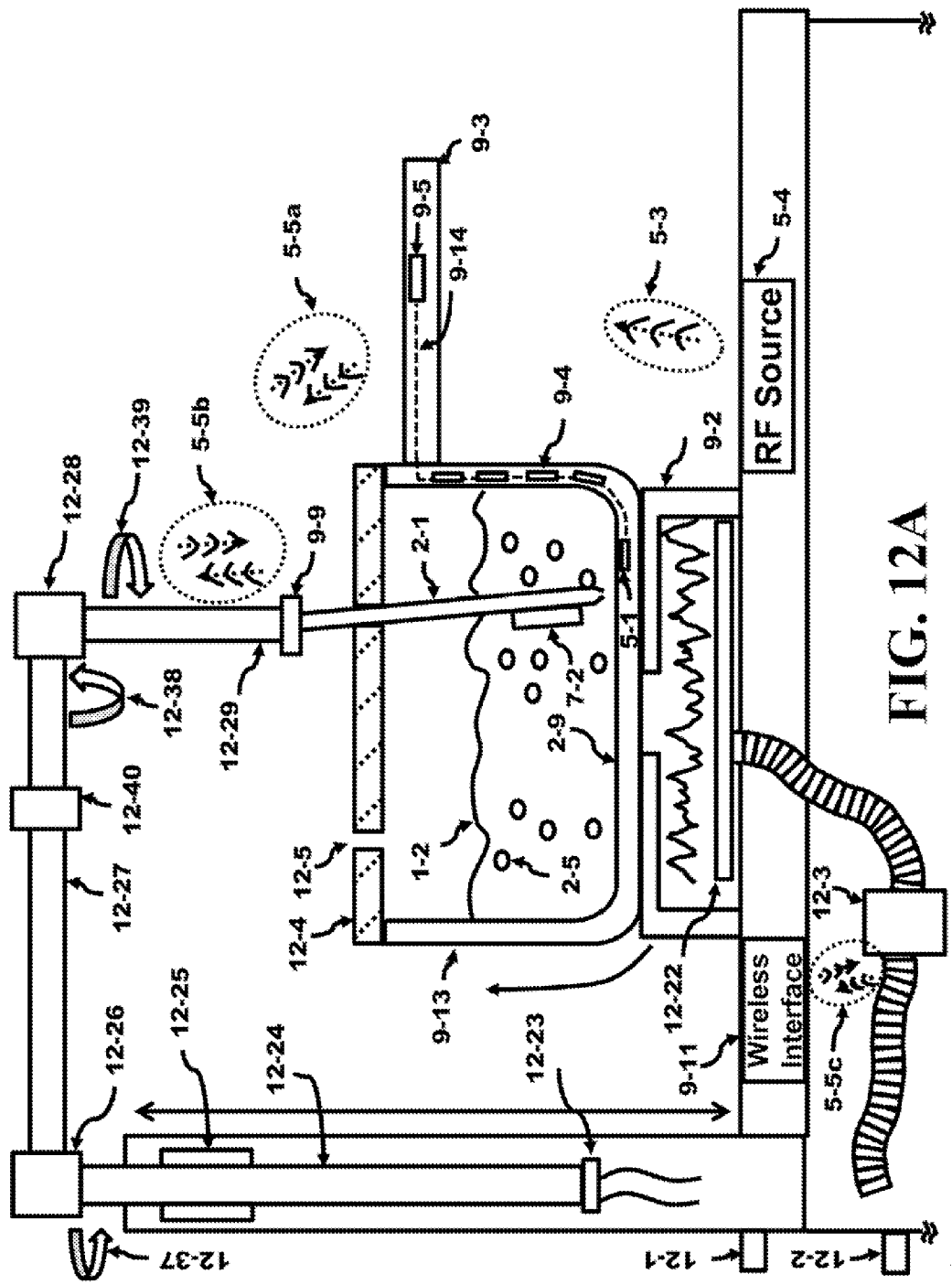
FIG. 12A illustrates a side cross-sectional view of a stove heating a liquid in a vessel using the application of gas (flame) and steam heating where the steam is applied to a vessel with a lid using a rigid tube assembly of one embodiment in accordance with the present invention.

FIG. 12A replaces the flexible tube assemblies with rigid tubes coupled by rotational units. The rotational unit allows each of the two rigid tubes coupled to the rotational unit to rotate along the tube's axis. This flexibility allows the steam wand 2-1 to be moved, positioned, and easily placed into a vessel. The rotational units 12-26 and 12-28 couple the rigid tubes 12-24, 12-27, and 12-29 to the steam wand 2-1. The rigid tube 12-24 is held in place by a frictional collar 12-25. The collar 12-25 allows the tube 12-24 to be adjusted in a higher and lower position by a user while the frictional forces of the collar 12-25 hold the tube in place. The end of this tube has a connector 12-23 that is coupled to a flexible tube assembly. This flexible tube assembly is coupled to the steam generating unit. The water coupled to the steam generating unit can be provided via a connection 12-1 to an external water source. The other end of tube 12-24 is coupled to the first rotational unit 12-26. The first rotational unit allows each tube connected to it to rotate around the tube's center of axis. One of two possible rotations of tube 12-24 is illustrated by the arrow 12-37. The first rotational unit 12-26 is connected to a second rotational unit 12-28 by a rigid tube 12-27. One of two possible rotations of tube 12-27 is illustrated by the arrow 12-38. The second rotational unit allows each tube connected to it to rotate around the tube's center of axis. One of two possible rotations of tube 12-29 is illustrated by the arrow 12-39. The last rigid tube 12-29 is connected to a detachable coupling unit 9-9. Finally, the steam wand 2-1 is coupled to the detachable coupling. The flexibility of the two rotational units and the frictional forces by the collar 12-25 applied to the tube allows the steam wand to be easily moved into various locations for easy placement into a given vessel on a grill.

The cross sectional view illustrated in FIG. 12A illustrates a vessel incorporating a lid 12-4. The lid 12-4 can contain an opening 12-5. The opening is used to allow relieves the buildup of pressure of steam being built up within the vessel 9-13 since there can be two sources of steam generation developed within the vessel: conduction to the interface surface 2-9 of the heat due to the flame and steam heating introduced by the steam wand 2-1. The steam wand 2-1 in this depiction is held in place by the lid. The integrated circuit 7-2 can be placed on or be embedded within the steam wand. This stove contains a grill 9-2 supporting a vessel 9-13 over a heat source of a burner 12-22. The burner is coupled by a gas tube to an enabling unit 12-3 that may be wirelessly controlled via wireless interface 9-11 transmitted over a wireless channel 5-5c. This control can also be transferred by physical wires. The enabling gas unit 12-3 enables or disables the flow of gas to the burner from an exterior source 12-2 through a tube. Thus, the gas flow to the burner 12-22 can be enabled and disabled as controlled by the intelligent electronic control system of the stove. When the gas is enabled, the flame is applied to the vessel 9-13 which can contain comestibles with a liquid level of 1-2. The common interface 2-9 of the vessel transfers the heat from the heat source into the liquid via conduction generating steam at the interface 2-9 creating steam bubbles 2-5. Simultaneously, the steam wand 2-1 is providing another heating source of its own through the generation of steam bubbles 2-5 emitted from the orifice of the steam wand 2-1. The steam wand contains the previously mentioned integrate circuit 7-2 measuring the characteristics of the liquid and communicates that information via the wireless interface to a transceiver located within a collar 12-40 placed on the rigid tube 12-27. To allow the wireless communication to propagate through the lid, the lid 12-4 is constructed from a material that allows the propagation of electromagnetic radiation. A lid fabricated of glass or Pyrex, for instance, would allow the propagation. The collar 12-40 can communicates with the control system via a physical wire interface embedded within the rigid tube 12-27 or through a wireless interface (not illustrated) coupling the collar to the system. The vessel 9-13 can contain sensor 5-1 and additional sensors 9-4 in the interior of the vessel. The sensors can communicate over an electrical bus 9-14 with the integrated circuit 9-5 located in the handle 9-3 of the vessel. The integrated circuit 9-5 communicates via the wireless channel 5-5a to the collar 12-40. Simultaneously, the integrated circuit 9-5 receives power or energy from an RF source 5-4 via the wireless transmission of energy 5-3. The steam wand 2-1 providing steam to the liquid 1-2 and is coupled to a rigid tube 12-29 via a detachable coupling unit 9-9.

Figure 12B:
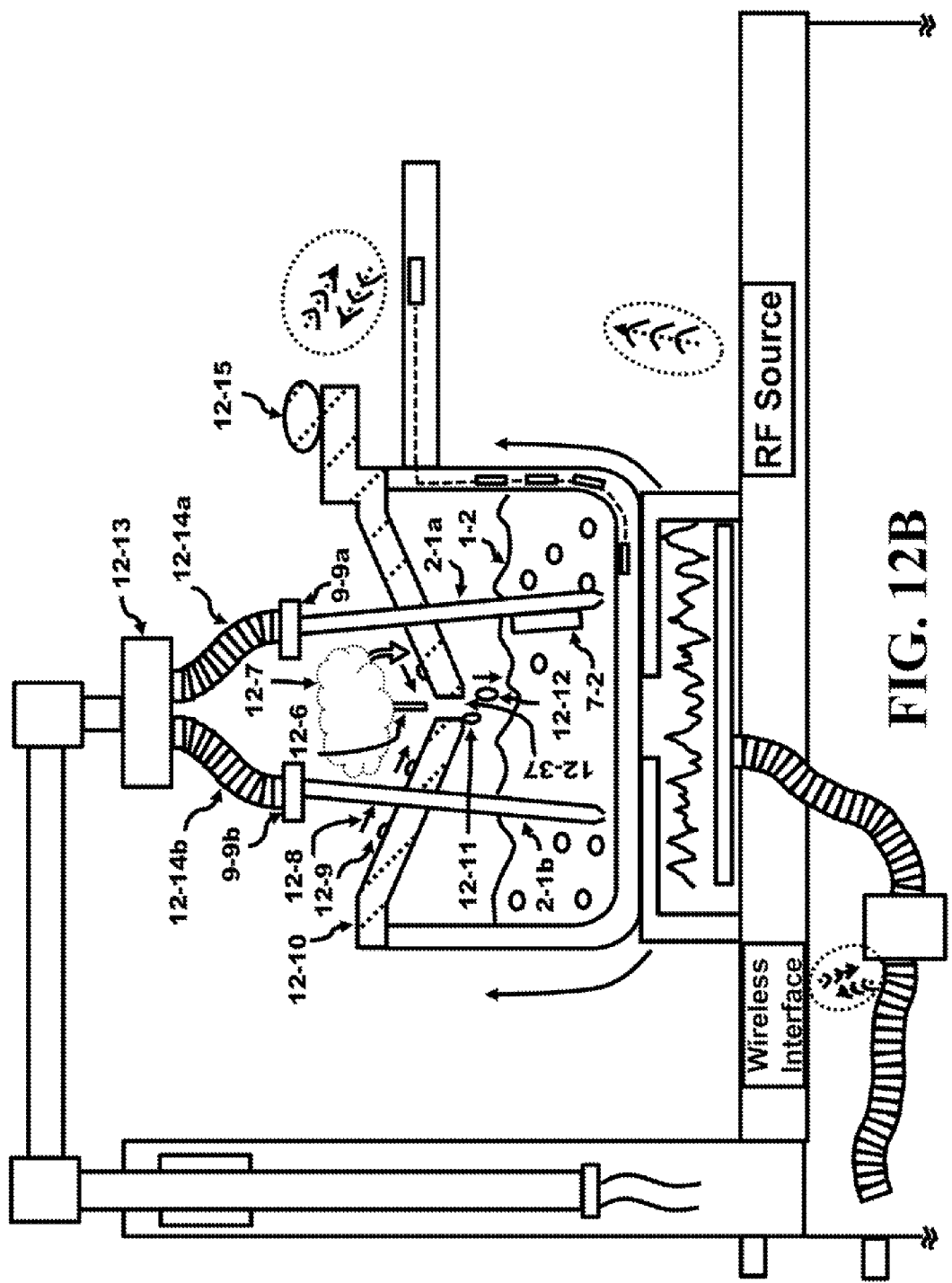
FIG. 12B shows a side cross-sectional view of a stove heating a liquid in a vessel using the application of gas (flame) and multiple steam heating where the steam is applied to a vessel with a concave lid using a combination of flexible tube assemblies and a rigid tube of one embodiment in accordance with the present invention.

FIG. 12B illustrates a vessel with a concave down lid 12-10. The lid has a handle 12-15 allowing the user to remove the lid. This lid creates a closed volume within the vessel. As pressure builds up within the volume, the steam exits the volume via an opening 12-37 in center of the lid 12-10. The concave down construction allows some of the steam 12-7 escaping from the vessel to recirculate 12-6, to condense on the lid and to return back to the liquid inside of the vessel. After the steam leaves the volume through the opening 12-37, some of the steam condenses as drops 12-9 on the lid 12-10. These drops then flow 12-8 down the lid by gravity combine and join together as forming drops 12-11 near the opening 12-37. At some point the force of gravity on the mass of the forming drop 12-11 exceeds the surface tension holding the forming drop to the lid, and the forming drop detaches and becomes a falling drop 12-12 returning back to the liquid 1-2. This condensation of the recirculating steam allows some of the ejected steam to return to the vessel. This return flow offers the user the possibility of placing seasonings on the surface of the concave down portion of the lid which can be used to flavor the liquid. The lid 12-10 also positions and holds two steam wands 2-1a and 2-1b in place. The steam wands are connected to the detachable couplings 9-9a and 9-9b, respectively. The detachable couplings, in turn, are coupled to the two flexible tubes 12-14a and 12-14b. A coupling unit 12-13 joins the flexible tubes to a rigid tube. If one or both of the steam wands contains an integrated circuit 7-2, RF communication can occur between the integrated circuit 7-2 and the coupling unit 12-13.

Figure 12C:
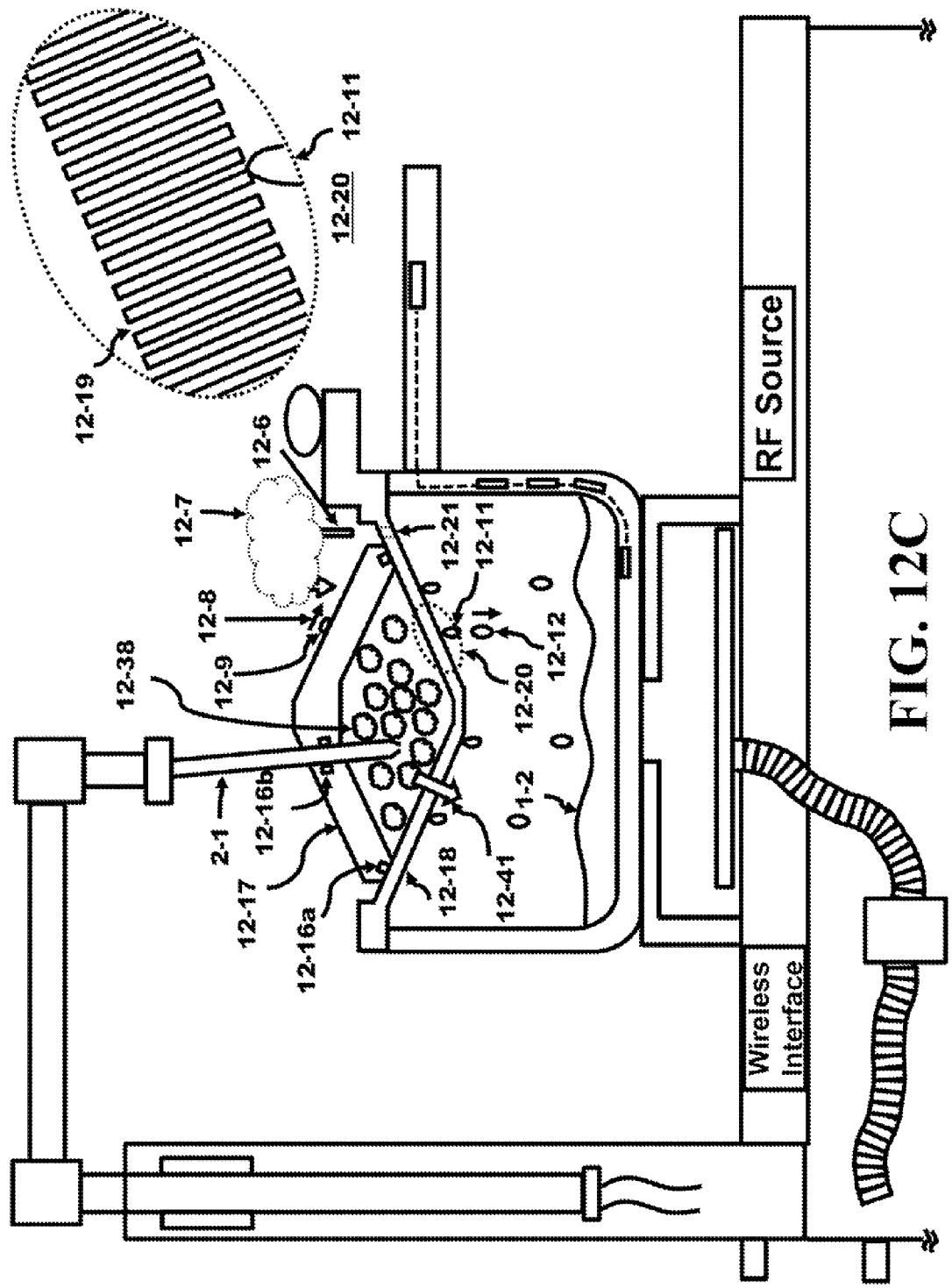
FIG. 12C presents a side cross-sectional view of a system extracting contents of a comestible and/or preparing a comestible within a cooking cavity of a vessel using steam heating where the steam is applied to a vessel with a porous lid using a rigid tube of one embodiment in accordance with the present invention.

FIG. 12C illustrated a cooking cavity formed between a lower lid 12-18 and an upper lid 12-17. The lower lid 12-18 covers the vessel. The upper lid has O-ring within the groove 12-16a sealing the upper lid 12-17 to the lower lid 12-18. The upper lid is also locked with the lower lid (not illustrated). For example, the upper lid can be screwed in place, latched in place with a latching mechanism, clipped in place with a clipping mechanism, snapped in place, screwed in place, or bolted in place. All of these mechanisms would preferably have the feature of being able to be quickly assembled or disassembled. The second lid also has a second O-ring within the groove 12-16b sealing the steam wand 2-1 to the upper lid 12-17. Comestibles 12-38 can be placed within the cooking cavity and exposed to the direct contact with the steam (or hot water) emanating from the orifice of the steam wand 2-1. The cooking cavity, however, is not a totally sealed cavity. The lower lid 12-18 has small openings coupling the cooking cavity to the volume within the vessel. These openings are located in the lower lid and are adjacent to the volume within the vessel. The dotted oval 12-20 is expanded in the upper right illustrating the construction of a cross-section of the lower lid 12-20. The lower lid contains small circular openings allowing the steam, condensed steam, and flavored liquid to flow 12-41 through the small openings 12-19 forming drops 12-11. The forming drops 12-11 eventually increase in size causing their mass to exceed the surface tension and become falling drops 12-12. The liquid 1-2 within the vessel now contains the flavor of the comestible 12-38 placed in the cooking cavity. The comestibles can be coffee grounds, tea, or other herbs where after steaming or hot water can transfer the flavor carried by the comestible to a liquid. Any steam entering the vessel would be able to exit through the opening 12-21 in the lower lid 12-18. The exiting steam 12-7 would condense due to recirculation 12-6 back to the outer surface of the upper lid 12-17. The condensation of the steam on the upper lid turns the steam into drops 12-9 which flow 12-8 with gravity back to the opening 12-21 and returning to the liquid in the vessel.

Besides using steam emanating from the orifice in the steam wand 2-1, the steam generation unit can also be controlled to provide water. The hot water can emanate from the orifice of the steam wand 2-1, mix with the comestibles 12-38 and extract the flavoring from the comestibles. The liquid would be forced through the small openings in the lower lid 12-18 and fill the vessel with liquid 1-2 that has been flavor according to the type of comestibles introduced into the cooking cavity.

Figure 12D:
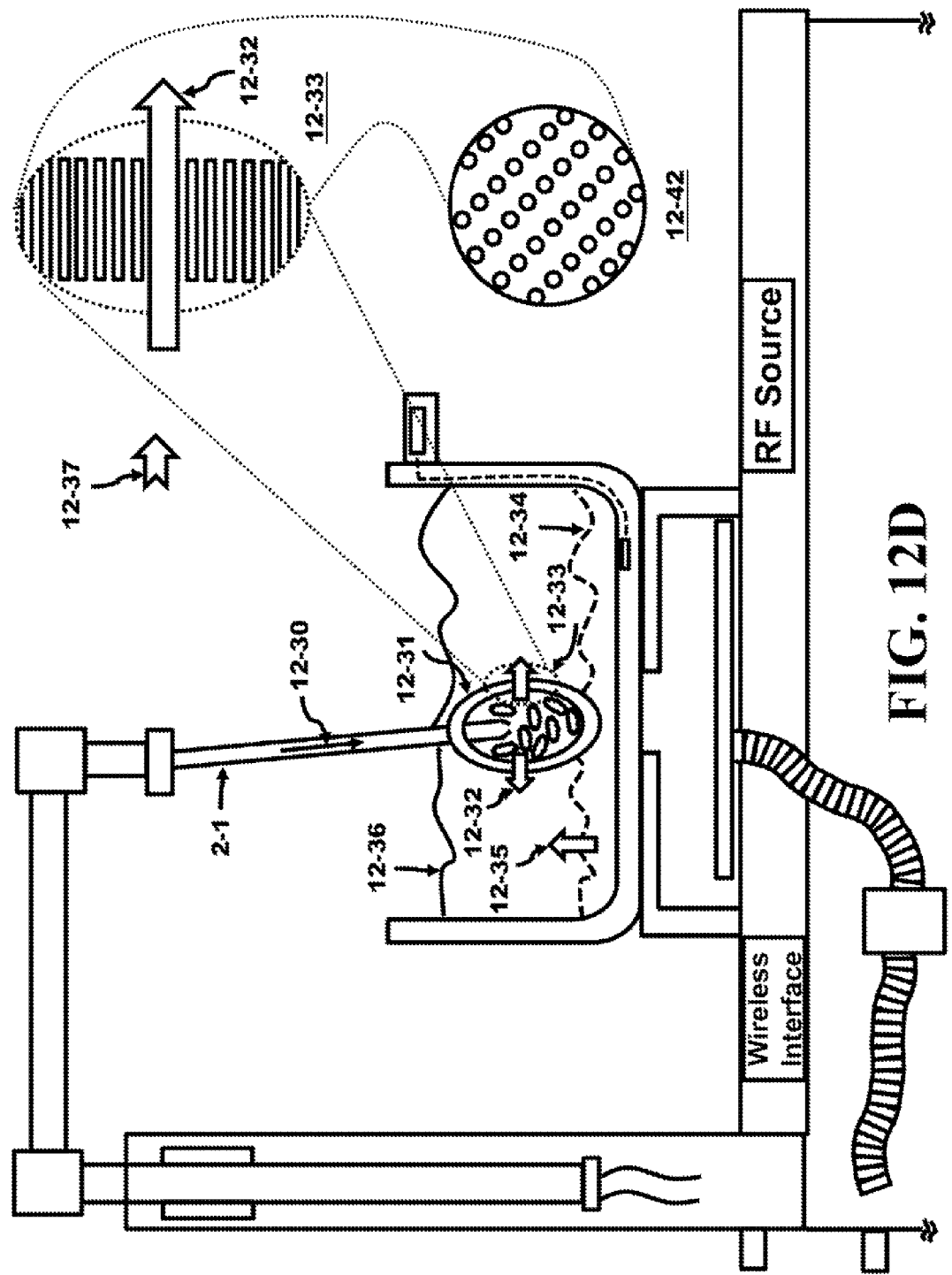
FIG. 12D depicts a side cross-sectional view of a system extracting contents of a comestible and/or preparing a comestible within a cooking cavity of a vessel submerged within the liquid using steam heating using a combination of a rigid tube of one embodiment in accordance with the present invention.

FIG. 12D illustrates the placement of a cooking cavity 12-31 into a vessel. A steam wand 2-1 is inserted inside of the cooking cavity 12-31 containing comestibles. A hot water flow 12-30 can be sent down the steam wand 2-1 to extract the flavoring from the comestibles within the cooking cavity 12-31. Hot water in combination with steam or steam alone may also be sent down the steam wand. The walls of the cooking cavity within the dotted oval 12-33 are magnified to the right. Here the wall is shown as having small holes allowing the liquid to penetrate through the holes forming a liquid flow 12-32 out of the cooking cavity. The view along the arrow 12-37 is illustrated in 12-42 showing the holes. This liquid flow of 12-32 starts to fill the vessel with flavored liquid showing an initial level of 12-34 such that the level continues to raise 12-35. The process of flavor extraction continues until the level reaches 12-36 where the flavors have been fully extracted. The contents within the cooking cavity 12-31 could be tea, coffee, and any other herbs where a flavor can be extracted from the herb.

Figure 13A:
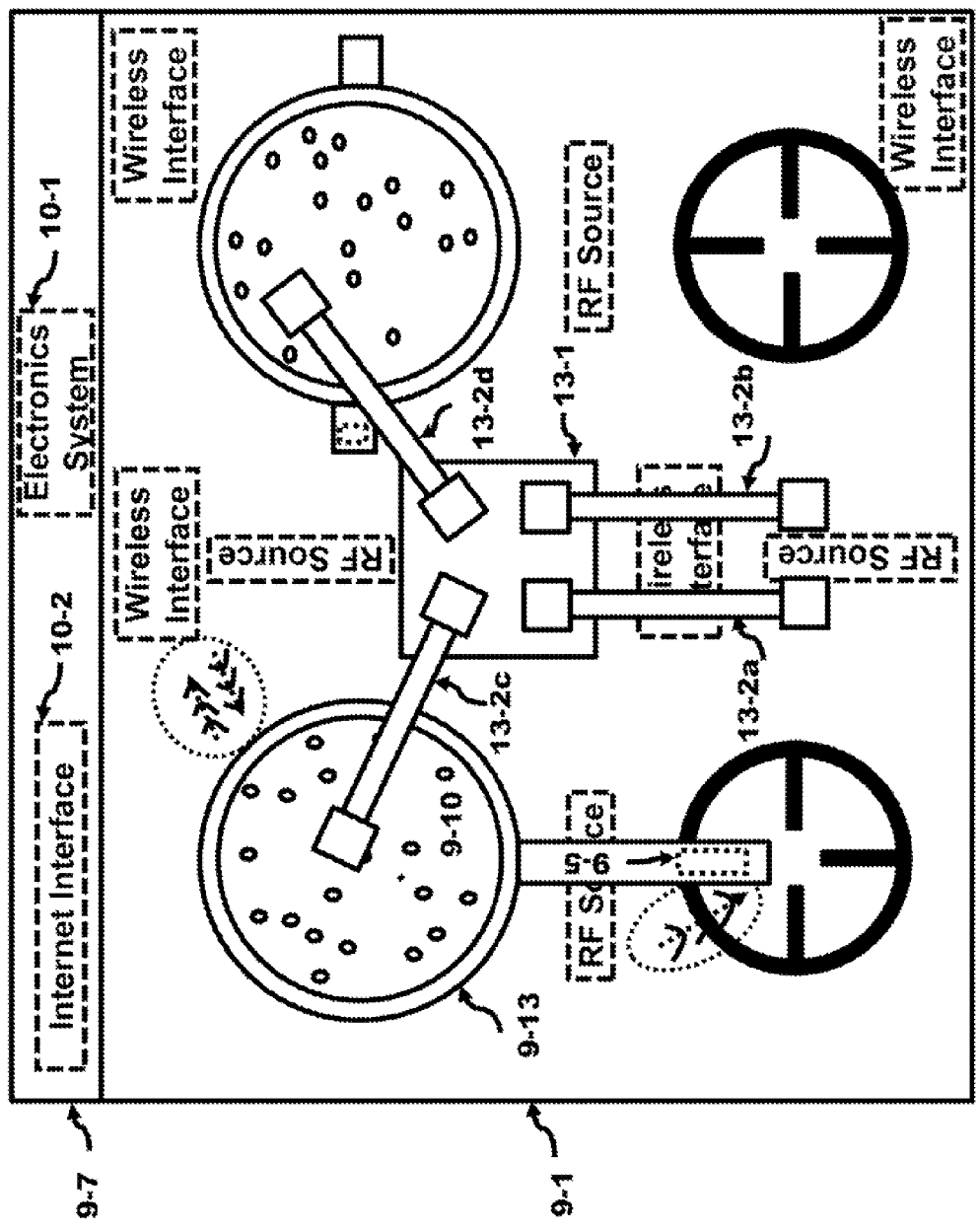
FIG. 13A illustrates a top view of a stove heating a liquid in a vessel using the application of steam heating where the steam is applied using rigid tube assemblies located in a platform in the center of the stove of one embodiment in accordance with the present invention.

FIG. 13A illustrates a top view of a stove 9-1 which has a backstop unit 9-7. The backstop may contain an Internet interface 10-2 and an electronic control system 10-1, although these particular components can be located anywhere within the stove. A center platform 13-1 contains the four adjustable arm assemblies 13-2a, 13-2b, 13-3c, and 13-2d. Two of these arm assemblies' 13-2c and 13-2d have their steam wands inserted into the liquid within the vessels 9-13. The steam wands of these two arms were inserted inside the vessels by using the rotational units at the two ends of the arm assemblies providing freedom of motion. The platform 13-1 is raised so that the arms parallel to the current view can be moved in and out of the page without entering the volume of the oven beneath the surface of the stove.

Figure 13B:
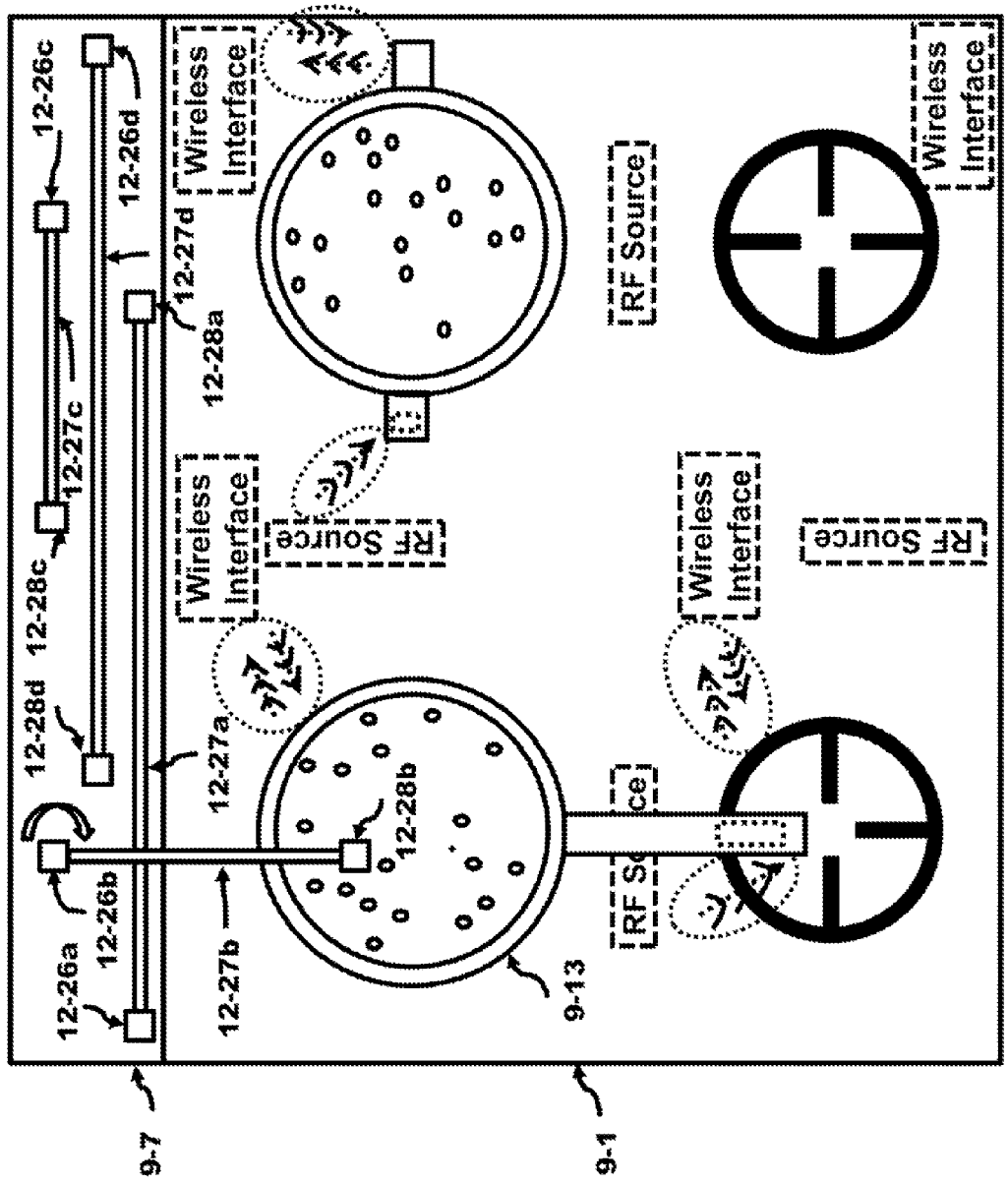
FIG. 13B shows a top view of a stove heating a liquid in a vessel using the application of steam heating where the steam is applied using rigid tube assemblies located in a backstop of the stove of one embodiment in accordance with the present invention.

FIG. 13B illustrates a top view of another stove 9-1 which has a backstop unit 9-7. The backstop contains the four arms 12-27a, 12-27b, 12-27c, and 12-27d. One arm has been rotated into a position where the steam wand is positioned in a vessel 9-13 while the remaining three are in their storing (or starting) position. The arm with the rotational unit 12-26b is rotated from a stored position such that the associated rigid tube 12-27b and second rotational unit 12-28b are positioned into the vessel 9-13 and has their steam wand inserted into the liquid within the vessel. The remaining rotational units 12-26a, 12-26c, and 12-26d are in their storing positions. Their corresponding remaining portions of the rotational couplers: 12-28a, 12-28c, and 12-28d are all positioned in the stored position. Although in a majority of these figures four arms are illustrated in this figure, the number of arms can be more or less than this number.

Figure 14A:
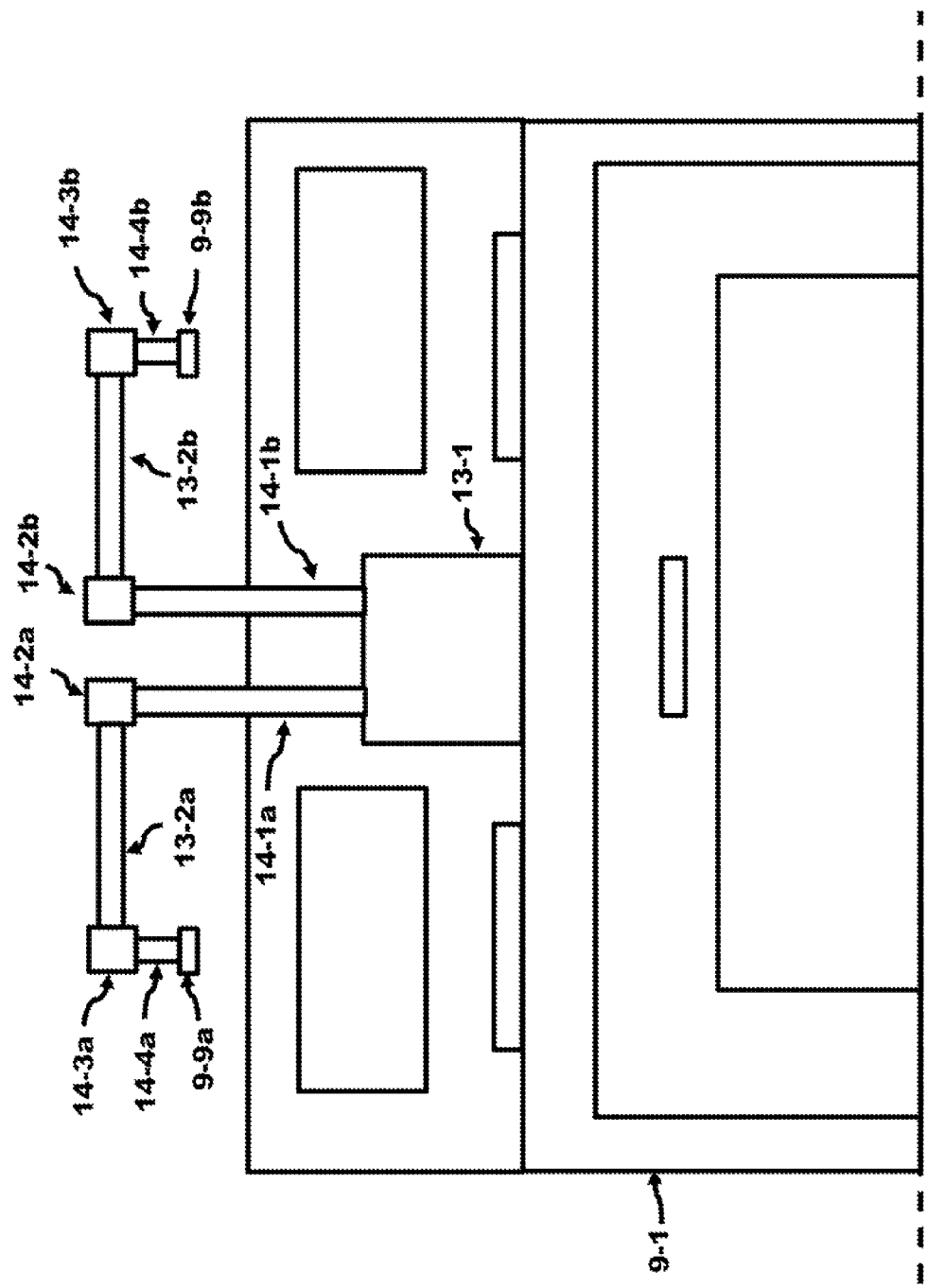
FIG. 14A presents a front view of a stove with several positioned rigid tube assemblies located in a platform in the center of the stove of one embodiment in accordance with the present invention.

FIG. 14A illustrates a front view of the stove 9-1 shown in FIG. 13A. Only two of the tube assemblies are illustrated hereto. The platform 13-1 is positioned approximately in the center of stove where two of the rigid tubes 14-1a and 14-1b are coupled to the platform unit 13-1. The two rigid tubes, 14-1a and 14-1b, are connected to a first and second rotational units 14-2a and 14-2b, respectively. The horizontal rigid tube 13-2a couples the first rotational unit 14-2a to a third rotational unit 14-3a. A tube 14-4a couples the third rotational unit 14-3a to the detachable coupling unit 9-9a where a steam wand (not illustrated) can be coupled. The second rotational unit 14-2b is coupled to horizontal rigid tube 13-2b to a fourth rotational unit 14-3b. A rigid tube 14-4b couples the fourth rotational unit 14-3b to the detachable coupling unit 9-9b where a second steam wand (not illustrated) can be coupled. The steam wand coupled to each of these tube assemblies can be rotationally adjusted arms such that the steam wand can be placed into the liquid of a vessel. The flexibility of the movement that the rotational units provide the tube assemblies along with the ability of the rigid tubes 14-1a and 14-1b to be moved in a perpendicular direction from the surface of the stove allows the steam wands to be placed easily into any vessel that is on a grill. The number of arms associated with the platform 13-1 can vary depending on the number of grills and/or the necessity of the need of having more than one steam wand inserted into a given vessel.

Figure 14B:
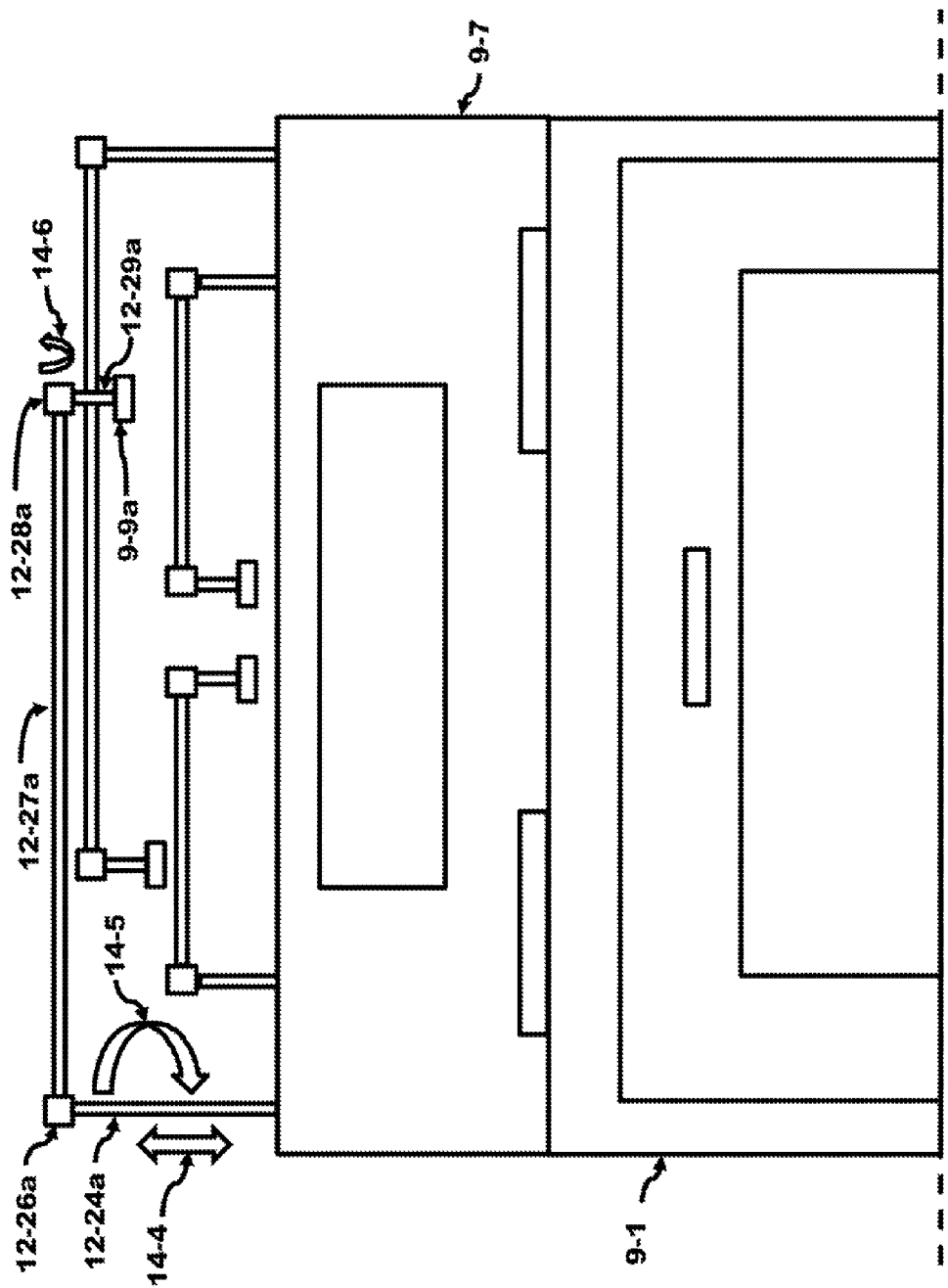
FIG. 14B depicts a front view of a stove with several positioned rigid tube assemblies located in a backstop of the stove of one embodiment in accordance with the present invention.

FIG. 14B illustrates a front view of the stove 9-1 shown in FIG. 13B. Four tube assemblies are illustrated hereto; although more or less can be added to the stove 9-1. The arms are coupled to the backstop unit 9-7. Although only four are illustrated, more or less can be provided. The backstop unit 9-7 is positioned at the back of stove holding the four tube assemblies each of which can adjust and formed into different shapes to place the tube assemblies into different positions. The leftmost rigid tube has a vertical component 12-24a that can be frictionally moved up and down 14-4. The rigid tube 12-24a can also be rotated 14-5. A coupling unit 12-26a is connected to the end of rigid tube 12-24a and couples to a perpendicular rigid tube 12-27a. The coupling unit 12-26a can also be rotated 14-6. The rigid tube 12-27a is connected to a second rotational unit 12-28a. Either rotational unit 12-26a or 12-28a can also be rotated 14-6. The coupling unit 12-28a is connected to a vertical rigid tube 12-29a which then couples to the detachable coupling unit 9-9a. Because of the flexibility of the movement of this tube assembly and the long horizontal rigid tube 12-27a, the steam wand can be placed into the vessel that is on a grill closest to the front of the stove 9-1.

FIG. 14C illustrates the tube assemblies presented in FIG. 14B after being pushed down in the direction of the arrow 14-9 such that all of the tube assemblies can be inserted into the backstop unit 9-7 and hidden from view. This is possible because the vertical tube 12-24a is held in place by frictional coupling unit 14-8 and can be slipped or moved in the downward direction. This procedure places all of the tube assemblies below the top surface of the backstop unit 9-7. Similarly, the tube assemblies can be restored into their original by pulling on the tube assemblies in the upward direction. One of the tube assemblies with the longer arm is not illustrated here to simplify the diagram.

Figure 15:
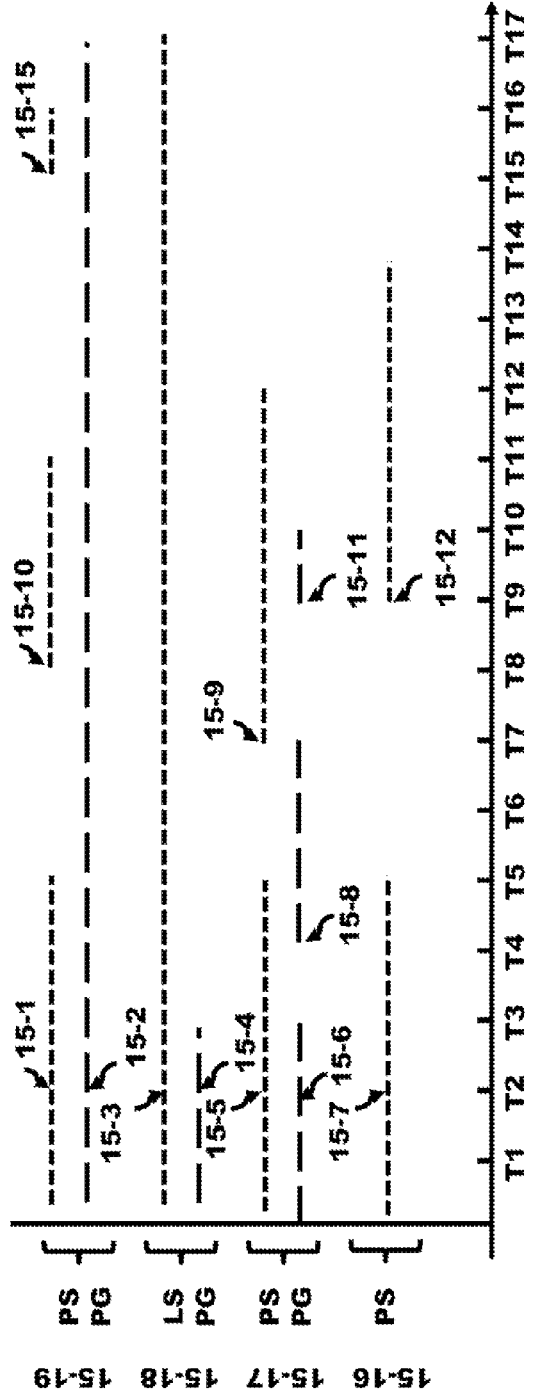
FIG. 15 shows several different heating applications of a pulsed gas source and pulsed steam source of one embodiment in accordance with the present invention.

FIG. 15 illustrates several different heating applications that can be applied to a vessel with comestibles over time: 15-16, 15-17, 15-18, and 15-19. In 15-16, the natural gas is pulsed and enabled in sequence 15-7 until time T5. After a while, the steam is pulsed again 15-12 at time T9. The solid line indicates that the heating unit is enabled while the white portion of the line indicates that the heating unit is disabled. Between times T5 and T9, no heat is applied to the vessel. This interchange allows cooking and simmering to occur sequentially. In the heating application 15-17, both the natural gas and the steam are pulsed. The pulsed gas 15-6 has a frequency of being enabled and disabled less than that of the pattern used in 15-7. After one-time gap, the pulsed gas is enabled again at 15-8 and after three-time units disabled. After two time periods the pulsed gas is enabled again at 15-11. Simultaneously, the pulsed steam 15-5 is applied to the vessel and is disabled at T5. The pulsed steam is again applied at T7 15-9 and disabled at T12. In the heating application 15-18, the pulsed gas 15-4 is use help heat up the liquid while simultaneously pulsed steam 15-3 is applied to the vessel. The pulsed steam 15-3 applies heat to the liquid in pulses. The comestibles only receive the necessary heat to delicately cook the comestibles. The last heating application 15-19, illustrates the pulsed gas 15-2 remaining on while the pulsed steam 15-1 is enabled in increments until T5. The second enablement of the pulsed steam occurs at 15-10 until T11. And finally, 15-15 is enabled for one time period. These different heating applications can be varied dependent on the comestibles that are being cooked allowing the user to apply heat during certain intervals so that the comestibles are cooked appropriately. The instructions for this type of heating can be created by the user, or can be downloaded from the Internet, which will eventually contain a wealth of recipes and heating instructions.

Figure 16A:
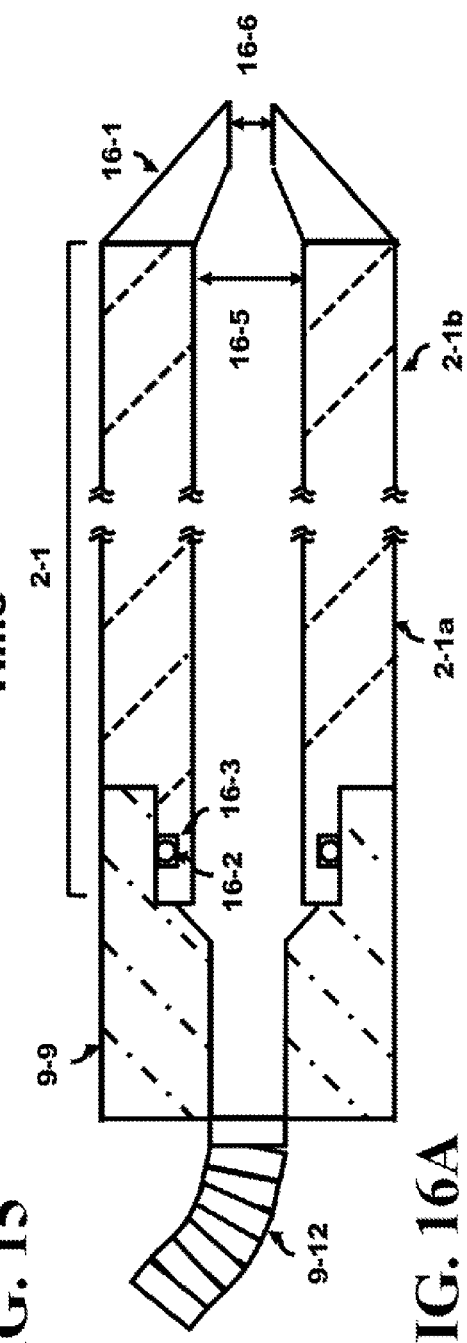
FIG. 16A presents a cross-sectional view of a coupling unit, steam wand and shaping unit combination of one embodiment in accordance with the present invention.

FIG. 16A illustrates a cross-sectional view of a steam wand 2-1 in a detachable coupling unit 9-9. The detachable coupling unit 9-9 couples a flexible tube 9-12 to the steam wand 2-1. The steam wand has a tube with a first orifice 16-5 at one end, where two end sections of the steam wand 2-1 are illustrated; 2-1a and 2-1b. A second orifice 16-6 can be added to the steam wand by attaching the shaping unit 16-1 at the end of the steam wand and makes the orifice adjustable (in this case, smaller). The shaping unit 16-1 can be screwed into the steam wand (not illustrated). The steam wand 2-1 is coupled to the detachable coupling unit 9-9 by sliding and fitting the reduced diameter of one end of the steam wand 2-1 into the detachable coupling unit 9-9. A groove 16-3 is formed on the reduced diameter of the steam wand and contains an O-ring 16-2. The steam wand 2-1 can be locked to the detachable coupling unit 9-9 by several different methods to prevent the steam wand 2-1 from being forced out of the detachable coupling unit 9-9 by the steam pressure. Some of the fastening techniques include a latching mechanism; a screwing mechanism, where a portion of the outer diameter of the inserts can be threaded and screwed into position, or a clipping mechanism, where the steam wand is clipped into place in the detachable coupling unit 9-9. The steam wand 2-1 can be easily disassembled from the detachable coupling unit 9-9 to allow the steam wand to be easily cleaned.

Figure 16B:
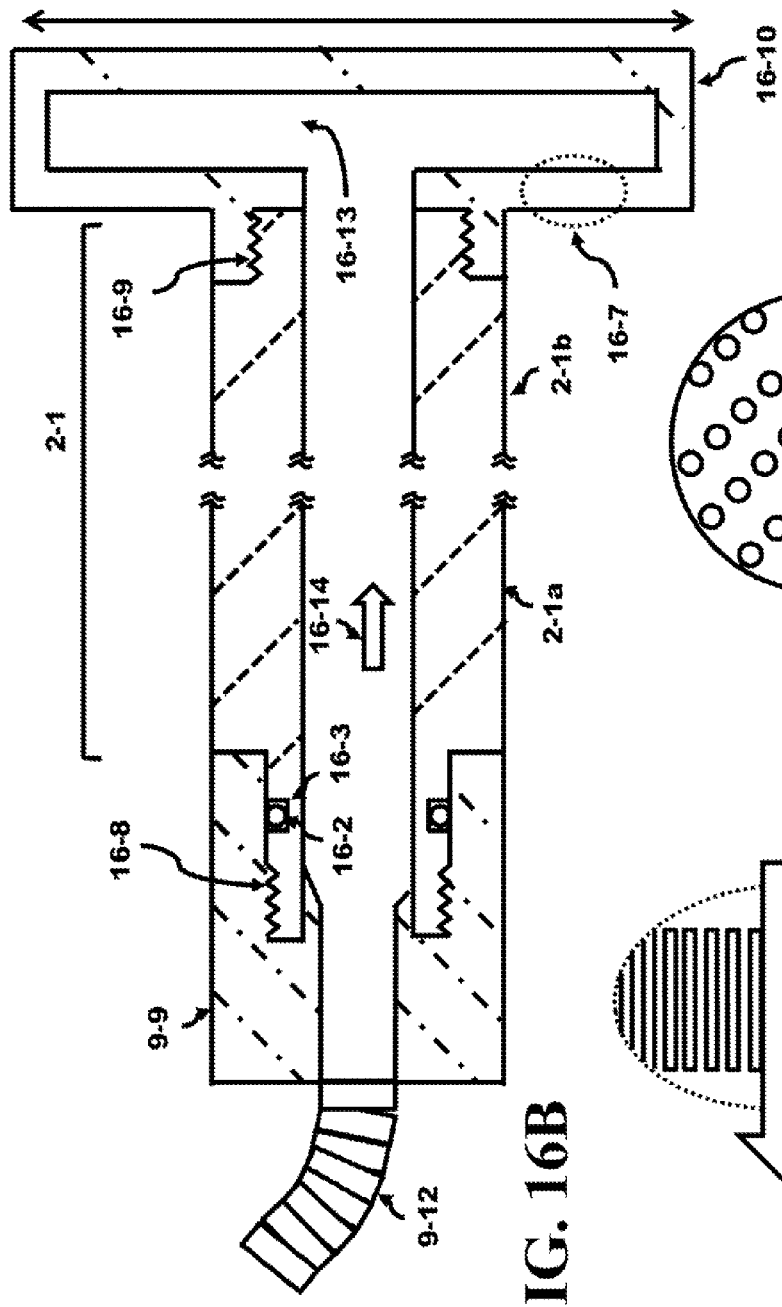
FIG. 16B depicts a cross-sectional view of another coupling unit, steam wand and pocket cavity combination of one embodiment in accordance with the present invention.
Figure 16D:
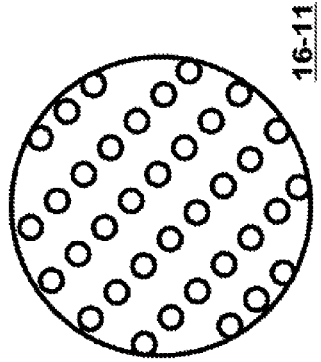
FIG. 16D presents a surface view of the wall of the assembly in FIG. 16C of one embodiment in accordance with the present invention.
Figure 16C:
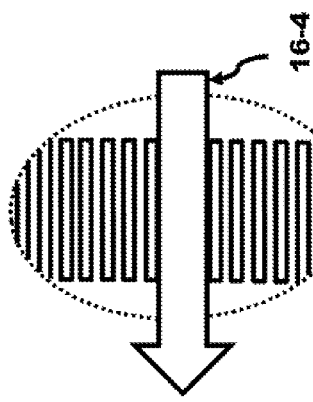
FIG. 16C shows a cross-sectional view of the wall of the assembly in FIG. 16B of one embodiment in accordance with the present invention.

FIG. 16B illustrates a component 16-10 added to the end of a steam wand 2-1. This component is coupled to the steam wand by the common thread 16-9 where the component can be screwed on to the steam wand. In addition, the steam wand 2-1 is connected to the detachable coupling unit 9-9 by a second threading assembly 16-8 where the steam wand 2-1 can be screwed into detachable coupling unit 9-9. The O-ring 16-2 and a slot to fit the O-ring 16-3 are also illustrated. The steam wand 2-1 is illustrated as being partitioned into two sections 2-1a and 2-1b. The component 16-10 has many microscopic holes in the surface. For example, the dotted oval 16-7 illustrated in FIG. 16B is shown magnified in FIG. 16C. The steam within the pocket cavity 16-13 of the component 16-10 generates a force 16-4 allowing the steam to penetrate the wall 16-7 which has a number of holes in the wall. A frontal view 16-11 of the surface of the component is illustrated in FIG. 16C which shows the surface illustrating all of the openings or holes in the wall. The combined unit of the component 16-10 and the initial tubular portion of the steam wand 2-1 is still called a steam wand. A steam wand is defined as the assembly added to the coupling unit 9-9 to channel and distribute the steam from the coupling unit to the one coupling hole (orifice) or more coupling holes at the exit point of the assembly. The component 16-10, for example, has many coupling holes.

The holes are separated from each other by a first dimension while the diameter of the holes have second dimension. The diameter of the holes can be related to the size of the steam bubble generated within the liquid when this steam wand is placed within a vessel and a given pressure applied by the steam unit. As the diameter of the hole is reduced, the diameter of the generated steam bubbles can also be reduced. The overall pressure within the assembly 16-10 is carefully adjusted by controlling the flow rate 16-14 of the steam in the steam wand 2-1 as the steam exits the plurality of holes within the assembly 16-10. The total area of all holes when summed together provides the total area of the opening of the orifice of the assembly 16-10 coupled to the steam wand 2-1. The flow rate of the steam 16-14 in the steam wand 2-1 can be adjusted to provide a controlled flow rate out of the holes in the region of 16-7. The steam after passing the orifice of the holes will cause steam bubbles to form. The diameter of the steam bubble will be a function of the flow rate through the hole and would be controllable by adjusting the steam flow rate 16-14 within the steam wand 2-1. A system similar to what is shown in FIG. 7B can be adjusted to control the flow rate of the steam. Thus, by controlling the steam flow rate 16-14, the bubbles forming on the surface of the assembly 16-10 can be adjusted to contain a certain volume of steam and thereby having a controlled diameter.

The terminal velocity ($v_t$) of small bubbles satisfies the Stoke's law:

$$v_t = \frac{2}{9} g r_e^2 (\rho_l - \rho_g) / \mu_l \qquad \text{(EQU. 1)}$$

where g is the acceleration due to gravity, $r_e$ the equivalent bubble radius, $\mu_l$ the viscosity of a liquid, $\rho_l$ the mass density of the liquid, and $\rho_g$ the mass density of the gas. When bubbles have a very large diameter the velocity is given by Davies and Taylor's equation as shown:

$$v_t = \frac{2}{3} \sqrt{g r_e} \qquad \text{(EQU. 2)}$$

Steam bubbles with a lower diameter have a slower velocity when compared to larger steam bubbles. This increases the efficiency of the heat transfer from the steam bubble to the liquid since the bubble will remain in the liquid for a longer time period before reaching the surface of the liquid, popping, and releasing the steam above the liquid level. The assembly 16-10 attempts to generate smaller diameter steam bubbles to increase the efficiency of the heat transfer to the liquid.

Figure 16E:
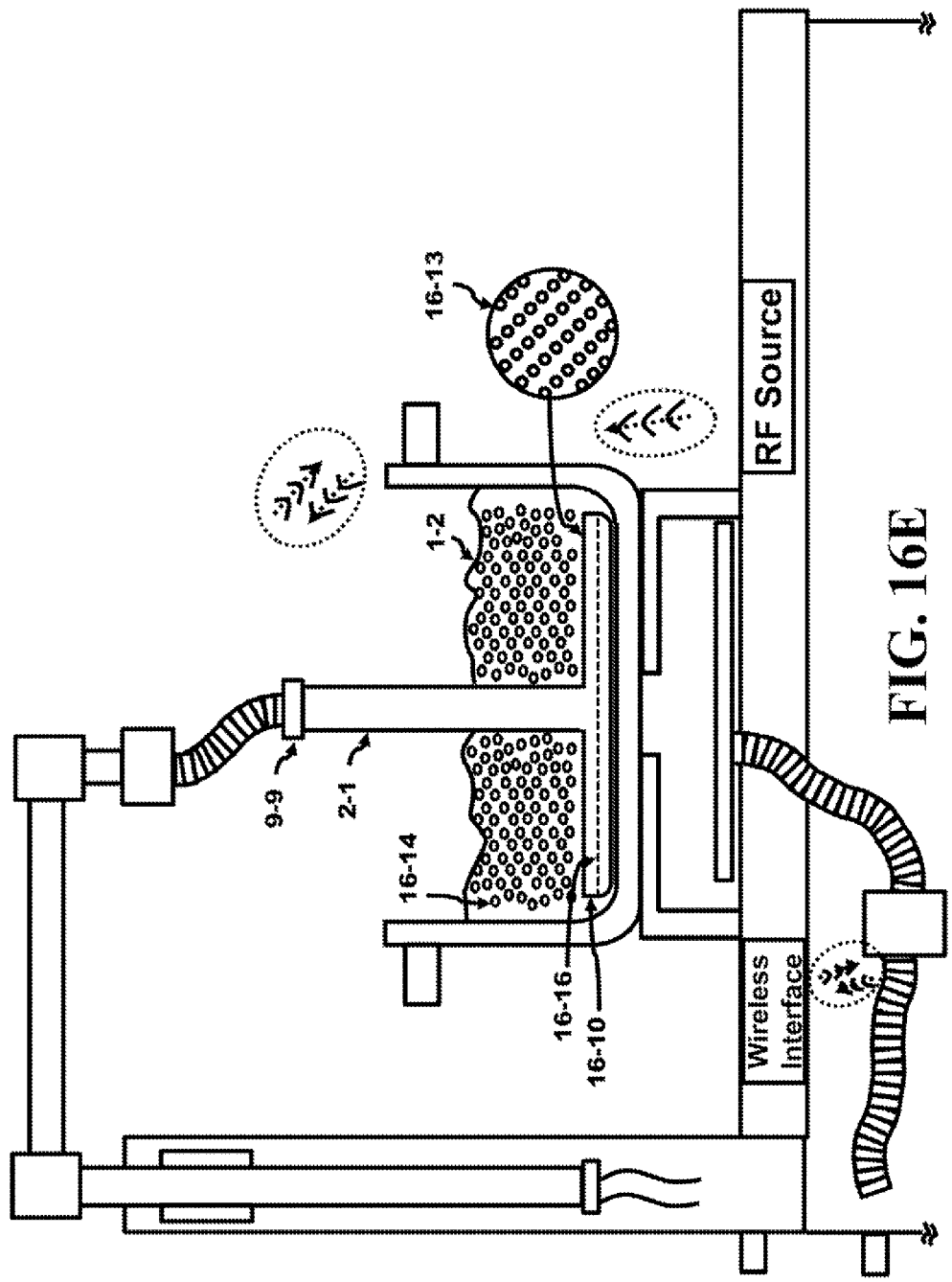
FIG. 16E presents a cross-sectional view of a vessel with an assembly as presented in FIG. 16B of one embodiment in accordance with the present invention.

FIG. 16E illustrates a steam wand 2-1. The steam wand includes the added component 16-10. This component is coupled to the steam wand and has a diameter matching the inner diameter of the vessel. In addition the steam wand 2-1 is connected to the detachable coupling unit 9-9. The component 16-10 has many microscopic coupling holes in the surface as illustrated in the top view shown in 16-13. These coupling holes introduce steam into the liquid 1-2 as steam bubbles 16-14. The component 16-10 can also be dismantled along the dotted line 16-16 to clean the pocket cavity within the component 16-10.

Figure 17:
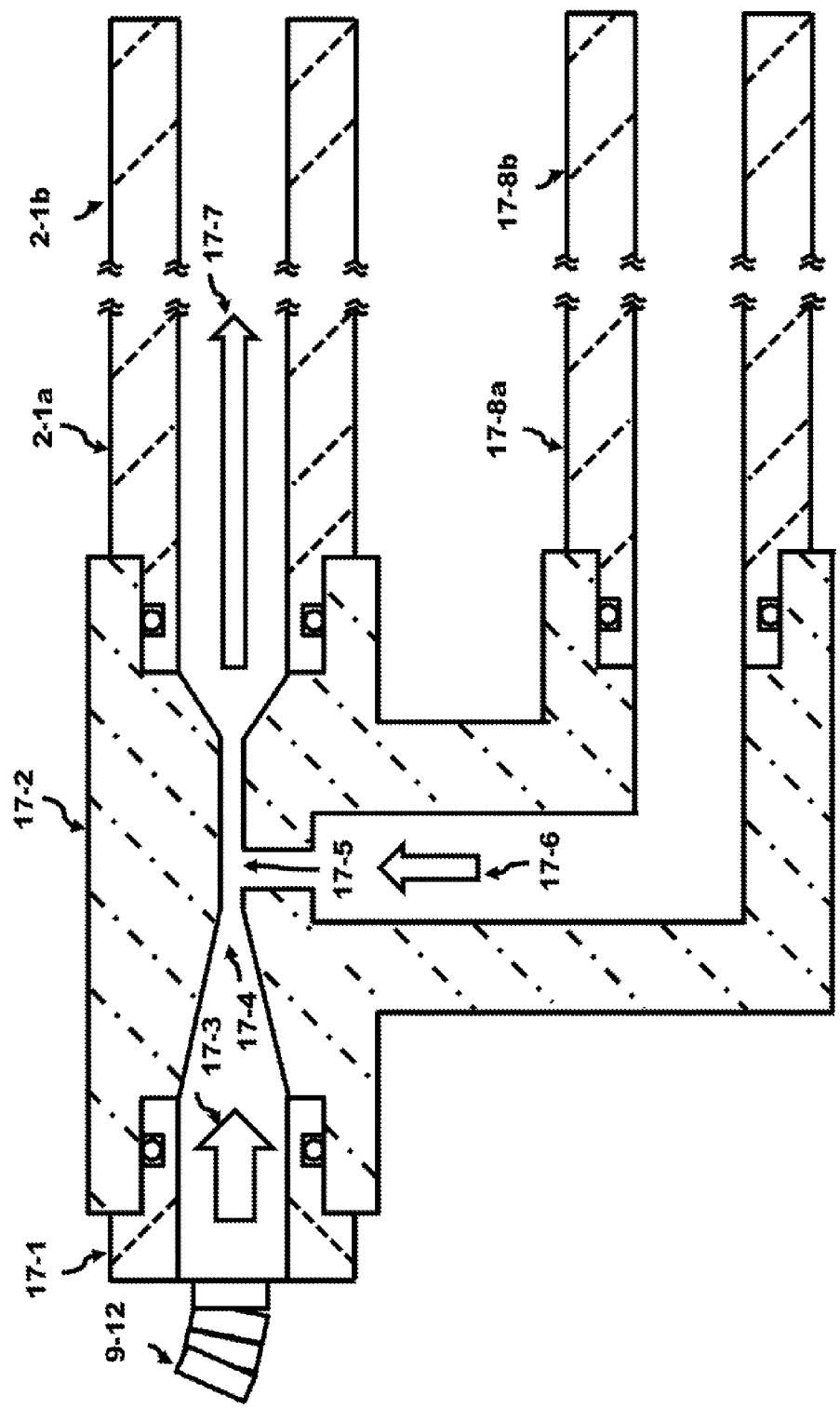
FIG. 17 depicts a cross-sectional view of a Venturi coupling unit and corresponding steam wands of one embodiment in accordance with the present invention.

FIG. 17 illustrates a structure producing the Venturi effect in the vicinity of the region 17-5. The steam flow 17-3 from the steam generating unit moves along flexible tube 9-12 entering into the assembly 17-2. The end of the flexible tube assembly 9-12 has a coupling unit 17-1 that is inserted into the assembly 17-2. A groove containing an O-ring is also illustrated in the coupling unit 17-1. The steam 17-3 flows towards the reduced orifice 17-4. This causes the velocity to increase going through the region 17-5. The higher velocity in the region 17-5 causes lower pressure to occur in the region 17-5 which generates a forced flow 17-6 to occur in a second steam wand 17-8a and 17-8b. Due to the increased velocity in the region 17-6, the second steam wand 17-8a and 17-8b which is coupled to the assembly 17-2 creates a negative pressure or a vacuum causing liquid to flow in the direction of the arrow 17-6 towards region 17-5 (assuming the steam wand of 17-8a and 17-8b is inserted into a liquid). The steam wand 2-1a and 2-1b circulates the liquid and sends the liquid back down the steam wand 2-1 which is illustrated by the two components 2-1a and 2-1b. This creates turbulence with the liquid of the vessel allowing the liquid in the vessel to distribute the heat quickly.

Figure 18:
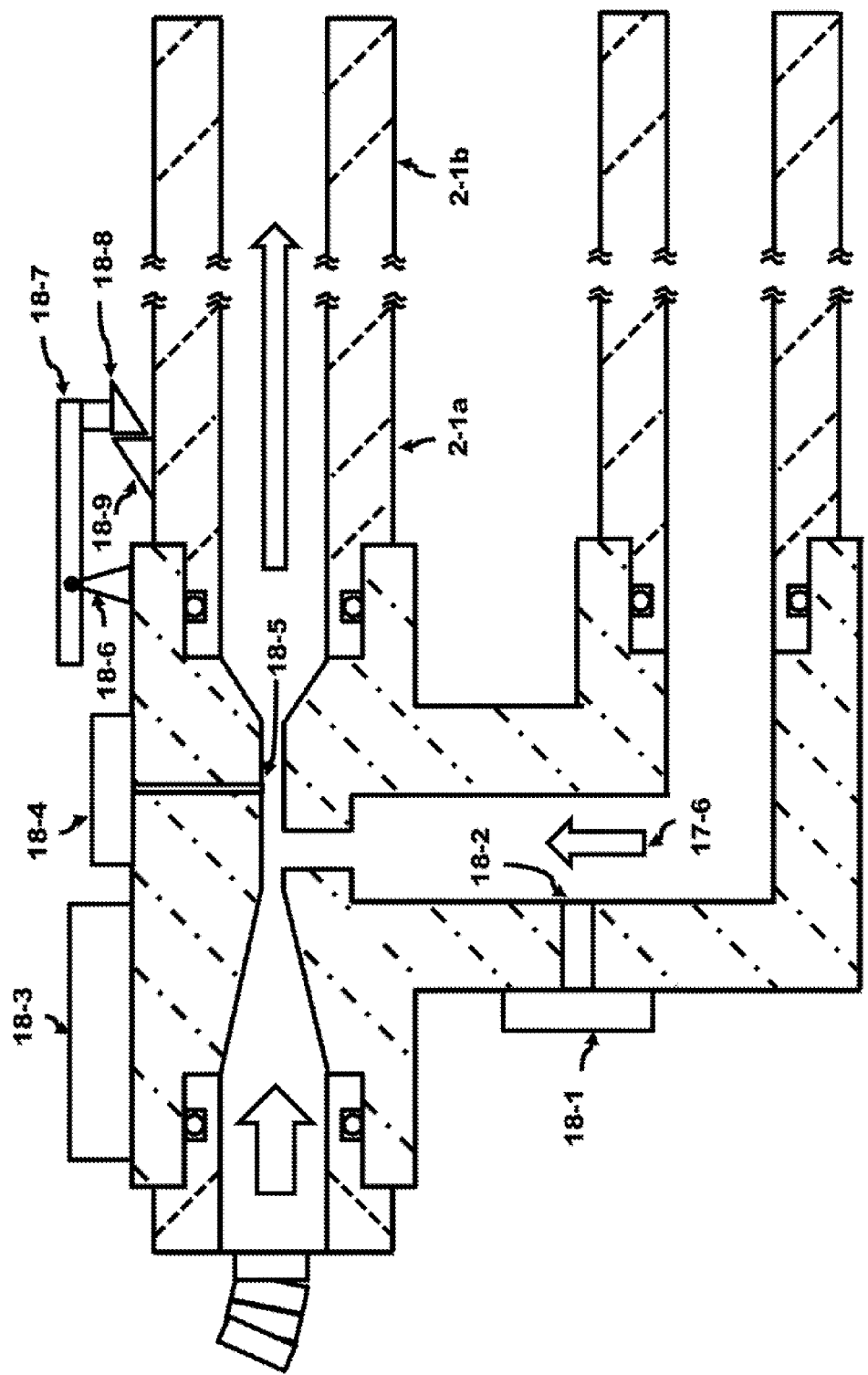
FIG. 18 presents a cross-sectional view of a Venturi coupling unit with sensors and corresponding steam wands of one embodiment in accordance with the present invention.

FIG. 18 illustrates the same assembly as in FIG. 17 with the exception that electronics and pressure sensors are incorporated into various regions of the assembly. A pressure sensor 18-2 coupled to the electronics unit 18-1 measures the negative pressure as 17-6. A second pressure sensor 18-5 coupled to the electronics unit 18-4 measures the pressure in the channel. The electronics unit 18-3 can collect the data from these pressure sensors 18-2 and 18-5 and any other sensors that may be placed within the system to control the application of the steam heat to the liquid. One example of a latching mechanism is illustrated where a shaft 18-7 on a pivot point 18-6 can position a latch 18-8 away from the lock 18-9 so that the steam wand 2-1*a* and 2-1*b* can be removed.

Figure 19:
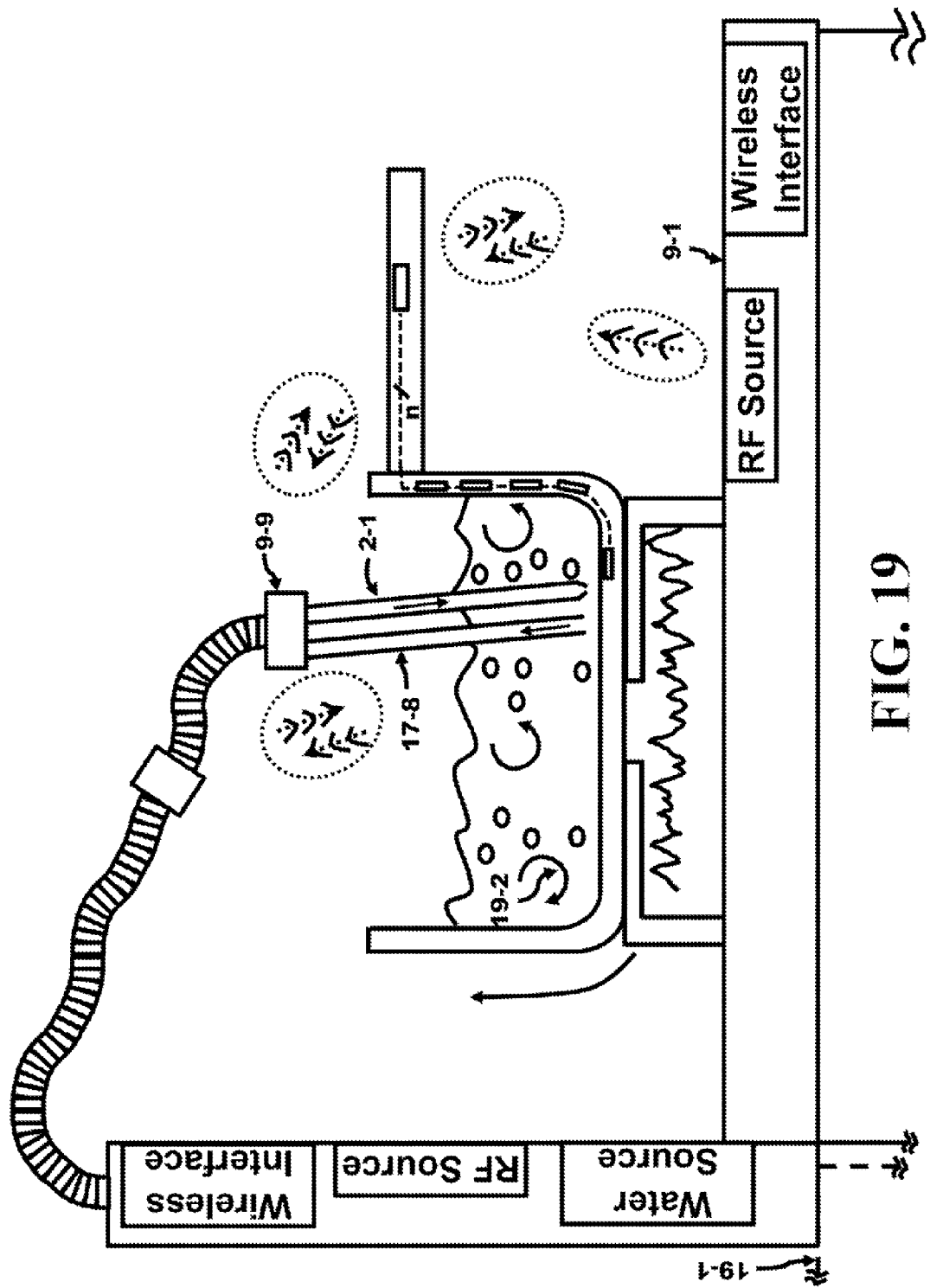
FIG. 19 illustrates a side cross-sectional view of a stove heating a liquid using a steam wand with the Venturi effect in a vessel using the application of gas (flame) and steam heating where the steam is applied using a flexible tube assembly of one embodiment in accordance with the present invention.

The backstop in this FIG. 19 is sitting on a top surface of the counter 19-1 and is not attached to the stove 9-1. Such a separate unit allows current stoves without any of the features described earlier to be easily modified into a stove functioning with these features for the user.

FIG. 19 depicts a cross-sectional view of a vessel on a stove 9-1. The assembly unit illustrated in FIG. 18 is coupled to the detachable coupling unit 9-9. Steam or hot water can be forced down (see arrow) the steam wand 2-1, which causes the Venturi effect within the region 17-6 (not illustrated). Since the orifice of the steam wand 17-8 is inserted into the liquid within the vessel, the negative pressure within region 17-6 causes a lower pressure within the steam wand 17-8 and draws liquid upward (see arrow). The liquid enters the region 17-6 and is recirculated down the steam wand 2-1 towards the vessel. The drawn liquid is also heated by the steam or hot water after passing through the region 17-6. The recirculating action causes more turbulent motion 19-2 within the fluid of the vessel and mixes the liquid at an increased rate.

Figure 20A:
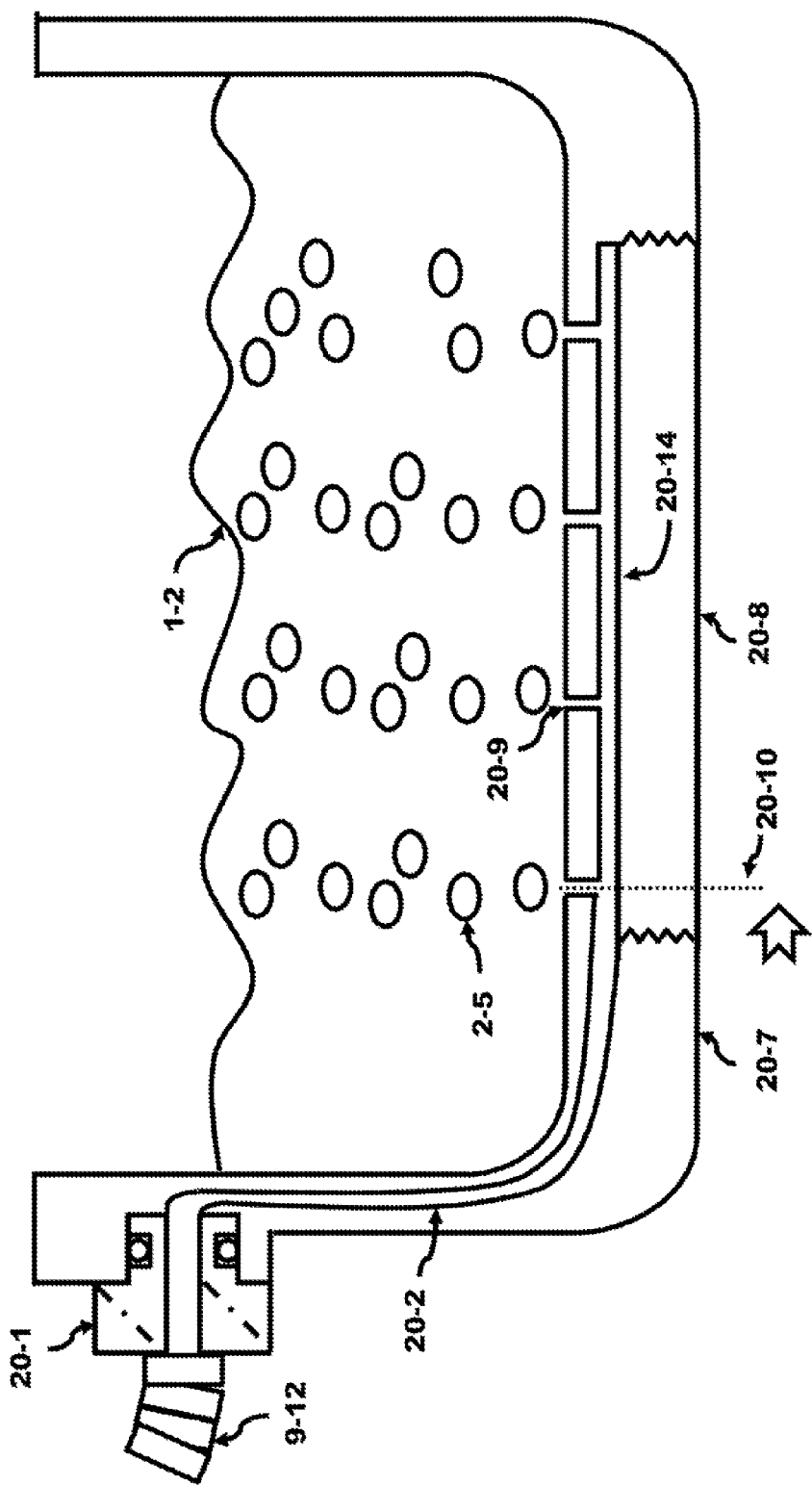
FIG. 20A depicts a cross-sectional view of a vessel using an embedded steam heating technique which introduces steam into the liquid within the vessel by using a pocket cavity of one embodiment in accordance with the present invention.

FIG. 20A illustrates a cross-sectional view of a vessel with a liquid 1-2 where steam is flowing in the flexible tube assembly 9-12 into the coupling unit 20-1. The coupling unit is held in place by a latching or screw mechanism which is not illustrated and a seal is made with a circular groove in the coupling unit 20-1 to contain an O-ring. The steam is channeled down a long cylindrical hole 20-2, for this example, formed in the vessel to a pocket cavity 20-14 at the base of the vessel. The pocket cavity 20-14 has similar attributes as the pocket cavity formed in the assembly 16-10. Another way to channel the steam to the pocket cavity can be achieved by attaching a flexible tube to the exterior of the vessel and entering the vessel through a entry point that is parallel to the pocket cavity (will be illustrated shortly). Many small coupling holes 20-9 are formed in the bottom of the vessel overlaying the pocket cavity 20-14. These coupling holes 20-9 coupled the pocket cavity 20-14 to the internal volume of the vessel. These coupling holes couple the steam to the liquid within the vessel. The steam pressure is applied to the vessel causing pressure to build up in the pocket cavity 20-14 which would be a sealed region if the coupling holes were sealed. The increased pressure creates steam bubbles 2-5 to emanate from the small holes.

The diameter of the coupling holes is designed to prevent liquid flowing through the hole from the liquid within the vessel to the pocket cavity. This broadly partitioned into three categories: 1) water never leaking into the cavity for a diameter meeting the Young-Laplace condition; 2) water which can leak into the pocket cavity if diameters greater then the Young-Laplace condition are used, but the leak can be prevented from occurring if a positive steam pressure is maintained within the pocket cavity; and 3) the diameter of the coupling holes can be so large that the applied steam pressure cannot prevent the leak from occurring. The first category is based on the height of the column of liquid over the coupling hole in the vessel and the surface tension of the liquid. Such a system is a gravity dependent system. As the column of liquid increases in height, the pressure applied to the liquid over the opening of the coupling hole increases. Surface tension will maintain the spherical liquid surface over the coupling hole from breaking as long as the pressure above the liquid-air interface remains less than the breaking pressure. If the height of the liquid in the vessel causes the pressure to exceed the breaking pressure, liquid can potentially enter the pocket cavity. To compensate for this effect, the diameter of the coupling holes can be reduced, which causes the surface tension to increase and compensates for the increased pressure. To maintain a constant cross-sectional area equal to the summation of the area of each coupling hole, more coupling holes would be required.

The formation of the drop forms a meniscus with a radius R with the wall of a coupling hole. The Young-Laplace equation can determine the pressure difference $\Delta p$ over the liquid-air interface, where $\sigma$ is the surface tension of the liquid:

$$\Delta p = 2\sigma/r \quad (\text{EQU. 3})$$

The height of the liquid over the coupling hole with radius r is equal to the height h of the column of liquid in the vessel over the coupling hole which applies a pressure to the liquid-air interface equal to:

$$p_i = \mu g h \quad (\text{EQU. 4})$$

Assume the same air pressure exists above the liquid surface and below meniscus which makes $\Delta p = p_i$. The density of the liquid is $\rho$ while g is the gravitational acceleration which equals 9.8 m/sec² at sea level. Setting EQU. 3 equal to EQU. 4 and solving for r provides the Young-Laplace equation or condition for a radius:

$$r = 2\sigma/\mu g h \quad (\text{EQU. 5})$$

The surface tension $\sigma$ is a function of temperature. Assume that the liquid is water which has a density of 1000 kg/m and a surface tension of 0.0589 J/m² at 100° C. and the height h=10 cm=0.1 m, the radius (using EQU. 5) of the coupling hole that satisfies the Young-Laplace condition would need to have a radius of 0.12 mm=120 μm or less to support the 10 cm column of water.

If a flame heat is applied to the vessel simultaneously with the steam heat, the temperature of the small hole may approach 250° C. where the water has a surface tension of 0.0265 J/m² at the radius (using EQU. 5) of the coupling hole that satisfies the Young-Laplace condition would need to have a radius of 0.055 mm=54 μm or less to support the 10 cm column of water.

Thus, the diameter (twice the radius) of the coupling hole can range from 100 μm to 250 μm. For comparison, the diameter of human hair ranges from 20 to 180 μm. Thus, when the diameter of the coupling holes have dimensions on the order of the range of the diameter of human, the coupling holes will typically not leak liquid (water) into the pocket cavity. It is possible to drill holes smaller than the diameter of a hair.

The coupling holes illustrated in FIG. 20A are positioned vertically upwards and have the coupling holes open on the side facing the surface of the liquid. Coupling holes have been presented which are positioned vertically downwards and open towards the center of the earth (opposite to the direction of the surface of the liquid). This orientation has advantages when the coupling holes do not stratify the Young-Laplace condition and are much larger in diameter.

By controlling the pressure within the pocket cavity, the liquid can be prevented from entering the pocket cavity. This configuration allows the steam to be pulsed into the liquid. Furthermore, although the coupling holes have been orientated in the vertical up or vertical down direction, these holes can also be orientated in any direction. In some cases, the holes may be horizontal, e.g. when they satisfy the Young-Laplace condition or if the pocket cavity can easily be cleaned or sterilized.

One of the features of the vessel presented in FIG. 20A-H is the ability to clean the pocket cavity by dissembling a component of the vessel to expose the internal walls of the pocket cavity. The cleaning insures the sterility of the pocket cavity and reduces any potential buildup of microorganisms within the pocket cavity. Although by applying steam to the pocket cavity, the temperature of the steam alone should eliminate live bacteria, but the issue of buildup of foreign matter remains. In the case of a sealed pocket cavity, other techniques and methods may be required to maintain sterility and cleanliness.

For vessels or devices using coupling holes that satisfy the Young-Laplace condition, conventional techniques such as washing with soap and water in the sink may be possible since soap helps the reduce the surface tension of water. Soaps offer the ability of overcoming the surface tension of the coupling holes and cleaning the pocket cavity. Other possibilities include washing the pocket cavity from entry point where the steam is applied to the pocket cavity by filling the pocket cavity with a solution that detaches any contaminates and releases them into the solution. Another is to surround the vessel or device by a pressure chamber sealed around the steam wand that couples steam to the pocket cavity as used during the normal operation. Now the pressure chamber is increased in pressure with steam and a cleaning solution causing the steam to flow through the coupling holes in the reverse direction and clean the pocket cavity.

The pocket cavity can contain electronic sensors which detect contamination, buildup of material, bacteria, or other materials which may not be conducive to human health. The sensor can relay the state of the pocket cavity when contamination is detected and either prepare the vessel or device for cleaning or, in some cases, replace the device. Plastics may be a material to form steam wands having a pocket cavity that may offer cheap replacement.

Plastics (silicone, polytetrafluoroethylene (PTFE), etc.) can be used safely at temperatures of up to 100 to 150° C. to form the steam wands. These plastics can be used to form structures and reduce the cost of manufacturing of a component having these small diameter coupling holes ranging from 100 μm to 250 um. For instance, the drill bit to create these holes will suffer less wear and cut easier than for a comparable thickness of metal. Other techniques to form the holes can also be employed. Plastics may offer benefits in the reduction of costs and an ease in the manufacture of the final product with coupling holes satisfying the Young-Laplace condition. In addition, electronics to perform the functions described earlier can easily be encapsulated into plastics. The electronics can include: integrated circuit chips, MicroElectroMechnical systems (MEMS), sensors, antennas, transducers, Input/Output interfaces, etc. to create sub-systems to relay information between the component and the main control system (e.g., stove).

The Young-Laplace condition is used to insure that liquid is prevented from entering the pocket cavity and causing the cavity to become contaminated causing potential sterility concerns. In addition, possible cooking preparation steps can reduce the opportunity of the liquid leaking back into the pocket cavity. These steps can be used for those coupling holes which satisfy the Young-Laplace condition as well as those coupling holes that do not. One example is to spread butter over the interior surface of the vessel where the coupling holes 20-9 exist. This helps to seal the coupling holes which potentially would allow larger diameter holes to be used. After the liquid is added to the vessel and the steam is applied to the pocket cavity, the butter would easily meld and become a part of the meal. Due to the continual pressure of the steam in the pocket cavity, the direction of flow would occur from the pocket cavity to the liquid contained in the vessel. This continuous flow would prevent the liquid would be from entering the pocket cavity.

Other materials, other than butter, can be used to perform the same function. One example is food-grade paraffin wax. This causes the contact angle at the coupling hole to be greater than 90° C. potentially eliminating the flow of liquid back into the pocket cavity. Food-grade paraffin wax is used as an additive in chewing gum, and coatings for cheese and candy. The product passes through the body without being broke down. At the start of preparation, the food-grade paraffin wax would be applied over the interior surface of the vessel where the coupling holes 20-9 exist.

Another embodiment is to apply the steam to the pocket cavity and then add the liquid and comestibles to the vessel. The positive pressure of the steam exiting the coupling holes would prevent the liquid from entering the pocket cavity through the coupling holes.

As the steam bubble rises, the energy within the steam that formed the bubble transfers its heat to the liquid. Smaller diameter bubbles will rise in the liquid at a slower rate than larger diameter bubbles, regardless if the bubble contains air or steam. The efficiency of the heating process to raise the temperature of the liquid improves if the bubble diameter is smaller since the bubble will remain in the liquid longer. The increased time will allows a longer time period to transfer the energy from the steam within the bubble to the liquid that is outside. The diameter of the bubble can be controlled by controlling the application of the pressure being applied to the spherical liquid surface. This pressure can be controlled at the source of the steam generating system.

At periodic intervals, the vessel with the coupling holes that can be disassembled would need to be cleaned. This is a precautionary measure to insure bacteria and other sources of potential infection that may enter either the pocket cavity or the cavities of the coupling holes are held at bay. Once the vessel components have been hand cleaned, the vessel can be re-assembled and filled with a solution of water and vinegar (or comparable cleaning solution). Steam can be applied to the pocket cavity in intervals where the steam is enabled and disabled for a short time period. The helps cycle the solution into the cavity of the coupling hole and clean the coupling hole cavities.

Returning back to FIG. 20A, the screw in plate 20-8 is removable from the remainder 20-7 of the vessel so that the pocket cavity 20-14 can be easily cleaned. A view along the dotted line 20-10 in the direction of the corresponding arrow is presented next.

Figure 20B:
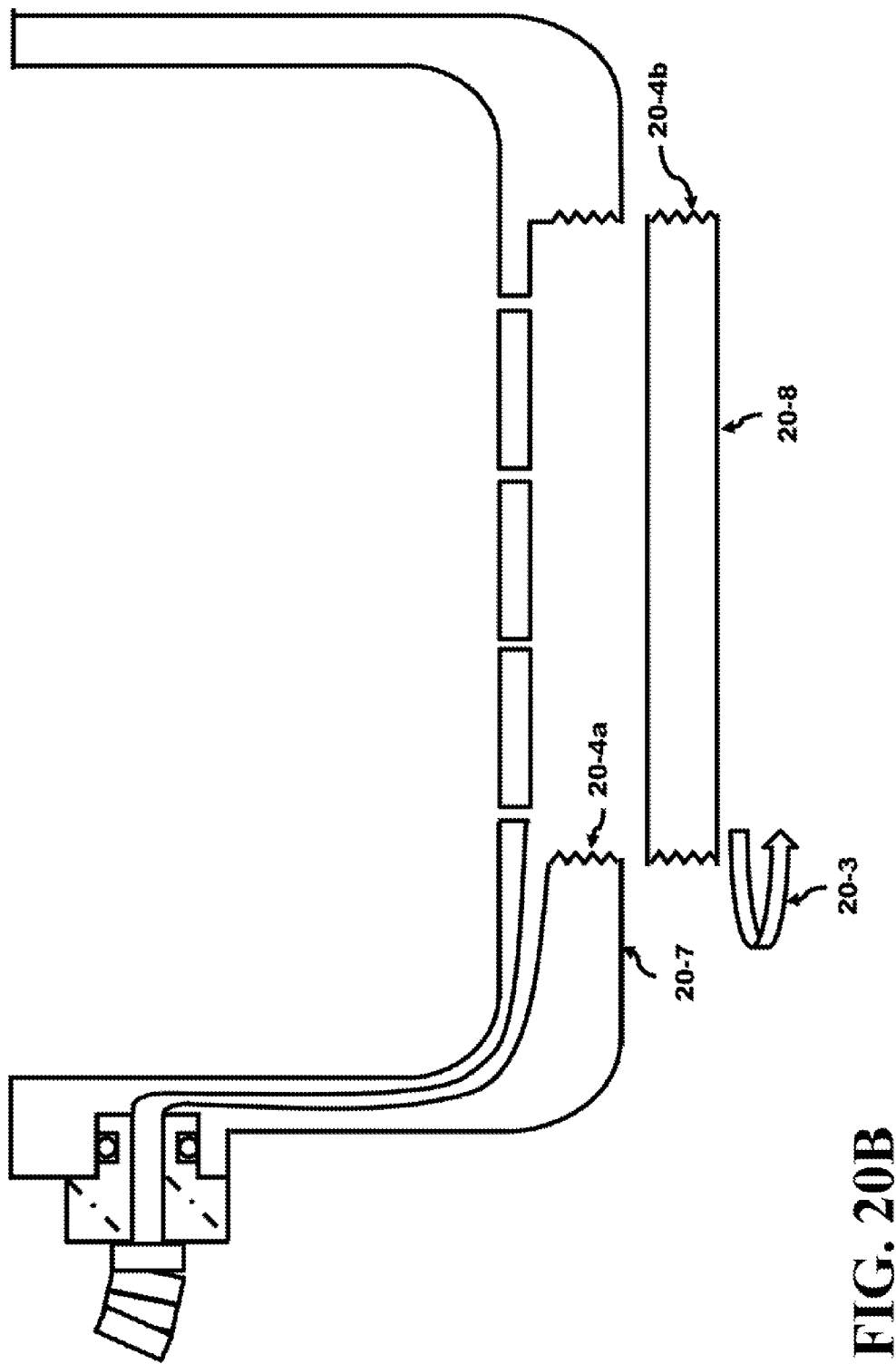
FIG. 20B illustrates a cross-sectional view of a vessel using an embedded steam heating technique which has been partially disassembled of one embodiment in accordance with the present invention.

FIG. 20B illustrates the screw in plate 20-8 detached from the remainder of the vessel 20-7 by the rotating motion as indicated by the arrow 20-3. Note that the vessel has threads 20-4*a* while the plate as the corresponding threads 20-4*b* to allow these two pieces to be screwed together or taken apart easily. FIG. 20C illustrates a cross-sectional view in the direction of the arrow shown in FIG. 20A along the dotted line 20-10. Heat flow from the plate 20-8 occurs via conduction 20-5 to the upper portion 20-7 of the vessel. The groove 20-11 runs in parallel with the inner surface of the vessel and provides a path for the steam to flow. A cross-section of one of the holes 20-9 coupling the steam in the groove 20-11 to the liquid which is above the hole 20-9. The groove can also be shaped as an oval, a circle, square, etc. The dotted line 20-12 and arrow indicate a cross-sectional view which will be given in FIG. 20D. The lower plate 20-8 shows a gap between the upper portion 20-7 of the vessel and the lower plate 20-8. Within the upper portion are the holes 20-9 which couple the pocket cavity 20-14 to the liquid in the vessel. The dotted line 20-13 and arrow indicate the cross-sectional view illustrated in FIG. 20E. The grove 20-11 is illustrated as a dotted line while the holes 20-9 are coupled to the channel. The diameter of the coupling holes 20-9 should prevent liquid in the vessel to flow through the hole. Instead, the diameter of the coupling hole 20-9 should be sized such that the liquid within the vessel maintains the surface tension over the area of the coupling hole 20-9 preventing the liquid from entering the coupling hole 20-9 or an applied steam pressure would prevent the liquid from entering the pocket cavity. The steam pressure applied in the channel 20-11 by steam can be adjusted to cause steam to be admitted into the liquid of the vessel by forming bubbles and thereby heating the liquid in the vessel up.

Figure 20F:
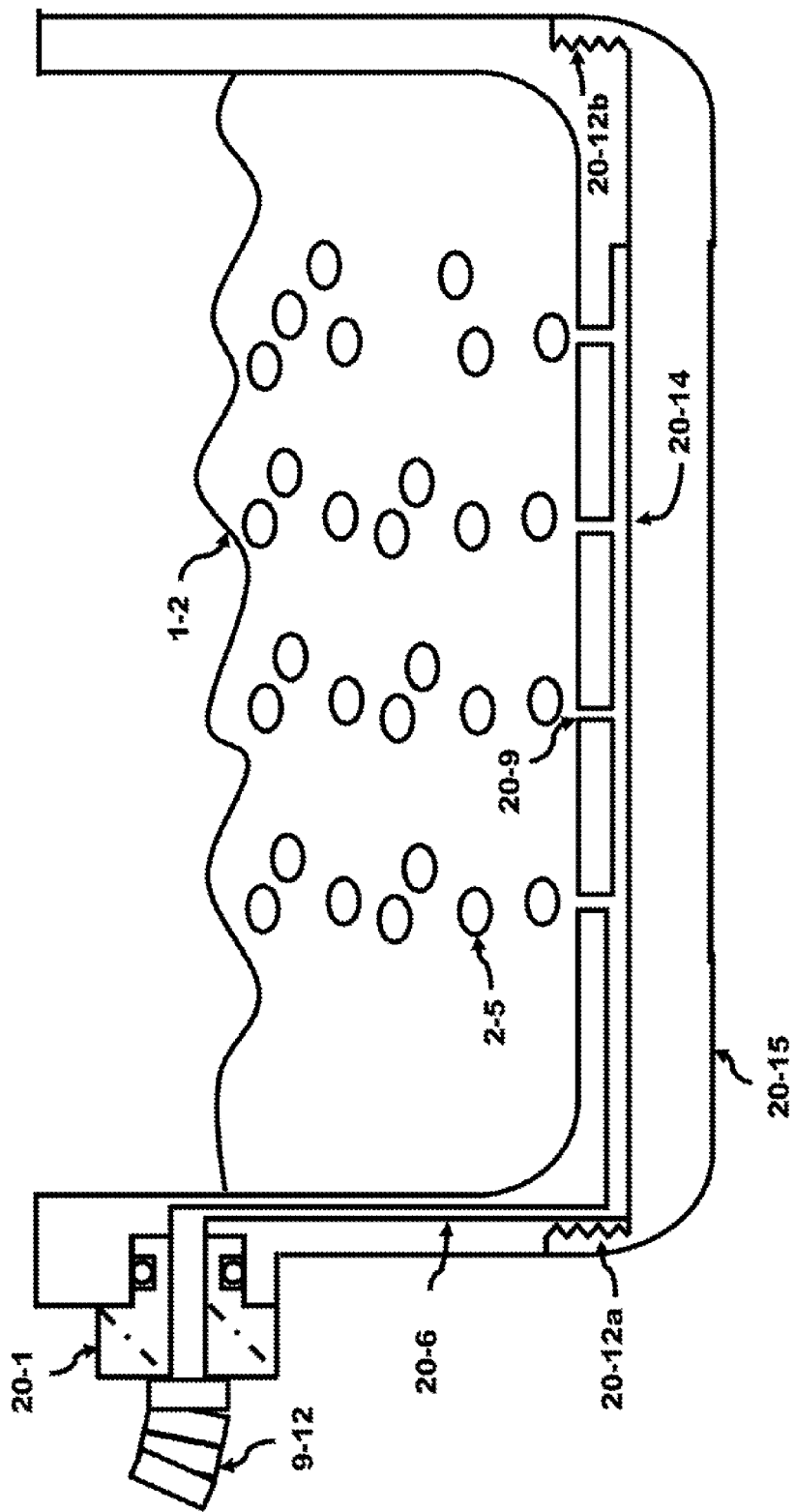
FIG. 20F presents a side cross-sectional view of a vessel using an embedded steam heating technique which introduces steam into the liquid within the vessel by using a pocket cavity disassembled by unthreading the lower plate of one embodiment in accordance with the present invention.

FIG. 20F illustrates a vessel using a larger lower plate 20-15. The lower plate 20-15 and the abutting vessel are both threaded as illustrated by 20-12a and 20-12b. The steam is introduced into the flexible tube assembly 9-12 attached to the coupling unit 20-1. The coupling unit provides steam to the vertical channel 20-6. The channel is coupled to the pocket cavity 20-14. Coupling holes 20-9 in the bottom of the vessel allowed the steam within the pocket cavity 20-14 to escape and become bubbles 2-5 rising to the surface of the liquid 1-2.

Figure 20G:
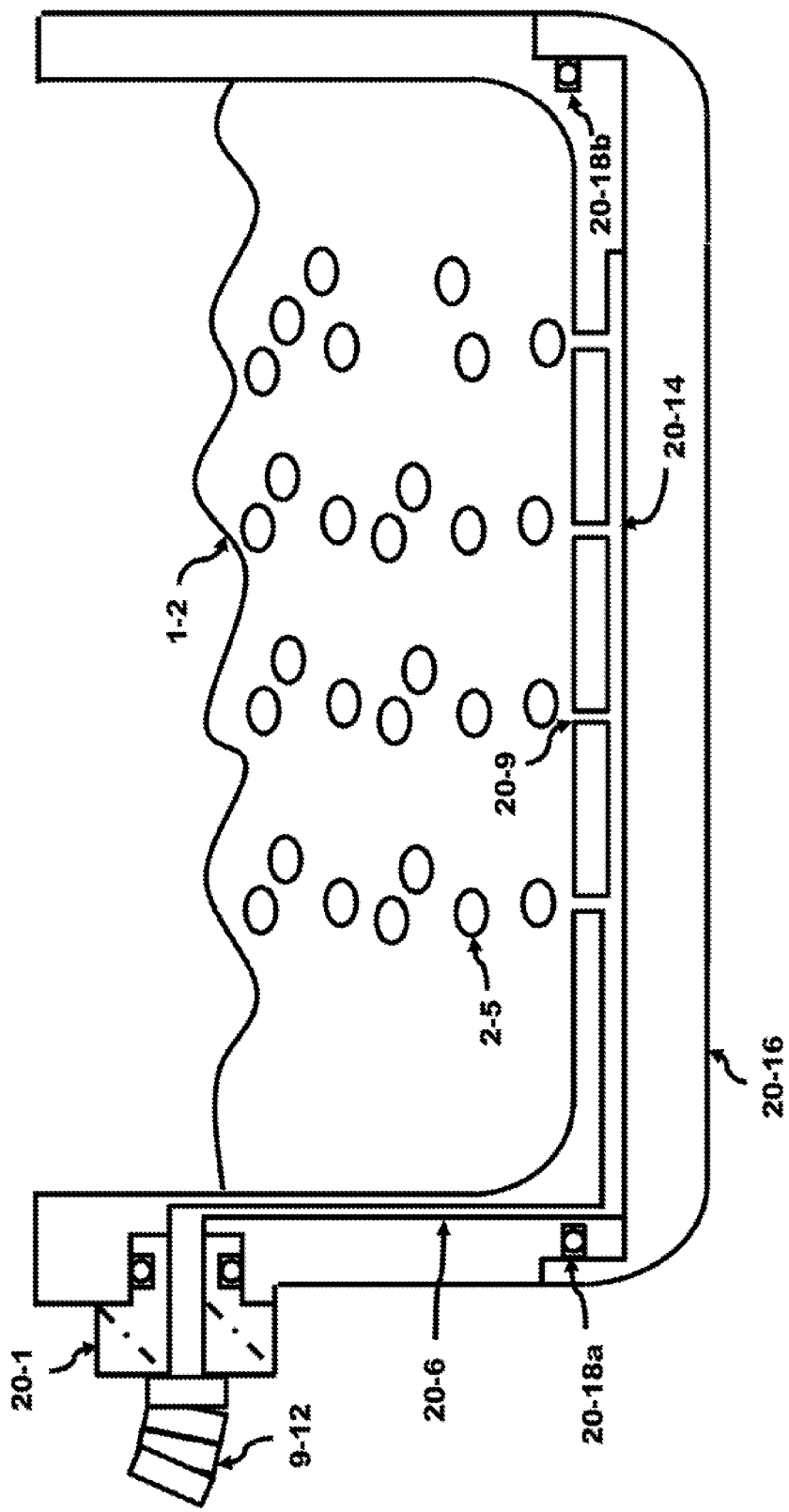
FIG. 20G illustrates a side cross-sectional view of a vessel using an embedded steam heating technique which introduces steam into the liquid within the vessel by using a pocket cavity disassembled by detaching the lower plate of one embodiment in accordance with the present invention.

FIG. 20G illustrates a similar vessel as in FIG. 20F with the exception that instead of screwing the lower plate 20-16 to the remaining portion of the unit, the lower plate is slid into position and latched (not illustrated). The groove 20-18a and 20-18b containment O-ring to help make a seal. The steam is introduced into the flexible tube assembly 9-12 attached to the coupling unit 20-1. The coupling unit provides steam to the vertical channel 20-6. The channel is coupled to the pocket cavity 20-14. Coupling holes 20-9 in the bottom of the vessel allowed the steam within the pocket cavity 20-14 to escape and become bubbles 2-5 rising to the surface of the liquid 1-2.

FIG. 20H illustrates a vessel that is used solely for steam heating the comestibles in the vessel. Gas or similar heating sources are not used in this embodiment of the vessel. The lower plate 20-22 is slid into position and screwed to the remaining portion of the unit 20-20 by the threads 20-21a and 20-21b. The groove 20-19a and 20-19b contain an O-ring to help make a seal. The steam is introduced into the flexible tube assembly 9-12 attached to the coupling unit 20-1. The coupling unit is coupled to the pocket cavity 20-14. Coupling holes 20-9 in the bottom of the vessel allowed the steam within the pocket cavity 20-14 to escape and become bubbles 2-5 rising to the surface of the liquid 1-2. This vessel may be easier to manufacture than the previous vessels and easy to clean after being disassembled.

Figures 21A, 21B:
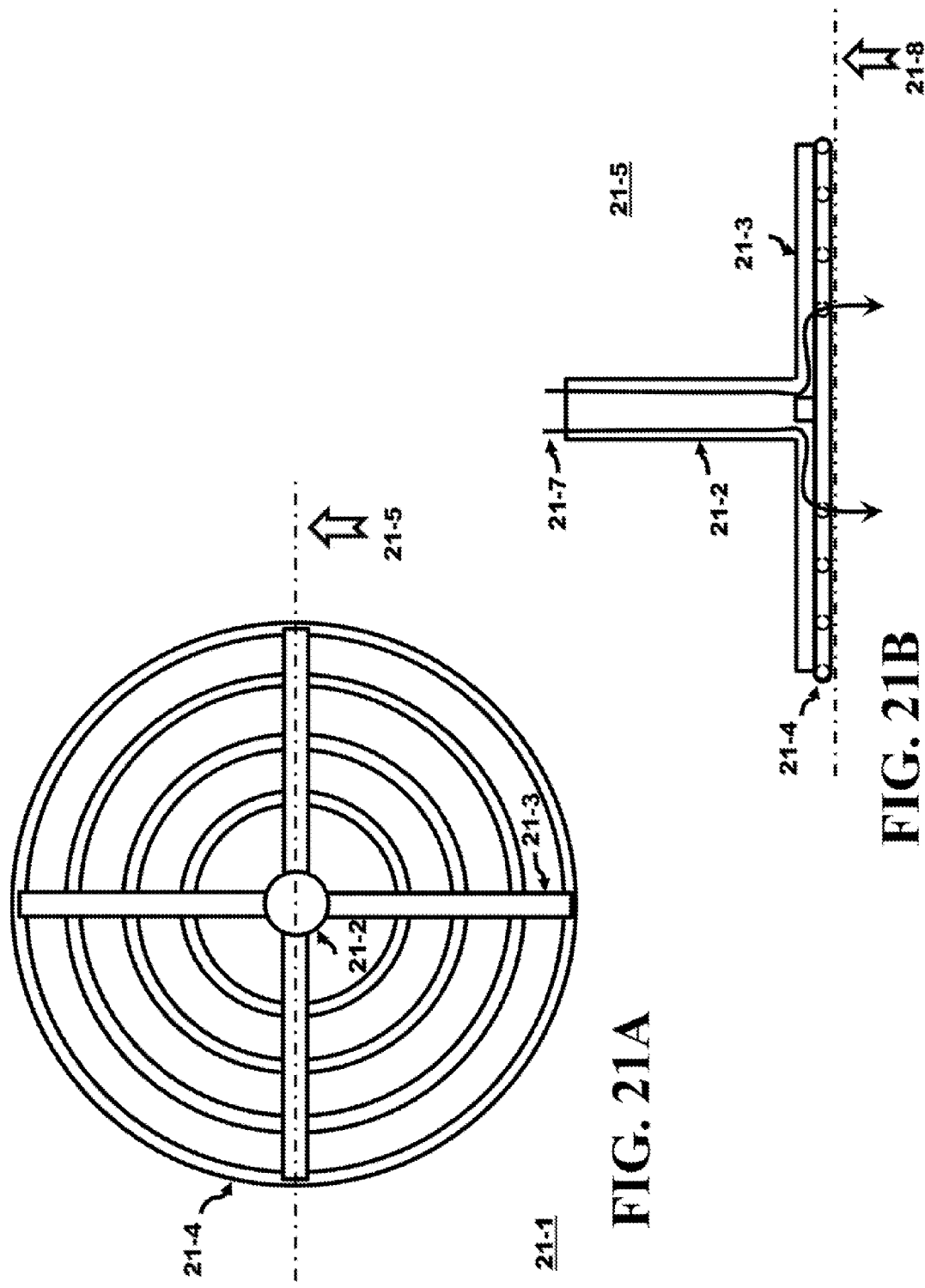
FIG. 21A presents a top view of a steam wand of one embodiment in accordance with the present invention.
FIG. 21B illustrates a side cross-sectional view of a steam wand indicating steam flow of one embodiment in accordance with the present invention.

A top view of an embodiment of a steam wand 21-1 is depicted in FIG. 21A. This steam wand 21-1 has a hollow tube 21-2 that can be coupled to a detachable coupling unit 9-9 to access a source of pressurized steam. The steam wand has coupling holes. The steam wand can be inserted into the liquid within a vessel. Steam can be applied to the steam wand and radial arms 21-3 and channel the steam to concentric circular tubes 21-4 which releases the stream through coupling holes distributed over the surface regions of the concentric circular tubes into the liquid. The released steam forms steam bubbles heating up the liquid. The diameter of the largest concentric circular tube 21-4 in the steam wand illustrated in FIG. 21A can be sized to fit the inner diameter of the vessel, although a smaller diameter set of concentric circular tubes can still be used to advantageously heat the liquid within the vessel. The steam wand offers a single device with a plurality of coupling holes that can easily be attached to the flexible or rigid tube assemblies via the detachable coupling unit 9-9. Furthermore, these coupling holes are distributed over a large area allowing steam bubble generation distributed over area equivalent to the bottom surface area of the vessel. These steam bubbles enter the liquid within the vessel and heats the liquid over this cross-sectional area. A side view along 21-5 is presented next.

A side view 21-5 of the steam wand is depicted in FIG. 21B. The hollow tube 21-2 is coupled to the radial arms 21-3. The radial arm couple to the concentric circular tubes 21-4. The coupling holes are located on the bottom region of the concentric circular tubes 21-4. These tubes are not limited to have a circular shape; the shapes can also include squarest, rectangular, triangular, etc. In addition, the arms 21-3 and circular tubes 21-4 can have a cross-sectional area other than rectangular and circular. Steam is introduced into the hollow tube 21-2 which channels the steam along the path 21-7 illustrated. Numerous coupling holes are located along the bottom surface of the circular tubes. The steam exits the steam wand in the downward direction from these coupling holes and form steam bubbles in the liquid which rise around the circular tube. The coupling holes can be designed to conform to the Young-Laplace condition or have a larger diameter. The view from the bottom along 21-8 is presented next.

Figure 21C:
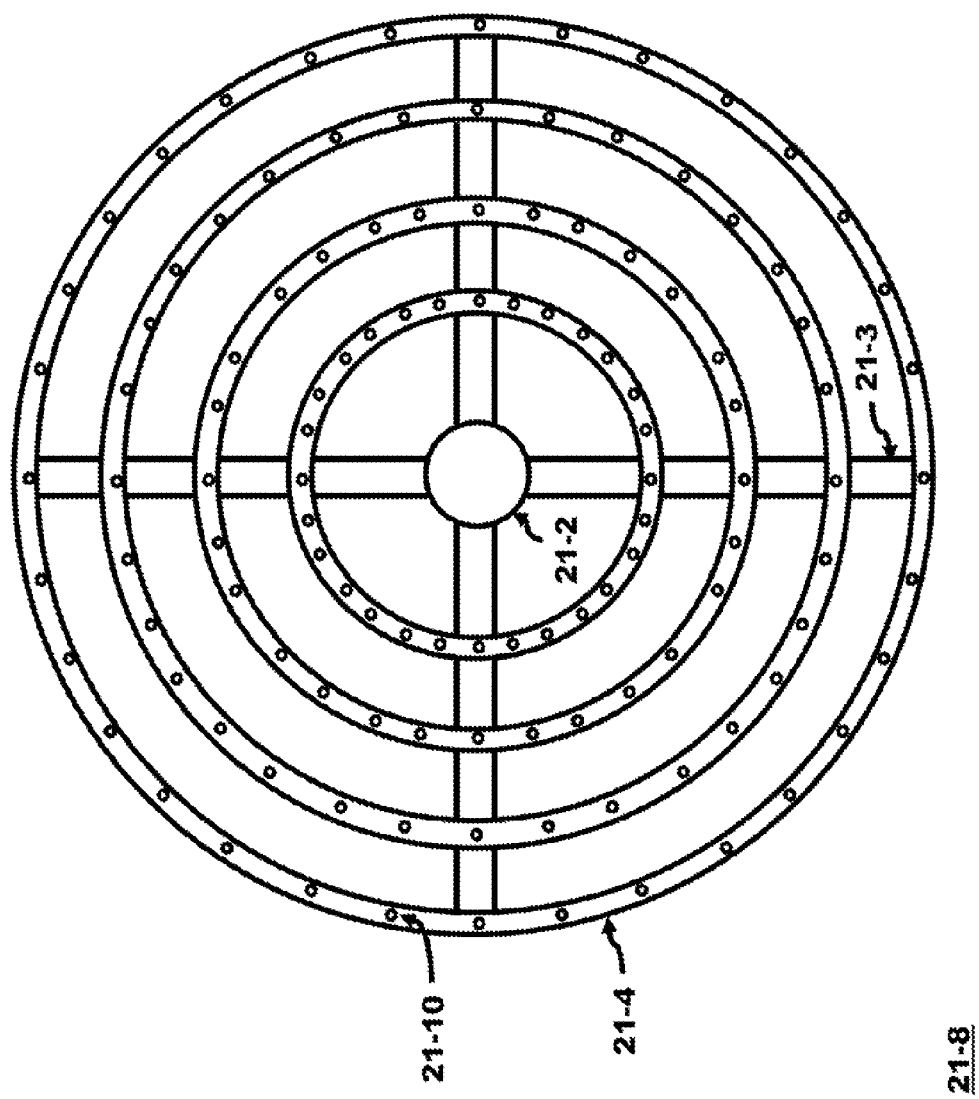
FIG. 21C depicts a bottom view of a steam wand of one embodiment in accordance with the present invention.

FIG. 21C illustrates the bottom view 21-8 of the steam wand. A plurality of coupling holes 21-10 are located in the concentric circular tubes 21-4. The radial arms 21-3 couple the hollow tube 21-2 to the circular tubes 21-4. By using sensors placed within the pocket cavity, the pressure can be controlled to be equal to or remain in excess of the pressure that is external to the coupling hole, particularly for the coupling holes which do not satisfy the Young-Laplace condition, to insure that liquid does not enter the pocket cavity of the circular tube (since the coupling holes are vertically positioned and open on the side facing the center of the earth). This can reduce the possibility of contamination with the pocket cavity and extend the period of time to perform maintenance of the steam wand.

The steam wand 21-1 being inserted into a vessel placed on a stove containing liquid 1-2 is presented in FIG. 21D. The steam wand 21-1 is coupled to the flexible tube assembly 12-14 by a detachable coupling unit 9-9. The flexible tube assembly 12-14 is in turn coupled to a second coupling unit 12-12 coupling the flexible tube assembly to the rigid tube assembly. Steam from a steam source is channeled to the steam wand. The coupling holes in the steam wand form steam bubbles 21-12 in the liquid 1-2. By controlling the pressure and flow of steam from the steam source, the diameter of the steam bubbles can be controlled and allow for different cooking styles to be incorporated. The steam wand can contain an electronic control system to transmit/receive signals 12-15 of sensors and information to/from the system via the second coupling unit 12-12 or a conveniently placed transceiver to receive the signal. The communication is not limited to a wireless interface; the communication can also be conducted over physical wires coupling the electrical system within the steam wand to the intelligent electronic control system 8-1. The flame can be enabled and controlled by a wireless interface if desired.

Figure 22B:
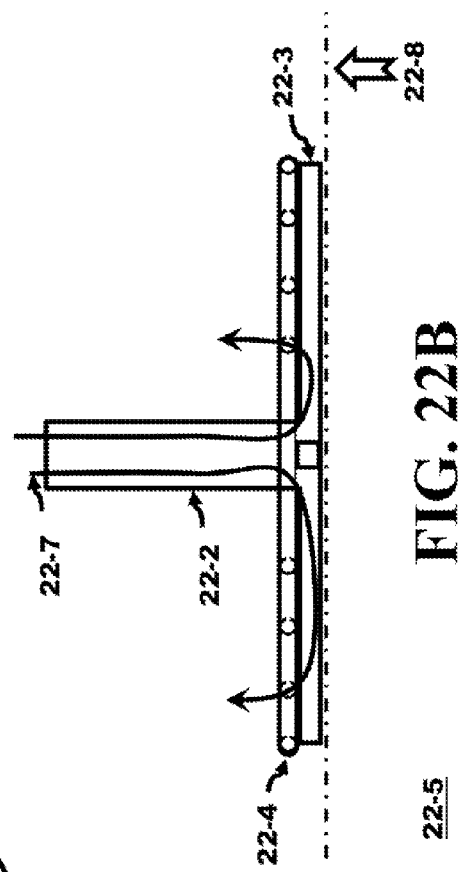
FIG. 22B presents a side cross-sectional view of a steam wand indicating steam flow of one embodiment in accordance with the present invention.
Figure 22A:
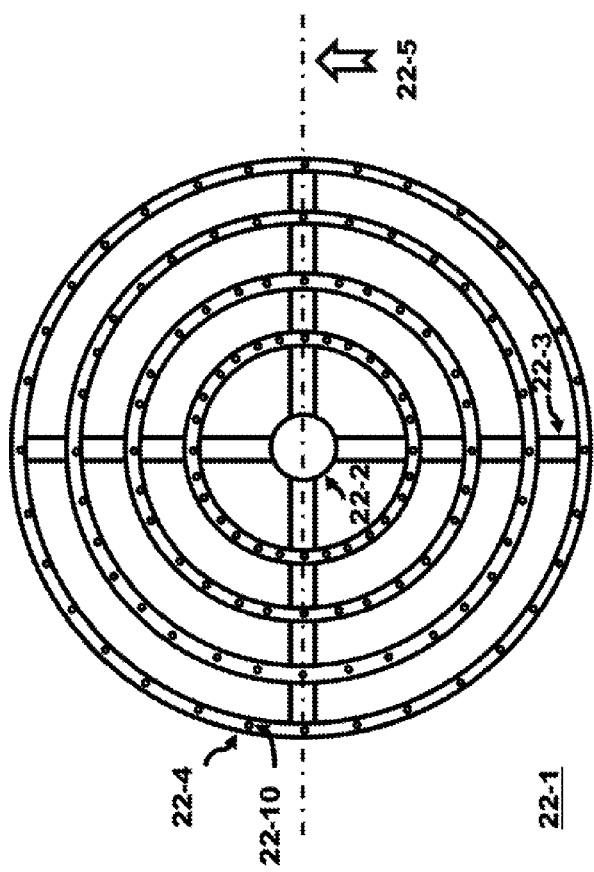
FIG. 22A shows the top view of another steam wand in one embodiment in accordance with the present invention.

A top view of another embodiment of a steam wand 22-1 is depicted in FIG. 22A. This steam wand 22-1 has a hollow tube 22-2 that can be coupled to a detachable coupling unit 9-9 to access a source of pressurized steam. The steam wand has coupling holes 22-10 vertically positioned open to the surface of the liquid. Steam can be applied to the steam wand and radial arms 22-3 channels the steam to concentric circular tubes 22-4 which releases the stream through coupling holes distributed over the surface regions of the concentric circular tubes. The steam wand can then be inserted into the liquid within a vessel. The released steam forms steam bubbles heating up the liquid. The diameter of the largest concentric circular tube 22-4 in the steam wand illustrated in FIG. 22A can be sized to fit the inner diameter of the vessel, although a smaller diameter set of concentric circular tubes can still be used to advantageously heat the liquid within the vessel. The steam wand offers a single device with a plurality of coupling holes that can easily be attached to the flexible or rigid tube assemblies via the detachable coupling unit 9-9. Furthermore, these coupling holes are distributed over a large area allowing steam bubble generation distributed over area equivalent to the bottom surface area of the vessel. These steam bubbles enter the liquid within the vessel and heats the liquid over this cross-sectional area. A side view along 22-5 is presented next.

A side view 22-5 of the steam wand is depicted in FIG. 22B. The hollow tube 22-2 is coupled to the radial arms 22-3. The radial arm couple to the concentric circular tubes 22-4. The coupling holes are located on the top region of the concentric circular tubes 22-4. These tubes are not limited to have a circular shape; the shapes can also include squarest, rectangular, triangular, etc. In addition, the arms 22-4 and circular tubes 22-4 can have a cross-sectional area other than rectangular and circular. Steam is introduced into the hollow tube 22-2 which channels the steam along the path 22-7 illustrated. Numerous coupling holes are located along the top surface of the circular tubes. The steam exits the steam wand in the upward direction from these coupling holes and form steam bubbles in the liquid which rise from the tube. The coupling holes can be designed to conform to the Young-Laplace condition or have larger diameters (to avoid contamination, positive pressure may be required within the pocket cavity). The view from the bottom along 22-8 is presented next.

Figure 22C:
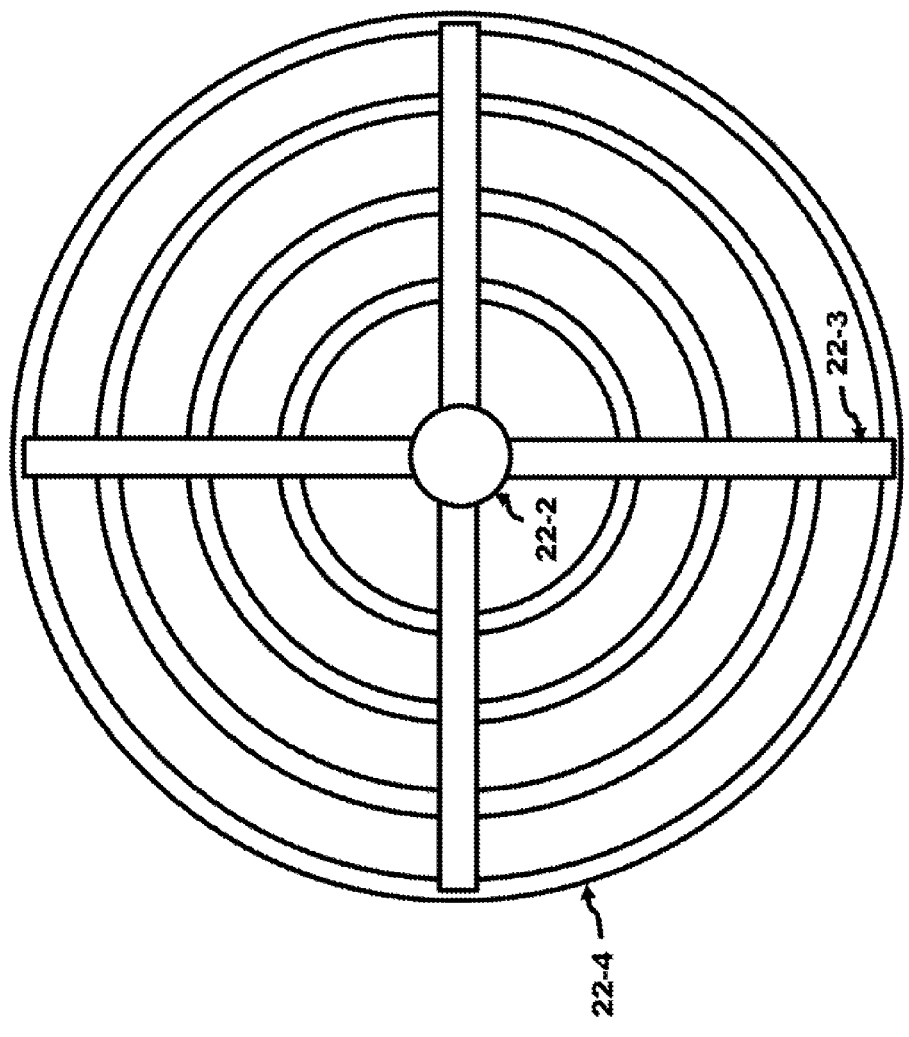
FIG. 22C depicts a bottom view of a steam wand of one embodiment in accordance with the present invention.

FIG. 22C illustrates the bottom view 224 of the steam wand. The radial arms 22-3 couple the hollow tube 22-2 to the circular tubes 22-4. By using sensors placed within the pocket cavity or the circular tube 22-4, the pressure can be controlled to be equal to or remain in excess of the pressure that is external to the coupling hole, particularly for the coupling holes which do not satisfy the Young-Laplace condition, to prevent liquid from entering the pocket cavity of the circular tube (since the coupling holes are vertically positioned and open on the side facing the surface of the liquid). This can reduce the possibility of contamination with the pocket cavity and extend the period of time to perform maintenance of the steam wand.

Figure 22D:
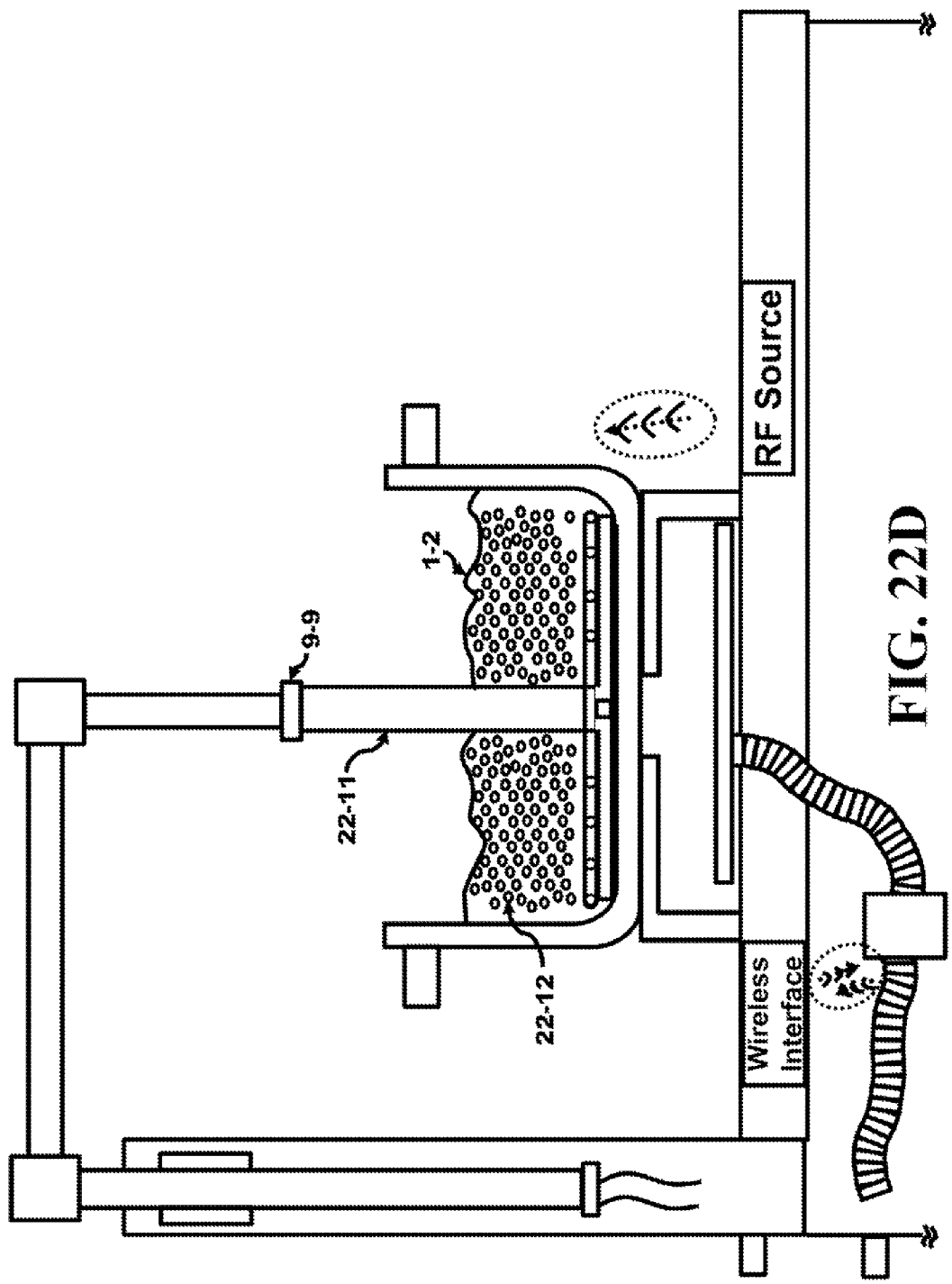
FIG. 22D presents a cross-sectional view of a vessel using a steam wand of one embodiment in accordance with the present invention.

The steam wand 22-1 being inserted into a vessel placed on a stove containing liquid 1-2 is presented in FIG. 22D. The steam wand 22-1 is couple to a rigid tube assembly by detachable coupling unit 9-9. Steam from a steam source is channeled to the steam wand. The coupling holes in the steam wand form steam bubbles 22-12 in the liquid 1-2. By controlling the pressure and flow of steam from the steam source, the diameter of the steam bubbles can be controlled and allow for different cooking styles to be incorporated. The steam wand can contain an electronic control system to transmit/receive signals of sensors and information to/from the system. The communication is not limited to a wireless interface; the communication can also be conducted over physical wires coupling the electrical system within the steam wand to the intelligent electronic control system 8-1.

A top view of another embodiment of a steam wand 23-1 is depicted in FIG. 23A. This steam wand 23-1 has a hollow tube 23-2 that can be coupled to a detachable coupling unit 9-9 to access a source of pressurized steam. The hollow tube 23-2 is also coupled to the four radial arms 23-3. The steam wand can be inserted into the liquid within a vessel. The steam wand has coupling holes 22-4 in the radial arms 23-3 vertically positioned open to the surface of the liquid which releases the stream through coupling holes distributed over the surface regions of the radial arms. There is no limitation of the number of radial arms that may be used. The released steam forms steam bubbles heating up the liquid. The length of the radial arms illustrated in FIG. 23A can equal the radius of the vessel, although a smaller lengths of radial arms can still be used to advantageously heat the liquid within the vessel. The steam wand offers a single device with a plurality of coupling holes that can easily be attached to the flexible or rigid tube assemblies via the detachable coupling unit 9-9. Furthermore, these coupling holes are distributed over a large area allowing steam bubble generation distributed over an area matching the bottom surface area of the vessel. These steam bubbles enter the liquid within the vessel and heat the liquid over this cross-sectional area. A side view along 23-5 is presented next.

A side view 23-5 of the steam wand is depicted in FIG. 23B. The hollow tube 23-2 is coupled to the radial arms 23-3. The coupling holes are located on the top region of the radial arms 23-3. The hollow tube 23-2 is also coupled to the four radial arms 23-3. The arms 22-3 and hollow tubes 23-2 can have a cross-sectional area other than rectangular and circular, respectively. Steam is introduced into the hollow tube 23-2 which channels the steam along the path 23-7 illustrated. Numerous coupling holes are located along the top surface of the arms. The steam exits the steam wand in the upward direction from these coupling holes and form steam bubbles in the liquid which rise from the radial arms. The coupling holes can be designed to conform to the Young-Laplace condition or have larger diameters (to avoid contamination, positive pressure may be required within the pocket cavity).

Another material to form the steam wand is sintered porous steel. Sintered porous steel is formed from powered steel and placed into molds at high and elevated temperatures at high pressures to form solid shapes. The sintered steel once manufactured is porous allowing steam to flow through the walls of the solid shapes. Sintered porous steel has been used in the food manufacturing and production industry to transfer steam into foods to cook large quantities of comestibles and prepare the product for canning, freezing, and other storage preparatory needs. However, no one has used sintered porous steel in kitchen products where the comestibles can be quickly prepared, significantly reducing the wait time, so that the meal can be served for immediate use.

A top view of another embodiment of a steam wand 23-8 is depicted in FIG. 23C. This steam wand 23-8 has a hollow tube 23-2 that can be coupled to a detachable coupling unit 9-9 to access a source of pressurized steam. The hollow tube 23-2 is also coupled to the four radial arms 23-9. Each radial arm is manufactured from sintered porous metal. The arms are hollow to provide steam to the pocket cavity formed within the radial arms. The steam wand can be inserted into the liquid within a vessel. There is no limitation of the number of radial arms that may be used. The released steam forms steam bubbles heating up the liquid. The length of the radial arms illustrated in FIG. 23C can equal the radius of the vessel, although a smaller lengths of radial arms can still be used to advantageously heat the liquid within the vessel. The steam wand offers a single device with a plurality of porous holes that can easily be attached to the flexible or rigid tube assemblies via the detachable coupling unit 9-9. Furthermore, these arms with the porous holes are distributed radially to allow steam bubble generation distributed over the bottom surface area of the vessel. These steam bubbles enter the liquid within the vessel and heat the liquid over this cross-sectional area.

Figure 24:
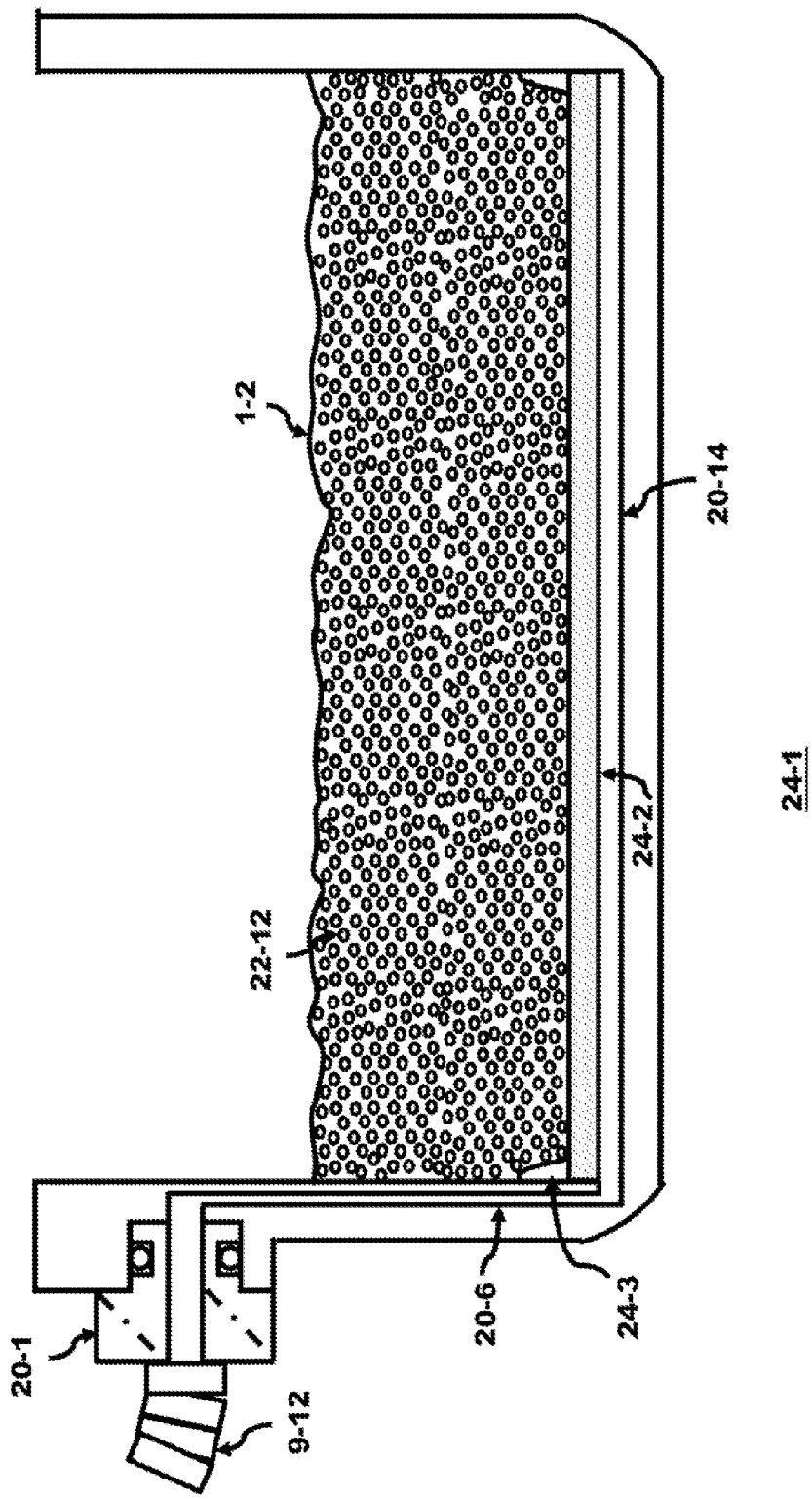
FIG. 24 illustrates a cross-sectional view of a vessel with a sintered porous metal partition segregating the pocket cavity from the liquid held by the vessel in one embodiment in accordance with the present invention.

FIG. 24 illustrates a cross-sectional view of a vessel 24-1 with a liquid 1-2 where steam is flowing in the flexible tube assembly 9-12 into the coupling unit 20-1. The coupling unit is held in place by a latching or screw mechanism which is not illustrated and a seal is made with a circular groove in the coupling unit to contain an O-ring. The steam is channeled down a long hollow shaft or hole 20-6, for this example, formed in the vessel to a pocket cavity 20-14 formed by soldering a sintered porous metal plate 24-2 with a solder joint 24-3 around the inside periphery of the walls of the vessel connecting the porous metal plate to the vessel. Another way to channel the steam to the pocket cavity can be achieved by attaching a flexible tube to the exterior of the vessel and entering the vessel through an entry point that is parallel to the pocket cavity (similar to the description provided in FIG. 20H). Small porous holes are formed in the sintered porous metal plate 24-2 during the manufacturing process. The sintered porous metal plate 24-2 separates the liquid 1-2 from the pocket cavity 20-14. These porous holes coupled the pocket cavity 20-14 to the internal volume of the vessel and couple the steam to the liquid within the vessel. The steam pressure is applied to the vessel causing pressure to build up in the pocket cavity 20-14 which would be a sealed region if the porous holes were sealed. The increased pressure creates very small steam bubbles 22-12 to emanate from the porous holes formed in the sintered porous metal plate 24-2.

Figure 25:
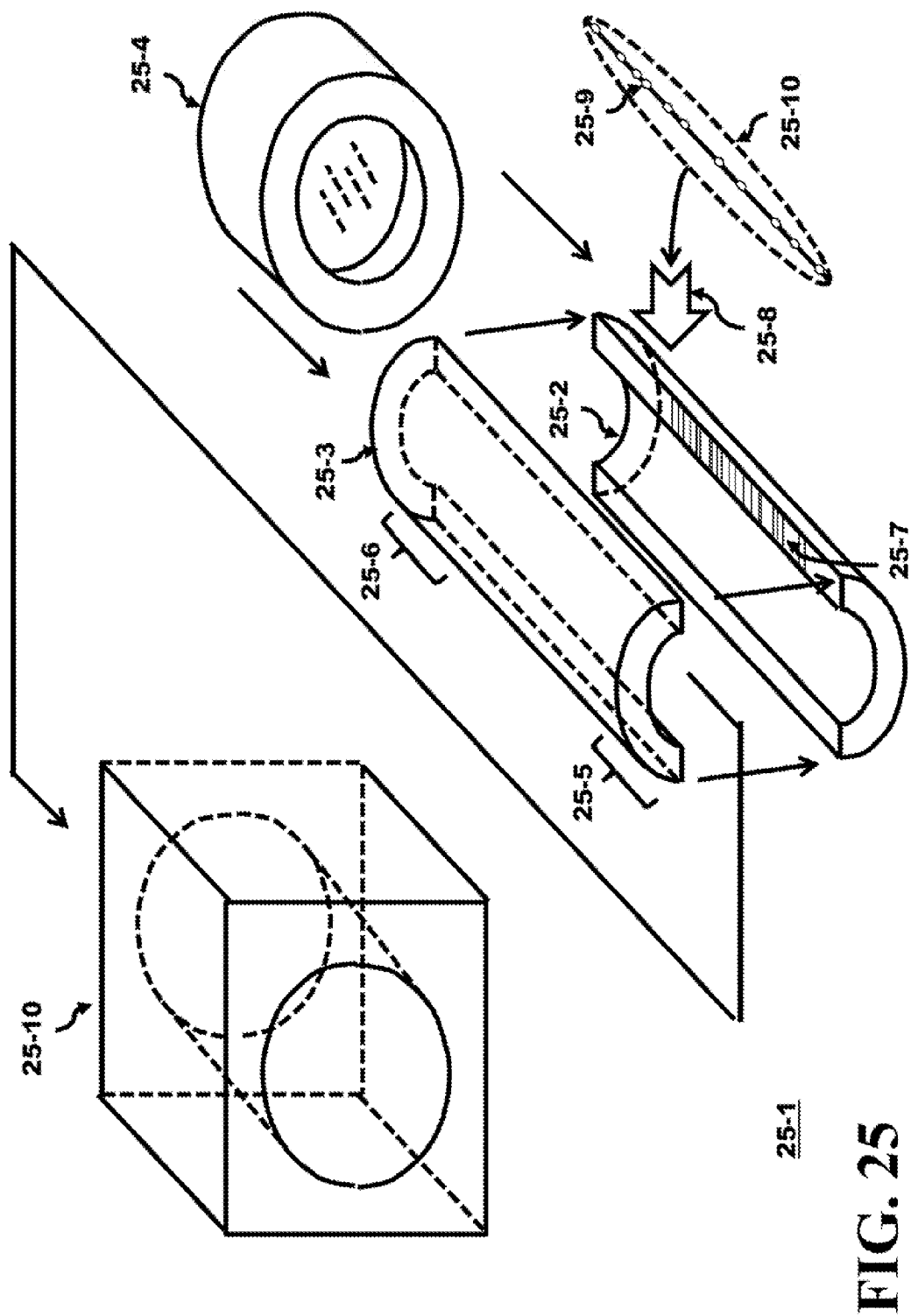
FIG. 25 depicts a side 3-D exploded view of a steam wand using the pressed common surfaces between two halves to randomly create a leaking interface which can easily be disassembled for cleaning of one embodiment in accordance with the present invention.

FIG. 25 illustrates a perspective cross-sectional view of one embodiment of a steam wand and coupling unit. The steam wand is formed from the four parts, the upper cylindrical half 25-3, the lower cylindrical half 25-2, the end cap 25-4, and the connector 25-10. The assembled steam wand (size and shape not scale) would be formed by moving the upper and lower cylindrical halves towards one another until that come in contact. The interior region of the steam wand is the pocket cavity. The two halves' contact area does not mate perfectly; even under moderate force. The common surface area where contact is made has scratches 25-7. These scratches can be randomly made or intentionally made by sanding with sandpaper. Each one of these scratches provides coupling holes (exit ports) for the steam from the pocket cavity to exit the steam wand. The end cap and connector can have tapered opening such that the combined halves can be press fitted into the both openings. Another embodiment would place threads 25-5 and 25-6 at the ends of the combined halves so that the piece can be threaded into the both openings. Additional methods of combining the two halves together would include screwing, bolting, and clamping the upper half to the lower half.

The assembled steam wand in FIG. 25 can also be easily dis-assembled allowing for the components to be easily cleaned. In addition, the common surfaces can be sanded or scotched to place incisions into the surface before assembly. Once assembled, a view 25-10 along the direction 25-8 illustrates that coupling holes 25-9 are formed. The pressure of the steam within the steam wand forces the steam along the scratches and out of the coupling holes formed by the scratches.

Finally, it is understood that the above description are only illustrative of the principle of the current invention. Various alterations, improvements, and modifications will occur and are intended to be suggested hereby, and are within the spirit and scope of the invention. This invention may, however, be embodied in many different forms and should not be construed as limited to the embodiments set forth herein. Rather, these embodiments are provided so that the disclosure will be thorough and complete, and will fully convey the scope of the invention to those skilled in the arts. It is understood that the various embodiments of the invention, although different, are not mutually exclusive. The vessel can be one of a variety of possibilities: pot, pan, wok, karihi, kettle, saucepan, cooking pot, coffee maker, cup, etc. The composition of the vessel can be metal, glass, Pyrex, ceramic, plastics, etc. The user can be an adult, a child, a student, a cook, a chef, a fast food preparer, etc. The heat source can be a flame formed from natural gas, electrical conductive heating as by a coil, inductive heating, or their equivalent. The liquid can be composed of water, milk, fluid, wine, stock, beer, soup, stew, sauce, vegetables, fruits, meats, wheat, or liquid extracts of a solid comestible being cooked. The end resulting products of using the inventive techniques presented herein can be served as meals, snacks, prepared foods, drinks, etc., for breakfast, lunch, dinner and in-between nourishment for home, kitchen, restaurants, and cafeterias, etc. The method of cooking can include: boiling, simmering, stewing, steeping, infusion, steaming, smothering, poaching, or coddling. The temperature of 100° C. is used for boiling a liquid; while this is the case for water at one atmospheric pressure, other liquids would have different boiling points dependent on the contents in the liquid. However, it is understood that when 100° C. is being used to describe conditions, the intent is to imply that the boiling point of the liquid is being discussed. The diameter of the coupling holes which couple the steam from the pocket cavity to the liquid can have a wide range of diameters. If meeting the Young-Laplace condition is desired, then the diameter of the holes can range from 100 μm to 250 μm. If meeting the Young-Laplace condition is not necessary, the diameter of the holes can range from greater than 250 μm to a millimeter or more. The applied steam pressure also determines the larger diameter dimensions which can be used. Of course the exact value of the diameter (given as 250 μm) separating these two conditions, is a function of the temperature of the environment containing the holes, the composition of the material in which the hole is formed, the composition of the liquid, the height of the liquid over the hole, the surface tension of the liquid, etc. Thus, these factors may need to be determined to access the diameter which separates these two conditions. Sintered porous metal may be substituted as a structure that can replace the structure of the material which has coupling holes manufactured by drilling small holes in the material. The tubes used to channel or couple steam between two different locations can have cross-sectional shapes other than circular.

These shape is not limited to a circular shape, the shape can include rectangular, elliptical, square, etc. The stove can advantageously incorporate the inventions presented in this application, but these inventions can be used in units other than the stove. A unit can incorporate the steam generation unit and be used for other purposes independent of the stove. For example, an independent steam generator unit that is used to make hot chocolate. Integrated circuits comprise at least one semiconductor chip protectively packaged to prevent the environment due to liquids and physical contact from damaging the circuit. In some cases, a portion of the area of the integrated circuit may be exposed to perform the function of a sensor: measuring the pressure at a location, measuring the temperature at a position, measuring the contaminant level, measuring the bacterial level and measuring the height of a liquid level using a camera. Sensors can be used to measure temperature, pressure, flow rate, pH, etc. The microprocessor is a device that is used to calculate the cooking times and to interact with the database in the memory (locally and on servers) and to provide the data corresponding to the new measurements associated with the progress of the cooking. The data from the memory can be translated into display data by the processor. The microprocessor could also be a DSP, microcontroller, multi-core processor, or any comparable computational unit. In accordance with these principles, those skilled in the art may devise numerous modifications without departing from the spirit and scope of the invention. A wireless link can be established using the protocols of IEEE 802.11, Bluetooth, 3G, 4G, or LTE. The wireless link can be established with a smart phone, tablet, computer, or wearable electronics.

What is claimed is:

1. A heating apparatus comprising:
a vessel positioned on a grill, the grill positioned over a first heating element, the first heating element configured to transfer a first heat transfer to the vessel;
a water source coupled to a heating cavity;
a second heating element contained in the heating cavity;
a first end of a tube assembly coupled to the heating cavity;
a second end of the tube assembly coupled to a steam wand, wherein the tube assembly is configured to insert the steam wand into an inner volume of the vessel;
a first pressure unit coupled between the heating cavity and the first end of the tube assembly; and
an intelligent electronic control system adapted to adjust:
a) a first pressure within the heating cavity by controlling the first pressure unit,
b) the first heat transfer between the first heating element and the vessel,
c) a second heat transfer between the second heating element and the heating cavity, or
d) any combination of a), b), or c).

2. The apparatus of claim 1, wherein
the tube assembly is adjusted by a user to position the steam wand under a surface of liquid held by the vessel.

3. The apparatus of claim 2, wherein
the steam wand having a plurality of coupling holes that couple a pocket cavity within the steam wand to the liquid held by the vessel.

4. The apparatus of claim 1, wherein
the tube assembly can be constructed from a flexible tube assembly, a rigid tube assembly, or a combination of the two.

5. The apparatus of claim 1, wherein
the first heating element is
a) enabled or disabled for a cooking cycle, or
b) enabled and disabled in a pattern by a first programmed sequence for the cooking cycle.

6. The apparatus of claim 1, wherein
the second heating element is
a) enabled or disabled for a cooking cycle, or
b) enabled and disabled in a pattern by a first programmed sequence for the cooking cycle.

7. A heating apparatus comprising:
a vessel positioned on a grill the rill positioned over a first heating element, the first heating element configured to transfer a first heat transfer to the vessel;
a water source coupled to a heating cavity;
a second heating element contained in the heating cavity;
a first end of a tube assembly coupled to the heating cavity; and
a second end of the tube assembly coupled to a steam wand, wherein
the tube assembly can be constructed from a flexible tube assembly, a rigid tube assembly, or a combination of the two, wherein
the flexible tube assembly is adjusted by a user to position the steam wand under a surface of liquid held by the vessel, wherein
the steam wand having a plurality of coupling holes that couple a pocket cavity within the steam wand to the liquid held by the vessel.

8. The apparatus of claim 7, wherein
the tube assembly is configured to insert the steam wand into an inner volume of the vessel.

9. The apparatus of claim 7, further comprising:
a first pressure unit coupled between the heating cavity and the first end of the tube assembly.

10. The apparatus of claim 9, further comprising:
an intelligent electronic control system adapted to adjust:
a) a first pressure within the heating cavity by controlling the first pressure unit,
b) the first heat transfer between the first heating element and the vessel,
c) a second heat transfer between the second heating element and the beating cavity, or
d) any combination of a), b), or c).

11. The apparatus of claim 10, wherein
the first heating element is
a) enabled or disabled for a cooking cycle, or
b) enabled and disabled in a pattern by a first programmed sequence for the cooking cycle.

12. The apparatus of claim 10, wherein
the second heating element is
a) enabled or disabled for a cooking cycle, or
b) enabled and disabled in a pattern by a first programmed sequence for the cooking cycle.

13. A heating apparatus comprising:
a vessel positioned on a grill, the grill positioned over a first heating element, the first heating element configured to transfer a first heat transfer to the vessel;
a water source coupled to a heating cavity;
a second heating element contained in the heating cavity;
a first end of a tube assembly coupled to the heating cavity; and
a second end of the tube assembly coupled to a steam wand, wherein the tube assembly is configured to insert the steam wand into an inner volume of the vessel, wherein the tube assembly is adjusted by a user to position the steam wand under a surface of liquid held by the vessel, wherein the steam wand having a plurality of coupling holes that couple a pocket cavity within the steam wand to the liquid held by the vessel.

14. The apparatus of claim 13, wherein the tube assembly can be constructed from a flexible tube assembly, a rigid tube assembly, or a combination of the two.

15. The apparatus of claim 13, further comprising:
a first pressure unit coupled between the heating cavity and the first end of t tube assembly.

* * * * *